(12) United States Patent
Akimoto et al.

(10) Patent No.: US 10,505,189 B2
(45) Date of Patent: Dec. 10, 2019

(54) CATHODE MATERIAL AND LITHIUM SECONDARY BATTERY USING SAME AS CATHODE

(71) Applicant: NATIONAL INSTITUTE OF ADVANCED INDUSTRIAL SCIENCE AND TECHNOLOGY, Tokyo (JP)

(72) Inventors: Junji Akimoto, Tsukuba (JP); Hiroshi Hayakawa, Tsukuba (JP)

(73) Assignee: NATIONAL INSTITUTE OF ADVANCED INDUSTRIAL SCIENCE AND TECHNOLOGY (JP)

( * ) Notice: Subject to any disclaimer, the term of this patent is extended or adjusted under 35 U.S.C. 154(b) by 17 days.

(21) Appl. No.: 15/574,222

(22) PCT Filed: May 20, 2016

(86) PCT No.: PCT/JP2016/065059
§ 371 (c)(1),
(2) Date: Nov. 15, 2017

(87) PCT Pub. No.: WO2016/190251
PCT Pub. Date: Dec. 1, 2016

(65) Prior Publication Data
US 2018/0138507 A1 May 17, 2018

(30) Foreign Application Priority Data
May 22, 2015 (JP) ................................ 2015-104962

(51) Int. Cl.
*H01M 4/505* (2010.01)
*H01M 4/525* (2010.01)
(Continued)

(52) U.S. Cl.
CPC ............ *H01M 4/505* (2013.01); *C01G 53/66* (2013.01); *H01M 4/525* (2013.01);
(Continued)

(58) Field of Classification Search
CPC .... H01M 4/505; H01M 4/525; H01M 10/052; H01M 10/0525
See application file for complete search history.

(56) References Cited

U.S. PATENT DOCUMENTS

| 5,631,105 | A | * | 5/1997 | Hasegawa | ............. | H01M 4/485 423/594.15 |
| 6,790,560 | B2 |   | 9/2004 | Wakihara et al. | ....... | 429/231.95 |
| 2013/0017449 | A1 | * | 1/2013 | Yasuda | ................. | H01M 4/505 429/231.8 |

FOREIGN PATENT DOCUMENTS

| CN | A-2000-123834 | 4/2000 |
| CN | 1532967 A | 9/2004 |

(Continued)

OTHER PUBLICATIONS

International Search Report dated Jul. 12, 2016 in corresponding PCT International Application No. PCT/JP2016/065059.
(Continued)

*Primary Examiner* — Jimmy Vo
(74) *Attorney, Agent, or Firm* — Ostrolenk Faber LLP

(57) ABSTRACT

A composite oxide which includes lithium, at least one of calcium and magnesium, and nickel and manganese, and has a lithium-excess layered rock-salt structure, and a cathode active material and a lithium secondary battery which contain the composite oxide.

20 Claims, 22 Drawing Sheets

(51) Int. Cl.
  H01M 10/052 (2010.01)
  C01G 53/00 (2006.01)
  H01M 10/0525 (2010.01)
  H01M 4/02 (2006.01)

(52) U.S. Cl.
  CPC ..... H01M 10/052 (2013.01); H01M 10/0525 (2013.01); *C01P 2002/50* (2013.01); *C01P 2002/72* (2013.01); *C01P 2002/76* (2013.01); *C01P 2002/77* (2013.01); *C01P 2002/85* (2013.01); *C01P 2006/40* (2013.01); *H01M 2004/028* (2013.01); *Y02T 10/7011* (2013.01)

(56) References Cited

FOREIGN PATENT DOCUMENTS

| | | |
|---|---|---|
| CN | 1898824 A | 1/2007 |
| CN | 102569877 A | 7/2012 |
| CN | 102804459 A | 11/2012 |
| CN | 103259016 A | 8/2013 |
| CN | 103441238 A | 12/2013 |
| CN | 103700850 A | 4/2014 |
| CN | 104091919 A | 10/2014 |
| CN | 106299328 A | 1/2017 |
| JP | 2007-516583 A | 6/2007 |
| JP | 2007-257885 A | 10/2007 |
| JP | 5024359 B | 9/2012 |
| JP | 2012-209242 A | 10/2012 |
| JP | 2013-100197 A | 5/2013 |
| JP | 2014-170739 A | 9/2014 |
| WO | WO 2005/067077 A2 | 7/2005 |

OTHER PUBLICATIONS

Written Opinion dated Jul. 12, 2016 in corresponding PCT International Application No. PCT/JP2016/065059.

N. Ishida et al., "Synthesis and electrochemical properties of layered $Li_{1.0}Mn_{0.82}Ni_{0.10}Ti_{0.08}O_2$ prepared by chemical lithium insertion," Journal of Power Sources, 244 (2013) 505-509.

T. Ohzuku et al., "High-papapity lithium insertion materials of lithium nickel manganese oxides for advanced lithium-ion batteries: toward rechar eable capacity more than 300 mA $hg^{-1}$," Journal of Materials Chemistry, 21, 10179-10188 (2011).

S. Yamamoto et al., "Improvement of cycling performance in Ti substituted $0.5Li_2MnO_3$-$0.5LiNi_{0.5}Mn_{0.5}O_2$ through suppressing metal dissolution," Journal of Power Sources, 278, 76-86 (2015).

A. Ito et al., "A new approach to improve the high-voltage cyclic performance of Li-rich layered cathode material by electrochemical pre-treatment," Journal of Power Sources, 183 (2008) 344-346.

L. Simonin et al., "In situ investigations of a Li-rich Mn-Ni layered oxide for Li-ion batteries," Journal of Materials Chemistry, 2012, vol. 22, p. 11316-11322.

D. Wang et al., "Synthesize and electrochemical characterization of Mg-doped Li-rich layered $Li[Li_{0.2}Ni_{0.2}Mn_{0.6}]O_2$ cathode material," Electrochimica Acta, 2013, vol. 107, p. 461-466.

* cited by examiner

FIG. 31
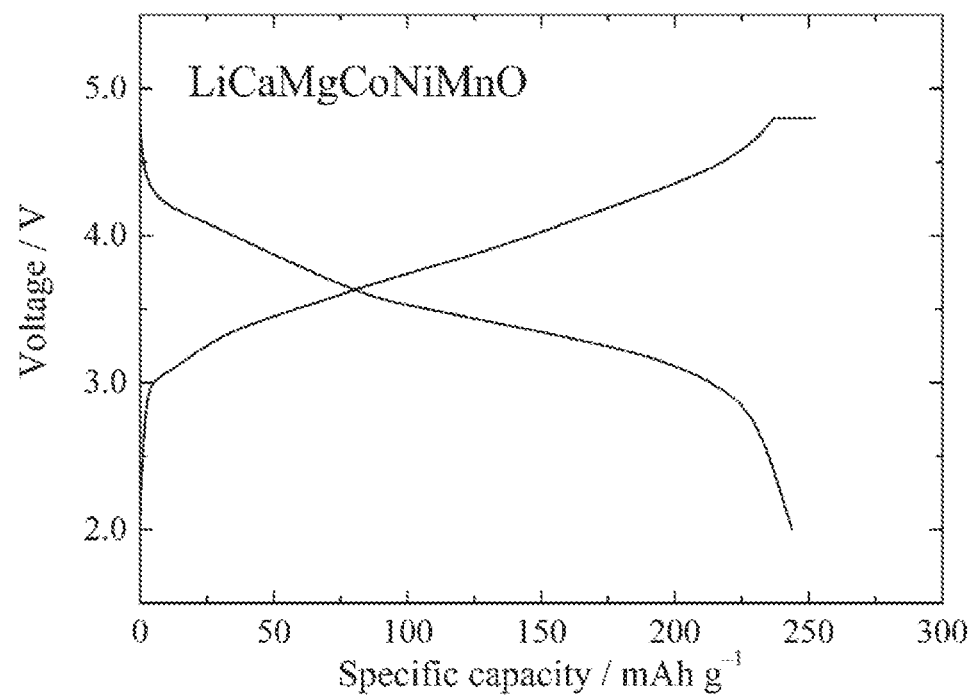
FIG. 32                                    PRIOR ART
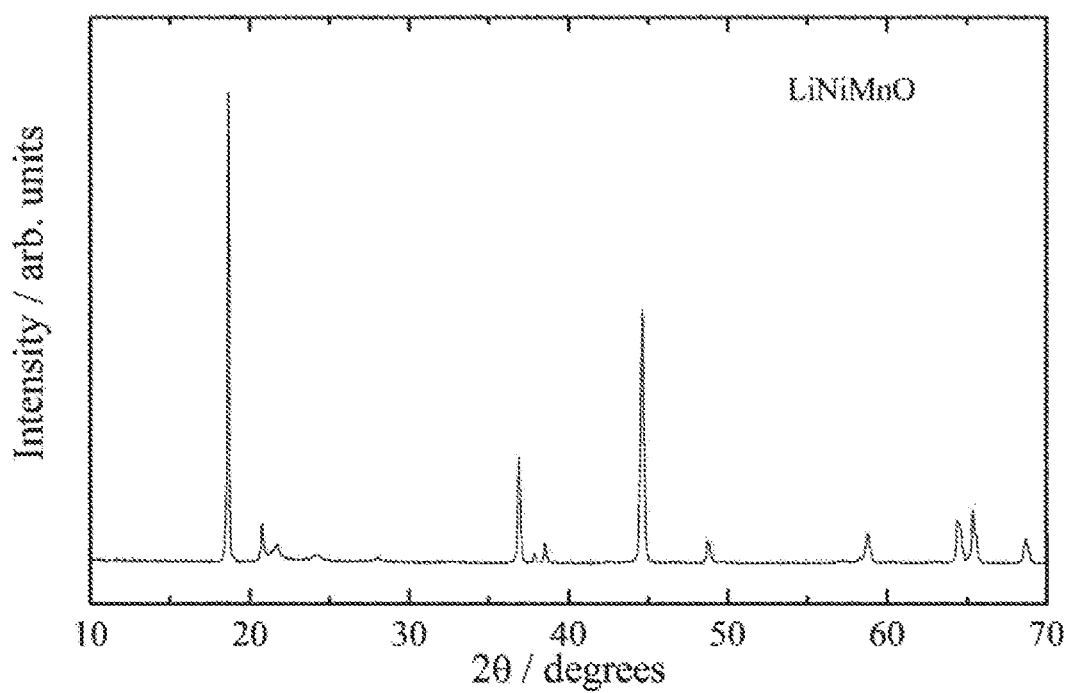

FIG. 41  PRIOR ART
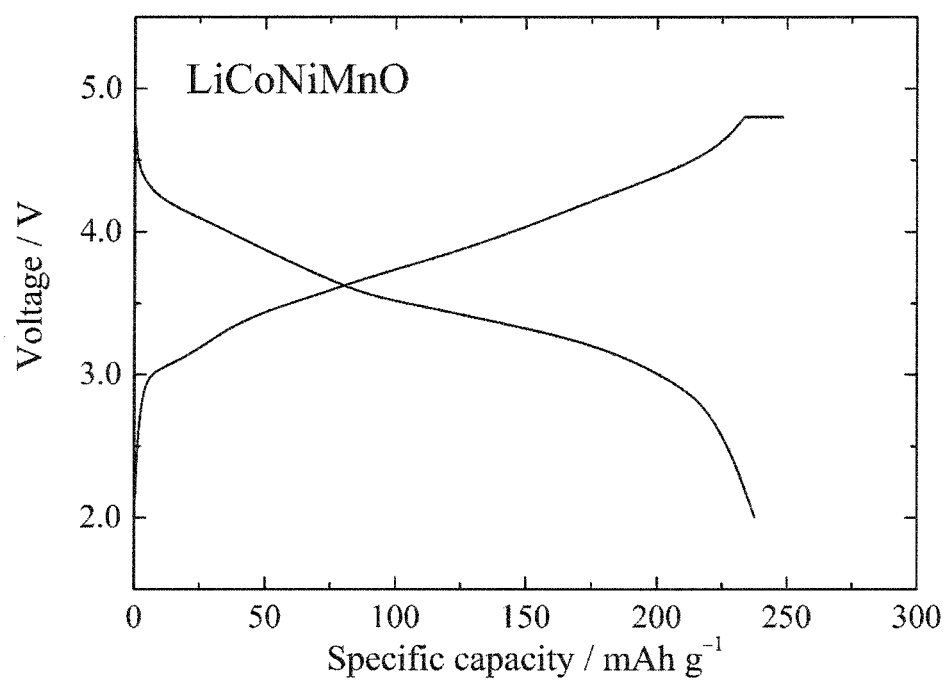
FIG. 42  PRIOR ART
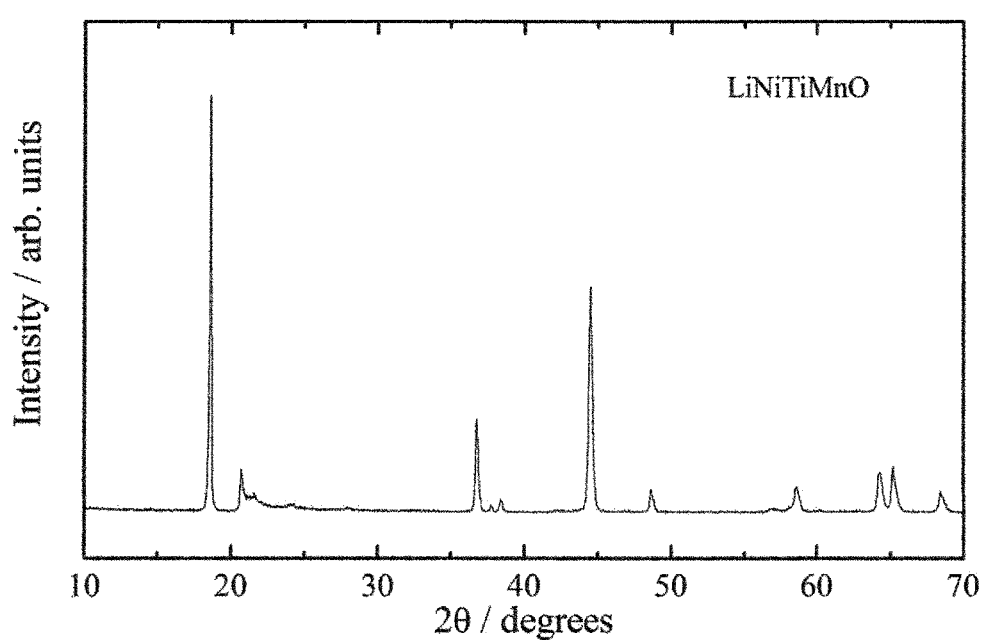

CATHODE MATERIAL AND LITHIUM SECONDARY BATTERY USING SAME AS CATHODE

CROSS-REFERENCE TO RELATED APPLICATIONS

The present application is a 35 U.S.C. §§ 371 national phase conversion of PCT/JP2016/065059, filed May 20, 2016, which claims priority to Japanese Patent Application No. 2015-104962, filed May 22, 2015, the contents of which are incorporated herein by reference. The PCT International Application was published in the Japanese language.

TECHNICAL FIELD

The present invention relates to a high-capacity cathode material, and a lithium secondary battery which uses that cathode material for the cathode.

BACKGROUND ART

Because lithium secondary batteries have higher energy densities compared with other secondary batteries such as nickel-cadmium batteries and nickel-hydrogen batteries and they can be operated at higher potentials, they are widely used as power sources for small information devices such as mobile telephones and notebook personal computers. Further, in recent years, lithium secondary batteries have been able to be more easily reduced in size and weight, resulting in growing demands for larger scale applications such as hybrid vehicles and electric vehicles, or fixed domestic storage batteries.

All of these lithium secondary batteries include, as the main structural elements, a cathode and an anode containing a material that can reversibly store and release lithium, an electrolyte containing a lithium ion conductor dissolved in a non-aqueous organic solvent, and a separator. Of these structural elements, examples of oxides that are used as the cathode material include lithium cobalt oxide ($LiCoO_2$), lithium manganese oxide ($LiMn_2O_4$), lithium nickel oxide ($LiNiO_2$), and lithium nickel-cobalt-manganese oxide ($LiNi_{1/3}Co_{1/3}Mn_{1/3}O_2$).

On the other hand, in order to enable more widespread use in large-scale applications, the use of the scarce element cobalt for the cathode material is undesirable from resource and cost perspectives, and a high-capacity cathode material that does not use cobalt as a constituent element would be preferable.

Lithium manganese oxide cathode materials have a voltage of about 3 to 4 V relative to lithium as a result of a lithium extraction/insertion reaction, and materials having various crystal structures have been investigated as cathode materials. Among these materials, spinel lithium manganese oxide $LiMn_2O_4$ has a potential plateau in the region of 4 V relative to lithium, and exhibits favorable reversibility of the lithium extraction/insertion reaction, and is consequently currently being used as a practical material. However, the capacity per weight of oxide is only about 100 mA/g, making it unsuitable for high-capacity lithium secondary batteries.

On the other hand, lithium manganese oxide, which has a layered rock-salt structure similar to that of lithium cobalt oxide and the like, has also been investigated as a high-capacity cathode material.

However, it is well known that in the case of lithium manganese oxide, the charge/discharge curves change as the number of charge/discharge cycles increase, and gradually change to charge/discharge curves characteristic of a spinel phase.

In contrast, lithium nickel-titanium-manganese oxide, which has a layered rock-salt structure capable of a high capacity of about 250 mAh/g, has been investigated as a composition having a structure that is resistant to spinelization upon repeated charge/discharge, and it is clear that particularly when the ratio of Ni:Ti:Mn is close to 1:1:8, changes in the charge/discharge curves are small. However, some changes in the charge/discharge curves upon cycling still remain (Patent Document 1, Non-Patent Document 1).

Further, it has been reported that in Ni and Mn-based cathode materials having layered rock-salt structures, the cycle characteristics can be improved by substituting with Mg, Na or Al or the like.

Although these element substitutions have been shown to have some effect in improving the cycle characteristics, reduction in the capacity remains a problem.

On the other hand, among systems having a layered rock-salt structure similar to that of lithium cobalt oxide and the like, lithium nickel-cobalt-manganese oxides or lithium nickel-manganese oxides formed from lithium-excess compositions have also been investigated as high-capacity cathode materials.

Whereas normal layered rock-salt structures have a hexagonal system (trigonal system) space group R-3m crystal structure, layered rock-salt structures having a lithium-excess composition belong to the space group C2/m of a lower symmetry monoclinic system, and in a powder X-ray diffraction pattern using CuKα radiation, yield a diffraction pattern in which the 2θ angle is in a region from 20 to 35 degrees, consistent with this reduction in symmetry. Moreover, in crystal structure analyses using the Rietveld method or the like, analysis can be performed using a crystal structure model in which the lithium occupancy occurs in a transition metal layer.

In particular, lithium nickel-manganese oxide having a lithium-excess composition is expected to yield a high capacity of up to 300 mAh/g, and is therefore being actively investigated (Patent Document 2).

However, it is known that the charge/discharge curves change as the number of charge/discharge cycles increases, gradually approaching the charge/discharge curves characteristic of a spinel phase, and the changes in operating voltage are a practical problem.

In order to address this problem, the synthesis of $Li_xNi_{1/4}Mn_{3/4-y}Ti_yO_2$, in which a portion of the manganese has been substituted with titanium has been reported to have an effect in enhancing the stability of the crystal structure, but although some effect is achieved in terms of the changes in the charge/discharge curves, it has not lead to a fundamental resolution of the problem (Patent Document 3).

These changes in the charge/discharge curves that accompany spinelization cause a reduction in the charge of the lithium layers in the charged state, resulting in increased structural instability, and are therefore thought to be due to the migration of transition metal ions from the transition metal layers.

Accordingly, with only titanium substitution, completely suppressing the changes in the shapes of the charge/discharge curves that accompany cycling is difficult, and therefore by further optimizing the composition of the titanium-substituted material, and introducing a cation having strong chemical bonding into the lithium layers of the layered rock-salt structure, further improvements in the structural stability of the lithium layers are expected.

In accordance with this principle, the substitution of magnesium into lithium manganese-titanium oxides or lithium manganese-iron oxides having lithium-excess compositions has been investigated (Patent Document 4).

As outlined above, among systems having a lithium-excess layered rock-salt structure, which are expected to provide high capacities as cathode materials, for lithium manganese-titanium oxides and lithium manganese-iron oxides, magnesium substitution into the lithium layers of the layered rock-salt structure has been investigated as a way of suppressing changes in the charge/discharge curves that accompany charge/discharge cycling. However, magnesium ions have an ionic radius that is similar to those of transition metal ions and lithium ions, and because substitution occurs in both the lithium layers and the transition metal layers, although some effect can be confirmed in terms of improved reversibility, a problem arises in that this results in a reduction in the capacity. Due to these circumstances, this type of magnesium substitution of lithium-nickel-manganese composite oxides, lithium-nickel-cobalt-manganese composite oxides and lithium-nickel-titanium-manganese composite oxides having lithium-excess layered rock-salt structures has not been investigated.

In general, it is known that when the lithium occupancy of the lithium layers decreases as charging proceeds, the interlayer distance of the lithium layers tends to widen. Accordingly, in the charged state, the substitution of elements having a larger ionic radius, which exhibit an effect with larger interlayer distances, should be effective in suppressing crystal structure change. As a result, substitution using magnesium and calcium, or substitution using only calcium, should be much more effective than substitution using only magnesium, but up until now, the substitution of calcium ions into the lithium layers of a lithium-excess composition has been assumed to be problematic due to the large difference in ionic radii, and therefore there are no reports of such substitution in the existing literature.

Moreover, it is also well known that in material systems having a lithium-excess composition, during the initial charging reaction, in addition to the extraction reaction of lithium from interlayer spaces, oxygen extraction and migration of transition metals through the crystal structure also occur (Non-Patent Document 4).

This oxygen extraction reaction is known to generate a potential plateau at about 4.5 V relative to lithium during initial charging, and because this reaction is necessary for achieving a high capacity, the fact that the irreversible capacity is large, as indicated by a small initial discharge capacity relative to the initial charging capacity, is a practical problem (for example, see the charge curve for the 1st cycle in FIG. 4(c) of Non-Patent Document 2).

Further, even in those cases where a high initial discharge capacity of about 250 mAh/g is obtained, it is known that as cycling is repeated, a change in the crystal structure of the material causes a large decrease in the discharge voltage, and a marked reduction in the capacity also occurs.

Accordingly, when material systems having a lithium-excess composition are used in actual battery systems, electrochemical activation of the electrodes, including this type of crystal structure change and chemical composition change, must be performed, and for example, a stepwise charging method in which the upper limit voltage is increased with each cycle has been proposed (Non-Patent Document 4).

However, even with this stepwise charging method, the upper limit voltage must be set to a high voltage of 4.8 V to achieve high capacity, meaning another problem arises in that, with current battery systems, a measure for suppressing oxidative decomposition of the electrolyte is also required.

Accordingly, rather than requiring this type of electrode electrochemical activation method, synthesis of a material for which an oxygen extraction reaction and crystal structure change do not occur following material synthesis, or can be suppressed as far as possible, would not require the steps associated with the electrochemical activation treatment, which would be very desirable.

CITATION LIST

Patent Documents

Patent Document 1: Japanese Unexamined Patent Application, First Publication No. 2012-209242
Patent Document 2: Japanese Patent (Granted) Publication No. 5024359
Patent Document 3: Japanese Unexamined Patent Application, First Publication No. 2007-257885
Patent Document 4: Japanese Unexamined Patent Application, First Publication No. 2013-100197

Non-Patent Documents

Non-Patent Document 1: N. Ishida, H. Hayakawa, H. Shibuya, J. Imaizumi, J. Akimoto, Journal of Power Sources, 244, 505 to 509 (2013)
Non-Patent Document 2: T. Ohzuku, M. Nagayama, K. Tsuji, K. Ariyoshi, Journal of Materials Chemistry, 21, 10179 to 10188 (2011)
Non-Patent Document 3: S. Yamamoto, H. Noguchi, W. Zhao, Journal of Power Sources, 278, 76 to 86 (2015)
Non-Patent Document 4: A. Ito, D. Li, Y. Ohsawa, Y. Sato, Journal of Power Sources, 183, 344 to 348 (2008)

SUMMARY OF THE INVENTION

Problems to be Solved by the Invention

The present invention has been developed in light of these circumstances, and has an object of providing a novel composite oxide having a layered rock-salt structure with a lithium-excess composition which, when used as the cathode active material of a lithium secondary battery, is capable of high capacity and exhibits little change in the discharge curve upon cycling, or can be expected to provide that type of performance. Further, another object of the present invention is to provide a cathode material having a layered rock-salt structure with a lithium-excess composition for use in a lithium secondary battery, wherein the cathode material is capable of high capacity and exhibits little change in the discharge curve upon cycling, or can be expected to provide that type of performance. Moreover, another object of the present invention is to provide a lithium secondary battery that uses the above composite oxide or cathode material.

In order to synthesize and provide a material for which an oxygen extraction reaction and crystal structure change do not occur, or can be suppressed as far as possible, the crystal structure must be stabilized by ensuring a high level of crystallinity, and by introducing an alkaline earth metal element typified by magnesium or calcium into the structure as an element that is capable of forming a powerful chemical bond of high covalency with oxygen, thereby simply suppressing oxygen extraction, the occurrence of an oxygen extraction reaction during charging can suppressed, the arrangement of oxygen atoms in the crystal structure is maintained, and the migration of transition metal atoms that accompanies charging and discharging can be suppressed.

In this description, the expression that the "arrangement of oxygen atoms is maintained" means that by enhancing the covalency between oxygen and the cation that bonds to the oxygen, absences do not occur in the atomic arrangement during the charging and discharging reactions, caused by either migration of oxygen atoms within the crystal structure or extraction from the structure, and may mean that the extraction reaction is completely inhibited, or that a stable arrangement is maintained in a state of prepared oxygen deficiency.

Accordingly, substitution of the aforementioned alkaline earth metal elements such as magnesium and calcium into a lithium position is an effective measure for enhancing the covalency. Further, forming a state of oxygen deficiency in advance, by reducing the valence of transition metal elements such as manganese in a reducing atmosphere during synthesis, is an effective technique for ensuring that oxygen extraction does not occur during charging and discharging.

Confirmation as to whether or not the arrangement of oxygen atoms has been able to be maintained can be made by disassembling the battery in the initially charged state, and either performing an XRD measurement of the cathode active material in the charged state, performing a crystal structure analysis using the Rietveld method, or measuring the diffraction pattern by electron diffraction.

Similarly, after repeated charge/discharge cycles, confirmation as to whether or not the arrangement of the transition metal atoms such as nickel and manganese has been maintained, and whether or not the crystal structure has changed to a spinel structure or the like, can be made by disassembling the battery following the charge/discharge cycles, and either performing an XRD measurement of the cathode active material in the charged state, performing a crystal structure analysis using the Rietveld method, or measuring the diffraction pattern by electron diffraction.

In particular, in those cases where spinelization is marked, confirmation can be made of the change in the crystal symmetry from a monoclinic system to a cubic system.

In this description, the expression "lithium-excess composition" is used to describe a compound that adopts a structure in which lithium occupies a portion of sites in a layer occupied by transition metal ions in a layered rock-salt structure.

Accordingly, the number of moles of lithium need not necessarily be in excess beyond the number of moles of other metal ions. Further, the lithium-excess composition of the present invention can be confirmed by measuring a sample by powder X-ray diffraction, and conducting a crystal structure analysis using the powder neutron diffraction data to confirm the long period structure derived from the monoclinic system, and by performing a crystal structure analysis using the Rietveld method to determine the lattice constants. Moreover, the lithium ion occupancy can also be determined quantitatively by using crystal structure analysis to determine the occupancy rate at each site.

Means for Solving the Problems

As a result of intensive investigation, the inventors of the present invention confirmed that a composite oxide $(Li_{1+x-2y}M_y)(Co_zNi_mTi_nMn_{1-m-n})_{1-x}O_2$ (wherein M represents Ca and/or Mg, and within the formula, $0<x\le0.33$, $0<y<0.13$, $0\le z<0.2$, $0<m<0.5$, and $0\le n\le0.25$), obtained by the substitution of calcium and/or magnesium into a lithium-nickel-manganese composite oxide, lithium-nickel-cobalt-manganese oxide or lithium-nickel-titanium-manganese composite oxide having a lithium-excess layered rock-salt structure, could be produced, and also confirmed that in a lithium secondary battery using an electrode prepared using one of these oxides as a cathode active material, the substitution of calcium and/or magnesium meant that in the initial charging reaction (lithium extraction reaction), an oxygen extraction reaction did not occur, arrangement of the oxygen atoms was maintained, and a potential plateau was not observed at about 4.5 V during initial charging, with the potential curve displaying a monotonous increase, and also meant that changes in crystal structure caused by charging and discharging were less likely to occur, resulting in an unexpectedly small reduction in capacity, with a high capacity exceeding 250 mAh/g obtained even in a charge/discharge test with a voltage range from 4.6 V to 2.5 V, and almost no changes in the charge/discharge curves, even upon cycling.

In other words, the present invention provides a lithium-transition metal composite oxide having a lithium-excess layered rock-salt structure, wherein by including calcium and/or magnesium in the chemical composition, the arrangement of oxygen atoms is maintained when the lithium is extracted electrochemically. More specifically, the invention provides the composite oxide described above, wherein when lithium is extracted electrochemically at a potential of at least 4.6 V but not more than 5.0 V, the arrangement of oxygen atoms is maintained.

The above composite oxide has crystallinity, and has a layered rock-salt structure belonging to the monoclinic system, and by including calcium and/or magnesium in the crystal structure, the chemical bonding to oxygen becomes more powerful, meaning that when the lithium is extracted electrochemically, the arrangement of the oxygen atoms can be maintained.

The above composite oxide is a composite oxide in which calcium and/or magnesium has been substituted into a lithium-transition metal composite oxide, and is represented by a chemical formula $(Li_{1+x-2y}M_y)(Co_zNi_mTi_nMn_{1-m-n})_{1-x}O_2$ (wherein M represents Ca and/or Mg, and within the formula, $0<x\le0.33$, $0<y<0.13$, $0\le z<0.2$, $0<m<0.5$, and $0\le n\le0.25$).

Further, the present invention also provides a cathode active material for a lithium secondary battery that is formed from the above composite oxide.

The cathode active material described above is a cathode active material for a lithium secondary battery which, when subjected to an initial charging reaction at up to 4.8 V, is able to maintain the arrangement of oxygen atoms, with no oxygen extraction reaction occurring, and which has an initial charge curve that exhibits no potential plateau within the voltage range from at least 4.4 V to not more than 4.7 V, with the charge curve displaying a monotonous increase.

The cathode active material described above is a cathode active material for a lithium secondary battery for which no change to a spinel structure appears upon charge/discharge cycling.

Moreover, the present invention also provides a lithium secondary battery having a cathode, an anode, a separator and an electrolyte, wherein the cathode contains, as a cathode active material, a composite oxide prepared by substituting calcium and/or magnesium into a lithium-transition metal composite oxide having a lithium-excess layered rock-salt structure.

Further, the present invention also provides a lithium secondary battery having a cathode, an anode, a separator and an electrolyte, wherein the cathode contains a lithium-transition metal composite oxide having a lithium-excess layered rock-salt structure, and the charge/discharge capacity of the cathode material is at least 250 mAh/g.

In other words, the present invention has the following aspects.

(1) A composite oxide containing lithium, at least one of calcium and magnesium, and nickel and manganese, and having a lithium-excess layered rock-salt structure.
(2) The composite oxide according to (1), wherein when lithium is extracted electrochemically at a potential of at least 4.6 V but not more than 5.0 V, the arrangement of oxygen atoms is maintained.
(3) The composite oxide according to (1) or (2), having a layered rock-salt structure belonging to the monoclinic system.
(4) The composite oxide according to any one of (1) to (3), represented by a chemical formula $(Li_{1+x-2y}M_y)(Co_zNi_m Ti_nMn_{1-m-n})_{1-x}O_2$ (wherein M represents Ca and/or Mg, and x, y, z, m and n are numbers that satisfy $0<x\leq0.33$, $0<y<0.13$, $0\leq z<0.2$, $0<m<0.5$ and $0\leq n\leq0.25$ respectively).
(5) The composite oxide according to any one of (1) to (3), represented by a chemical formula $(Li_{1+x-2y}M_y)(Co_zNi_m Ti_nMn_{1-m-n})_{1-x}O_2$ (wherein M represents Ca and/or Mg, and x, y, z, m and n are numbers that satisfy $0.20\leq x\leq0.28$, $0<y<0.03$, $0\leq z<0.2$, $0.1<m<0.3$ and $0\leq n\leq0.2$ respectively).
(6) The composite oxide according to any one of (1) to (3), represented by a chemical formula $(Li_{1+x-2y}M_y)(Co_zNi_mMn_{1-m})_{1-x}O_2$ (wherein M represents Ca and/or Mg, and x, y, z and m are numbers that satisfy $0.20\leq x\leq0.28$, $0<y<0.03$, $0\leq z<0.2$ and $0.1<m<0.2$ respectively).
(7) The composite oxide according to any one of (1) to (3), represented by a chemical formula $(Li_{1+x-2y}M_y)(Ni_mMn_{1-m})_{1-x}O_2$ (wherein M represents Ca and/or Mg, and x, y and m are numbers that satisfy $0.20\leq x\leq0.28$, $0<y<0.03$ and $0.2<m<0.3$ respectively).
(8) The composite oxide according to any one of (1) to (3), represented by a chemical formula $(Li_{1+x-2y}M_y)(Ni_m Ti_nMn_{1-m-n})_{1-x}O_2$ (wherein M represents Ca and/or Mg, and x, y, m and n are numbers that satisfy $0.20\leq x\leq0.28$, $0<y<0.03$, $0.1<m<0.3$ and $0\leq n\leq0.2$ respectively).
(9) A cathode active material for a lithium secondary battery, the active material containing the composite oxide according to any one of (1) to (8).
(10) The cathode active material for a lithium secondary battery according to (9), wherein when an initial charging reaction is performed within the voltage range from at least 4.4 V to not more than 4.7 V, the arrangement of oxygen atoms is maintained, and the charge curve exhibits a monotonous increase in the potential.
(11) The cathode active material for a lithium secondary battery according to (9), wherein the cathode active material has a high capacity, and is able to maintain the arrangement of transition metal atoms upon charge/discharge cycling.
(12) A lithium secondary battery having a cathode, an anode, a separator and an electrolyte, wherein the cathode contains the cathode active material for a lithium secondary battery according to any one of (9) to (11).
(13) The lithium secondary battery according to (12), wherein the charge/discharge capacity of the lithium secondary battery per unit of weight of the composite oxide of the cathode active material is at least 250 mAh/g but not more than 300 mAh/g.

Effects of the Invention

According to the present invention, a composite oxide containing calcium and/or magnesium substituted into a lithium-transition metal composite oxide having a lithium-excess layered rock-salt structure can be produced, and in a lithium secondary battery that uses this composite oxide as a cathode active material, there is no potential plateau at about 4.5 V caused by an oxygen extraction reaction during initial charging, the charge curve exhibits a monotonous increase in the potential, and a combination of high capacity and highly reversible charge/discharge characteristics with little change in the discharge curve upon cycling can be achieved [for example, the maximum discharge capacity is at least 240 mAh/g (and preferably 250 mAh/g or higher), the discharge capacity after 4 cycles of maximum discharge capacity, reported as a capacity retention rate relative to the initial maximum discharge capacity, is at least 95% (and preferably 97% or higher), and the average discharge potential (V) (calculated by dividing the discharge energy density (mWh/g) from each cycle by the discharge capacity (mWh/g)), reported as a potential retention rate relative to the average discharge potential at maximum discharge capacity is at least 98% (and preferably 99% or higher).

BRIEF DESCRIPTION OF THE DRAWINGS

FIG. 31 illustrates charge/discharges curves for the 7th cycle of a charge/discharge test performed across a voltage range of 4.8 to 2.0 V for a lithium secondary battery containing the lithium-calcium-magnesium-cobalt-nickel-manganese composite oxide of the present invention obtained in Example 12 as a cathode active material.

FIG. 32 is an X-ray powder diffraction pattern for a conventional lithium-nickel-manganese composite oxide obtained in Comparative Example 1.

FIG. 41 illustrates charge/discharges curves for the 6th cycle of a charge/discharge test performed across a voltage range of 4.8 to 2.0 V for a lithium secondary battery containing the conventional lithium-nickel-manganese composite oxide obtained in Comparative Example 4 as a cathode active material.

FIG. 42 is an X-ray powder diffraction pattern for a lithium-nickel-titanium-manganese composite oxide obtained in Comparative Example 5.

EMBODIMENTS FOR CARRYING OUT THE INVENTION

Figure 1:
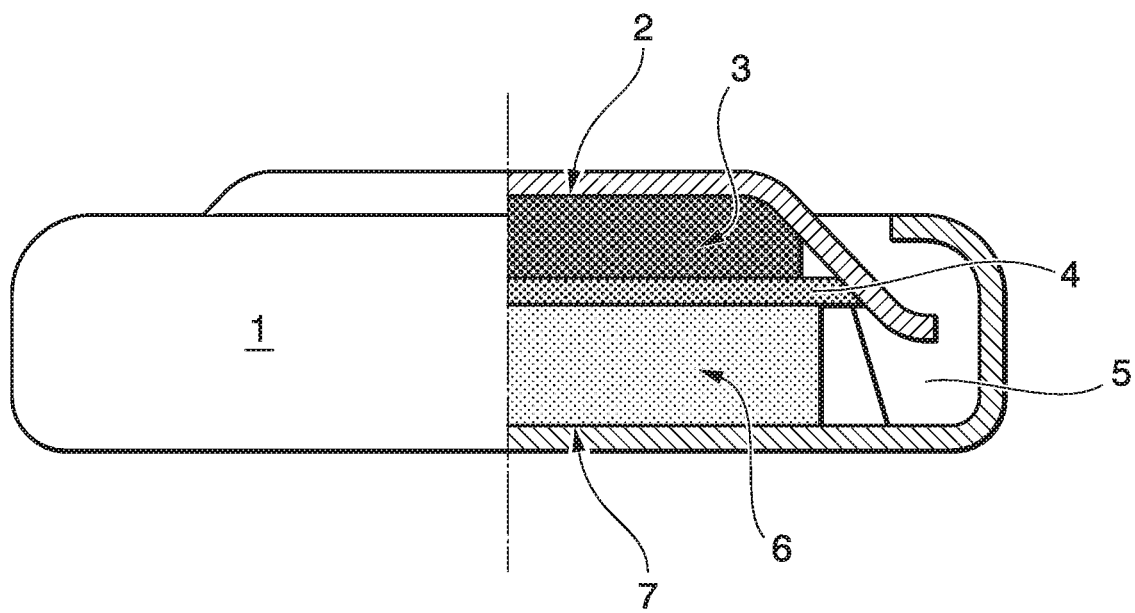
FIG. 1 is a schematic view illustrating one example of a lithium secondary battery.

As a result of intensive investigation of the chemical composition of high-capacity cathode materials having a lithium-excess layered rock-salt structure, with the aims of achieving even higher capacity, and minimizing the changes in shapes of the charge/discharge curves that accompany charge/discharge cycling, the inventors of the present invention discovered that composite oxides containing lithium (sometimes abbreviated as Li), at least one of calcium (sometimes abbreviated as Ca) and magnesium (sometimes abbreviated as Mg), and also containing nickel (sometimes abbreviated as Ni) and manganese (sometimes abbreviated as Mn), and having a lithium-excess layered rock-salt structure, and more specifically composite oxides containing calcium and/or magnesium within the crystals of a lithium-nickel-manganese composite oxide, lithium-nickel-cobalt-manganese composite oxide or lithium-nickel-titanium-manganese composite oxide having a lithium-excess layered rock-salt structure $(Li_{1+x-2y}M_y)(Co_zNi_mTi_nMn_{1-m-n})_{1-x}O_2$ (wherein M represents Ca and/or Mg, and x, y, z, m and n are numbers that satisfy $0<x\leq0.33$, $0<y<0.13$, $0\leq z<0.2$, $0<m<0.5$ and $0\leq n\leq0.25$ respectively) could be produced, and they were therefore able to complete the present invention.

In this description, the expression "calcium and/or magnesium" means at least one of calcium and magnesium, namely either one or both of calcium and magnesium.

Further, the inventors also discovered that in a lithium secondary battery that used an electrode prepared using this composite oxide as a cathode active material, a potential plateau at about 4.5 V caused by an oxygen extraction reaction does not occur during the initial charging reaction, and a charge curve in which the potential increased monotonously in the voltage range from at least 4.4 V to not more than 4.7 V is observed, indicating that a combination of high capacity and highly reversible charge/discharge characteristics with little change in the discharge curve upon cycling can be achieved.

In this description, the expression that "a potential plateau at about 4.5 V does not occur" means that during the initial charging reaction, in the range from 4.4 V to 4.7 V, the change in specific capacity at each voltage is always a positive value.

Based on the fact that the maximum capacity per unit weight of conventional cathode active materials is 200 mAh/g, the term "high-capacity" means a capacity of at least 200 mAh/g, and preferably a capacity greater than 200 mAh/g. Further, in terms of an upper limit for the capacity, the theoretical capacity of a lithium-nickel-manganese oxide $Li_{1.2}Ni_{0.2}Mn_{0.6}O_2$ having a lithium-excess layered rock-salt structure, in the case where all of the lithium within the structure is utilized in the charge/discharge reaction, is 378 mAh/g.

The expression that "the arrangement of transition metal atoms is maintained upon charge/discharge cycling" means that in a constant-current charge/discharge test performed with a charge/discharge lower limit cutoff voltage of at least 2.0 V, and an upper limit cutoff voltage of at least 4.5V but not more than 5.0 V, even when at least 10 cycles but not more than 50 cycles of the charge/discharge cycle are performed, there is no change in the arrangement of the transition metal atoms within the crystal structure of the composite oxide, and no change of the structure to a spinel structure, meaning any deterioration in the capacity and discharge voltage can be suppressed.

The magnesium incorporated in the crystal structure of the composite oxide is thought to substitute into both the transition metal layers and the lithium metal layers of the composite oxide, but because calcium has an ionic radius that is significantly larger than the transition metals, it is thought that calcium is not substituted into the transition metal layers, but is rather substituted into only the lithium layers. Further, even if excess magnesium and/or calcium oxides exist as impurities, they have no effect on the battery reactions, and are therefore permitted.

The effects of the calcium and/or magnesium substitution include maintaining a broad interlayer distance for the lithium layers even when the ions in the lithium layers diminish during charging, thereby impeding the migration of transition metal ions from the transition metal layers, as well as a role in stabilizing the interlayer structure of the lithium layers.

In one aspect of the present invention, in a lithium secondary battery that uses a cathode that has been produced using, as an active material, not a conventional lithium-transition metal composite oxide, lithium-nickel-manganese composite oxide, lithium-nickel-cobalt-manganese composite oxide or lithium-nickel-titanium-manganese composite oxide having a lithium-excess layered rock-salt structure, but rather a composite oxide of the present invention such as a lithium-transition metal composite oxide that has been substituted with calcium and/or magnesium, a lithium-nickel-manganese composite oxide that has been substituted with calcium and/or magnesium, a lithium-nickel-cobalt-manganese composite oxide that has been substituted with calcium and/or magnesium, or a lithium-nickel-titanium composite oxide that has been substituted with calcium and/or magnesium, an oxygen extraction reaction does not occur during the initial charging reaction, the arrangement of the oxygen atoms can be maintained, a potential plateau at about 4.5 V does not occur, with the charge curve exhibiting a monotonous increase in the potential, a discharge capacity exceeding 250 mAh/g is obtained, and a change to a spinel structure upon charge/discharge cycling is not observed.

The calcium and/or magnesium substitution according to the present invention may be performed in any lithium-transition metal composite oxide having a lithium-excess layered rock-salt structure, is not limited to lithium-nickel-manganese composite oxides, and for example may also be performed using other composite oxides such as lithium-cobalt-nickel-manganese composite oxides and lithium-nickel-titanium-manganese composite oxides.

Specific examples of composite oxides represented by the compositional formula $(Li_{1+x-2y}M_y)(Co_zNi_mTi_nMn_{1-m-n})_{1-x}O_2$ (wherein M represents Ca and/or Mg, and x, y, z, m and n are numbers that satisfy $0<x\leq0.33$, $0<y<0.13$, $0\leq z<0.2$, $0<m<0.5$ and $0\leq n\leq0.25$ respectively) and having a lithium-excess layered rock-salt structure include composite oxides represented by one of the following compositional formulas:

$Li_{1.23}Ca_{0.01}Ni_{0.19}Mn_{0.56}O_2$,
$Li_{1.24}Mg_{0.01}Ni_{0.19}Mn_{0.56}O_2$,
$Li_{1.22}Ca_{0.005}Mg_{0.005}Ni_{0.19}Mn_{0.57}O_2$,
$Li_{1.23}Ca_{0.01}Co_{0.14}Ni_{0.13}Mn_{0.49}O_2$,
$Li_{1.22}Mg_{0.01}Co_{0.14}Ni_{0.12}Mn_{0.50}O_2$, or
$Li_{1.22}Ca_{0.005}Mg_{0.005}Co_{0.14}Ni_{0.13}Mn_{0.49}O_2$, and having a lithium-excess layered rock-salt structure.

A method for producing a composite oxide according to the present invention, containing lithium, at least one of calcium and magnesium, and nickel and manganese, and having a lithium-excess layered rock-salt structure, or in other words, a composite oxide obtained by substituting calcium and/or magnesium into the lithium layer of a lithium-nickel-manganese composite oxide, lithium-cobalt-manganese oxide or lithium-nickel-titanium-manganese composite oxide having a lithium-excess layered rock-salt structure, or more specifically a composite oxide represented by a compositional formula $(Li_{1+x-2y}M_y)(Co_zNi_mTi_nMn_{1-m-n})_{1-x}O_2$ (wherein M represents Ca and/or Mg, and x, y, z, m and n are numbers that satisfy $0<x\leq0.33$, $0<y<0.13$, $0\leq z<0.2$, $0<m<0.5$ and $0\leq n\leq0.25$ respectively) and having a lithium-excess layered rock-salt structure is described below in detail.

(Synthesis of calcium- and/or magnesium-substituted lithium-nickel-manganese composite oxide, lithium-nickel-cobalt-manganese oxide or lithium-nickel-titanium-manganese composite oxide $(Li_{1+x-2y}M_y)(Co_zNi_mTi_nMn_{1-m-n})_{1-x}O_2$ (wherein M represents Ca and/or Mg, and x, y, z, m and n are numbers that satisfy $0<x\leq0.33$, $0<y<0.13$, $0\leq z<0.2$, $0<m<0.5$ and $0\leq n\leq0.25$ respectively))

Within the present invention, a calcium- and/or magnesium-substituted lithium-nickel-manganese composite oxide, lithium-nickel-cobalt-manganese oxide or lithium-nickel-titanium-manganese composite oxide $(Li_{1+x-2y}M_y)(Co_zNi_mTi_nMn_{1-m-n})_{1-x}O_2$ (wherein M, x, y, z, m and n have the same meanings as described above) can be produced by using, as raw materials, at least one of lithium metal or a lithium compound, at least one of calcium metal, magnesium metal, a calcium compound or a magnesium compound, and at least one of nickel metal or a nickel compound, at least one of cobalt metal or a cobalt compound, at least one of titanium metal or a titanium compound, at least one of manganese metal or a manganese compound, subsequently weighing and mixing these raw materials so as to obtain a chemical composition represented by $(Li_{1+x-2y}M_y)(Co_zNi_mTi_nMn_{1-m-n})_{1-x}O_2$ (wherein M, x, y, z, m and n have the same meanings as described above), and then heating the mixture in an atmosphere in which oxygen gas exists, such as air.

Alternatively, the composite oxide can be produced using, as starting raw materials, two or more compounds containing lithium and calcium and/or magnesium as essential components among components including lithium, calcium and/or magnesium, nickel, cobalt, titanium and manganese, weighing and mixing these raw materials so as to obtain a chemical composition represented by $(Li_{1+x-2y}M_y)(Co_zNi_mTi_nMn_{1-m-n})_{1-x}O_2$ (wherein M, x, y, z, m and n have the same meanings as described above), and then heating the mixture in an atmosphere in which oxygen gas exists, such as air.

At least one of lithium (metallic lithium) and a lithium compound is used as the lithium raw material. There are no particular limitations on the lithium compound, provided it contains lithium, and examples include $Li_2CO_3$, $LiOH \cdot H_2O$, $LiNO_3$, $LiCl$, $Li_2SO_4$, $Li_2O$ and $Li_2O_2$. Alternatively, compounds that already exist in the form of lithium-nickel oxides such as $LiNiO_2$, lithium-titanium oxides such as $Li_2TiO_3$ and $Li_4Ti_5O_{12}$, or lithium-manganese oxides such as $LiMnO_2$ may also be used. Among these, lithium carbonate $Li_2CO_3$ or the like is preferred.

At least one of calcium (metallic calcium), magnesium (metallic magnesium), calcium compound and a magnesium compound is used as the calcium and/or magnesium raw material. There are no particular limitations on the calcium compound, provided it contains calcium, and examples include $CaCl_2$, $CaCO_3$, $CaNO_3 \cdot 4H_2O$ and $CaO$. There are no particular limitations on the magnesium compound, provided it contains magnesium, and examples include $MgCl_2$, $MgC_2O_4$ and $MgO$. Alternatively, compounds that already exist in the form of a calcium-transition metal composite oxide or a magnesium-transition metal composite oxide, such as $CaTiO_3$, $CaMnO_3$, $MgTiO_3$ and $MgMnO_3$, may also be used. Among these, calcium chloride $CaCl_2$ and/or $MgCl_2$ or the like is preferred.

At least one of nickel (metallic nickel) and a nickel compound is used as the nickel raw material. There are no particular limitations on the nickel compound, provided it contains nickel, and examples include $(CH_3COO)_2Ni \cdot 4H_2O$, NiO, NiOH and NiOOH. Alternatively, hydroxides that already exist in the form of manganese-nickel compounds, and hydroxides that exist as manganese-titanium-nickel compounds may also be used. Among these, in terms of exhibiting high reactivity even at low temperature, and enabling easier control of the composition, $(CH_3COO)_2Ni \cdot 4H_2O$ or the like is preferred.

At least one of cobalt (metallic nickel) and a cobalt compound is used as the cobalt raw material. There are no particular limitations on the cobalt compound, provided it contains cobalt, and examples include $(CH_3COO)_2Co \cdot 4H_2O$, $Co_3O_4$, CoOH and CoOOH. Alternatively, hydroxides that already exist in the form of manganese-nickel-cobalt compounds may also be used. Among these, in terms of exhibiting high reactivity even at low temperature, and enabling easier control of the composition, $(CH_3COO)_2Co \cdot 4H_2O$ or the like is preferred.

At least one of titanium (metallic titanium) and a titanium compound is used as the titanium raw material. There are no particular limitations on the titanium compound, provided it contains titanium, and examples include TiO, $Ti_2O_3$, $TiO_2$ and $TiCl_4$. Alternatively, hydroxides that already exist in the form of manganese-titanium compounds may also be used. Among these, anatase $TiO_2$ or the like, which has a large specific surface area as a powder and has high reactivity, is preferred.

At least one of manganese (metallic manganese) and a manganese compound is used as the manganese raw material. There are no particular limitations on the manganese compound, provided it contains manganese, and examples include $MnCO_3$, $MnCl_2$, MnO, $Mn_2O_3$, $Mn_3O_4$, $MnO_2$, MnOH and MnOOH. Among these, $MnCO_3$ or the like is preferred.

First, a mixture containing these compounds is prepared. The compounds are preferably mixed so that the ratio between the various constituent elements satisfies the chemical composition represented by $(Li_{1+x-2y}M_y)(Co_zNi_m Ti_nMn_{1-m-n})_{1-x}O_2$ (wherein M, x, y, z, m and n have the same meanings as described above). The quantitative ratio of the calcium and/or magnesium relative to lithium can be adjusted appropriately in accordance with the stability required for the cycling characteristics, but reducing the amount of lithium leads to a decrease in the capacity, and therefore $0<y<0.13$, and preferably $0<y\leq0.06$. Further, the amount of calcium and magnesium may be altered as appropriate within the range represented by $0<y<0.13$, but in terms of achieving superior structural stability, the molar ratio between calcium and magnesium preferably satisfies $Ca/Mg\geq1$.

Further, there are no particular limitations on the mixing method, provided it is able to uniformly mix the various components, and for example, wet or dry mixing may be performed using a conventional mixer or the like.

Next, the mixture is fired. The firing temperature may be set appropriately depending on the raw materials, but in those cases where compounds such as $(CH_3COO)_2Ni.4H_2O$ and $(CH_3COO)_2Co.4H_2O$ that decompose or melt at low temperature are used as raw materials, the mixture may be first subjected to calcination at 250° C. to 600° C., and then subsequently fired at a maximum temperature of about 750° C. to 1,050° C., and preferably 800° C. to 950° C. Further, there are also no particular limitations on the firing atmosphere, and firing is usually conducted in an oxidizing atmosphere or in the open atmosphere.

Further, in those cases where the time of high-temperature firing is long, or cases where multiple firing repetitions are performed, the lithium may volatilize at high temperature, causing a reduction in the amount of lithium in the chemical composition, and therefore an excess of lithium equivalent to a molar ratio of 0 to 30% is preferably included beyond the target compositional ratio of $(Li_{1+x-2y}M_y)(Co_zNi_m Ti_nMn_{1-m-n})_{1-x}O_2$ (wherein M, x, y, z, m and n have the same meanings as described above), and an excess within a range from 0 to 10% is more preferred. Even if excess lithium is added, crystal structure constraints mean that the amount of lithium cannot exceed the maximum lithium amount of $x=0.33$.

The firing time is preferably adjusted as appropriate in accordance with the firing temperature and the like, but is preferably at least 3 hours but not more than 24 hours, and is more preferably at least 8 hours but not more than 20 hours. There are also no particular limitations on the subsequent cooling method, but usually natural cooling (by standing in the furnace) or gradual cooling is preferred.

Following firing, the fired product may be ground using a conventional method if necessary, and may be subjected to 1 to 5 repetitions of the above firing step with appropriate adjustment of the maximum temperature. The degree of grinding may be adjusted as appropriate in accordance with the firing temperature and the like.

(Lithium Secondary Battery)

A lithium secondary battery of the present invention uses a compound represented by $(Li_{1+x-2y}M_y)(Co_zNi_mTi_n Mn_{1-m-n})_{1-x}O_2$ (wherein M, x, y, z, m and n have the same meanings as described above) as an active material, and uses a cathode containing at least 50% by weight but not more than 100% by weight of this active material, relative to the total weight of the cathode mixture, as a structural member of the battery. In other words, with the exception of using the calcium- and/or magnesium-substituted lithium-transition metal composite oxide of the present invention as the cathode activate material, the lithium secondary battery of the present invention can employ the same battery elements as a conventional lithium battery (such as a coin battery, button battery, cylindrical battery or all-solid battery). FIG. 1 is a schematic view illustrating one example of the lithium secondary battery of the present invention applied to a coin-type lithium secondary battery. This coin-type battery 1 includes an SUS anode terminal 2, an anode 3 that uses metallic lithium, a separator 4 composed of a microporous membrane of polypropylene (containing an electrolytic solution obtained by dissolving a 1 M $LiPF_6$ electrolyte in a solvent prepared by mixing ethylene carbonate and diethyl carbonate in a volume ratio of 1:1), insulation packing 5 formed from a polypropylene, a cathode 6 formed from an active material of the present invention, and an SUS cathode can 7.

In the present invention, conductive agents and binding agents and the like may be added as necessary to the aforementioned composite oxide active material of the present invention to prepare the cathode mixture, and the cathode can then be produced by crimping this cathode material to a current collector. Examples of materials that can be used favorably as current collectors include stainless steel mesh, aluminum mesh and aluminum foil. Examples of materials that can be used favorably as conductive agents include acetylene black and ketjen black. Examples of materials that can be used favorably as binding agents include tetrafluoroethylene and poly(vinylidene fluoride).

There are no particular limitations on the blend of the calcium- and/or magnesium-substituted lithium-nickel-manganese composite oxide, lithium-nickel-cobalt-manganese composite oxide or lithium-nickel-titanium-manganese composite oxide, the conductive agent and the binding agent in the cathode mixture, but the lithium composite oxide active material of the present invention typically represents about 50 to 95% by weight (and preferably 80 to 90% by weight) of the total weight of the cathode mixture, with the conductive agent representing about 1 to 50% by weight (and preferably 3 to 48% by weight), and the binding agent representing 0 to 30% by weight (and preferably 2 to 15% by weight). The total of the lithium composite oxide active material, the conductive agent and the binding agent cannot exceed 100% by weight.

In the lithium secondary battery of the present invention, the counter electrode to the aforementioned cathode may employ a conventional electrode that functions as an anode and is capable of storing and releasing lithium, such as metallic lithium, lithium alloys, carbon-based materials such as graphite and MCMB (mesocarbon microbeads), and oxide materials such as lithium-titanium oxides.

Further, in the lithium secondary battery of the present invention, a conventional battery element may be used as the separator, and examples of materials that can be used include porous polyethylene films and polypropylene films.

Moreover, a conventional electrolytic solution or solid electrolyte or the like can be used as the electrolyte. Examples of electrolytic solutions that can be used include solutions prepared by dissolving an electrolyte such as lithium perchlorate or lithium hexafluorophosphate in a solvent such as ethylene carbonate (EC), dimethyl carbonate (DMC), propylene carbonate (PC) or diethyl carbonate (DEC).

EXAMPLES

The features of the present invention are further clarified below using a series of examples. However, the present invention is in no way limited by these examples.

Example 1

Lithium-Calcium-Nickel-Manganese Composite Oxide Having Lithium-Excess Layered Rock-Salt Structure (Compositional Formula: $Li_{1.23}Ca_{0.01}Ni_{0.19}Mn_{0.56}O_2$)

Powders of lithium carbonate ($Li_2CO_3$, manufactured by Rare Metallic Co., Ltd., purity: 99.99%), calcium chloride ($CaCl_2$, manufactured by Kojundo Chemical Laboratory Co., Ltd., purity: at least 99.9%), nickel acetate tetrahydrate (($CH_3COO)_2Ni \cdot 4H_2O$, manufactured by Wako Pure Chemical Industries, Ltd Wako special grade) and manganese carbonate ($MnCO_3$, manufactured by Kojundo Chemical Laboratory Co., Ltd., purity: 99.9%) were weighed so as to achieve an atomic ratio of Li:Ca:Ni:Mn=1.8:0.02:0.25:0.75. These powders were subjected to wet mixing in a mortar using ethanol as a medium, the resulting mixture was placed in a model C3 alumina crucible of grade SSA-S manufactured by Nikkato Corporation, and after sealing the crucible with a lid, the crucible was initially heated in the air at 300° C. for 3 hours using a muffle furnace (FP310, manufactured by Yamato Scientific Co., Ltd.). Subsequently, the crucible was left to cool naturally in the electric furnace, the resulting mixture was then subjected to wet grinding using ethanol, and additional heating was then performed at 600° C. for 12 hours, at 800° C. for 12 hours, at 900° C. for 12 hours, and then again at 900° C. for 12 hours, thus obtaining a sample.

Figure 2:
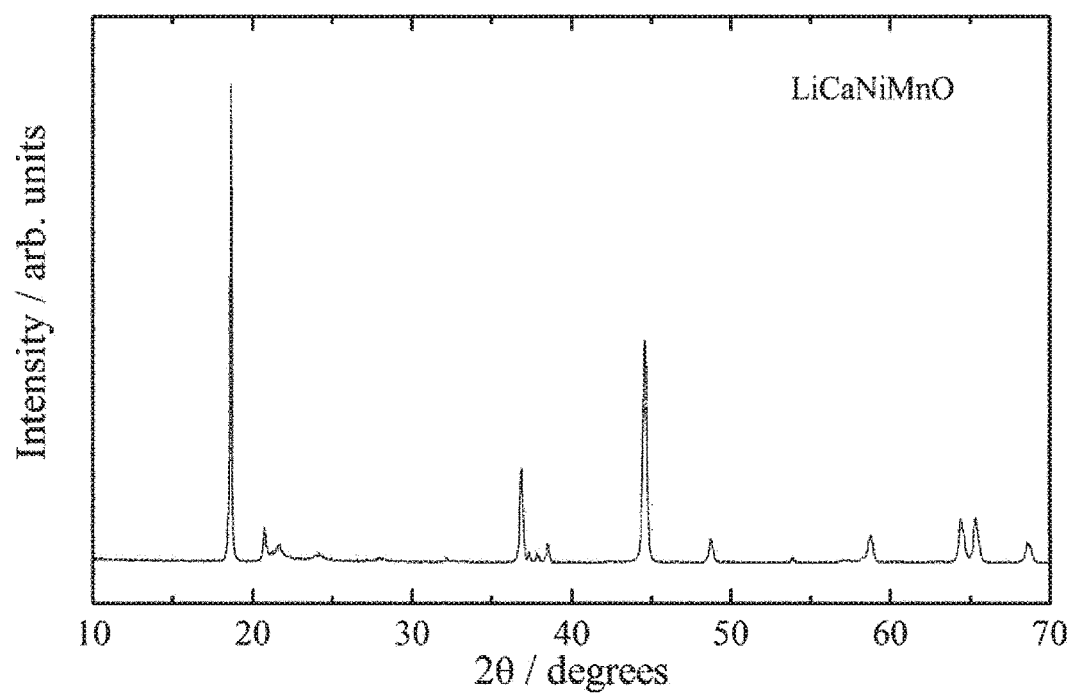
FIG. 2 is an X-ray powder diffraction pattern for a lithium-calcium-nickel-manganese composite oxide of the present invention obtained in Example 1.

When the crystal structure of the lithium-calcium-nickel-manganese composite oxide obtained in the manner described above was investigated using a powder X-ray diffractometer (product name: RINT 2550V, manufactured by Rigaku Corporation), it was clear that the main phase was a layered rock-salt structure belonging to the monoclinic system, having favorable crystallinity and exhibiting the features of a lithium-excess composition. The powder X-ray diffraction pattern is shown in FIG. 2. Peaks attributable to the monoclinic system were observed from 20° to 35°, and the lithium-excess composition was confirmed. Further, when the method of least squares was used to refine the lattice constants for the hexagonal system that represented the average structure, the following values were obtained, and the lithium-excess layered rock-salt structure was also confirmed on the basis of these lattice constants.

$a$=2.8531 Å±0.0002 Å

$c$=14.242 Å±0.002 Å

$V$=100.40±0.01 Å$^3$

Moreover, a crystal structure analysis was performed using the Rietveld method (using the program: RIETAN-FP), and when the lattice constants were refined assuming a space group C2/m, the following values were obtained, and the lithium-excess layered rock-salt structure was also confirmed on the basis of these lattice constants.

$a$=4.9427 Å±0.0008 Å

$b$=8.5561 Å±0.0009 Å

$c$=5.0280 Å±0.0004 Å

$\beta$=109.274°±0.009°

$V$=200.72±0.04 Å$^3$

Figure 3:
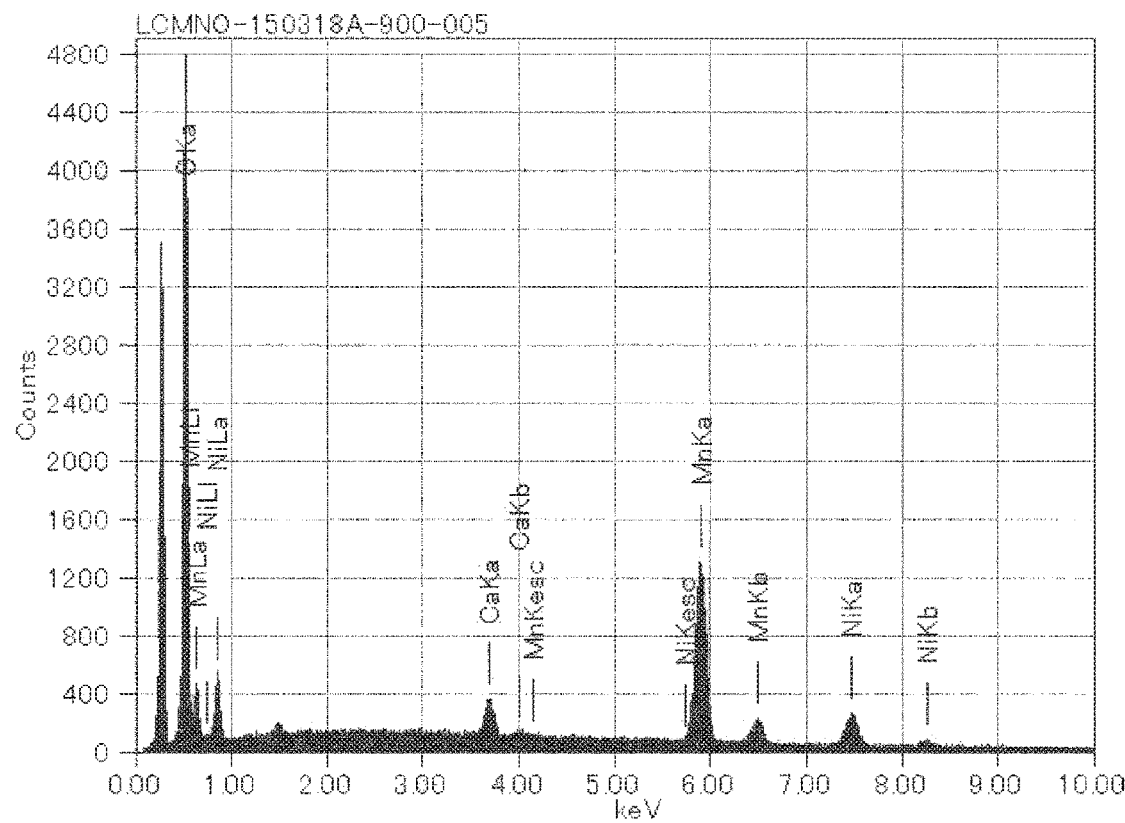
FIG. 3 is an EDS spectrum obtained by chemical composition analysis of the lithium-calcium-nickel-manganese composite oxide of the present invention obtained in Example 1.

Further, when the chemical composition was investigated using a scanning electron microscope (product name: JCM-6000, manufactured by JEOL Ltd.), the powdered particles were confirmed as containing calcium, nickel and manganese, and the compositional ratio within the entire powder sample was found to be Ca:Ni:Mn=0.02:0.25:0.75 (m=0.25). The SEM-EDS spectrum is shown in FIG. 3.

Moreover, a chemical analysis was performed by ICP analysis (product name: P-4010, manufactured by Hitachi, Ltd.), and the molar ratio of the sample was found to be Li:Ca:Ni:Mn=1.64:0.02:0.25:0.75. When these values were applied to the general formula $(Li_{1+x-2y}M_y)(Co_zNi_mTi_nMn_{1-m-n})_{1-x}O_2$ (wherein M represents Ca and/or Mg, and within the formula, $0<x \leq 0.33$, $0<y<0.13$, $0 \leq z<0.2$, $0<m<0.5$, and $0 \leq n \leq 0.25$), it was confirmed that x=0.25, y=0.01, z=0, m=0.25 and n=0. Further, no aluminum or silicon or the like derived from the crucible material was detected.

(Lithium Secondary Battery)

The thus obtained lithium-calcium-nickel-manganese composite oxide as an active material, acetylene black as a conductive agent and tetrafluoroethylene as a binding agent were mixed together in a weight ratio of 45:45:10 to produce an electrode.

Using this electrode as the working electrode (cathode), and metallic lithium as the counter electrode (anode), a lithium secondary battery (coin-type cell) having the structure illustrated in FIG. 1 was produced using a 1 M solution of lithium hexafluorophosphate dissolved in a mixed solvent (volume ratio of 1:1) of ethylene carbonate (EC) and diethyl carbonate (DEC) as the electrolytic solution, and the charge/discharge characteristics of the battery were measured. Production of the battery was performed in accordance with conventional cell production and assembly methods.

More specifically, the construction of the lithium secondary battery (coin-type cell) involves preparing a laminate by stacking, in order, the aforementioned cathode 6, a separator 4 composed of a microporous membrane of polypropylene containing the above electrolytic solution, the anode 3 composed of metallic lithium, and an SUS anode terminal 2, and then housing this laminate inside the aforementioned cathode can 7, so that the cathode 6 contacts the inside bottom surface of the SUS cathode can 7, and at least a portion of the anode terminal 2 is exposed outside the cathode can 7. The region inside the cathode can 7 around the periphery of the laminate is filled with insulation packing 5 formed from a polypropylene, thus completing formation of a lithium secondary battery having a coin-type cell. When the coin-type cell is placed on a flat surface, the thickness of the coin-type cell in the vertical direction is 3.2 mm, and the diameter is 20 mm. Further, the thicknesses in the vertical direction of the cathode can 7, the cathode 6, the separator 4 composed of the microporous membrane of polypropylene containing the above electrolytic solution, the anode 3 that used metallic lithium, and the SUS anode terminal 2 are 0.25 mm, 0.3 mm, 0.02 mm, 0.2 mm and 0.25 mm respectively, with the remaining space occupied by an SUS wave washer of 1.4 mm and an SUS spacer of 1.0 mm.

Figure 4:
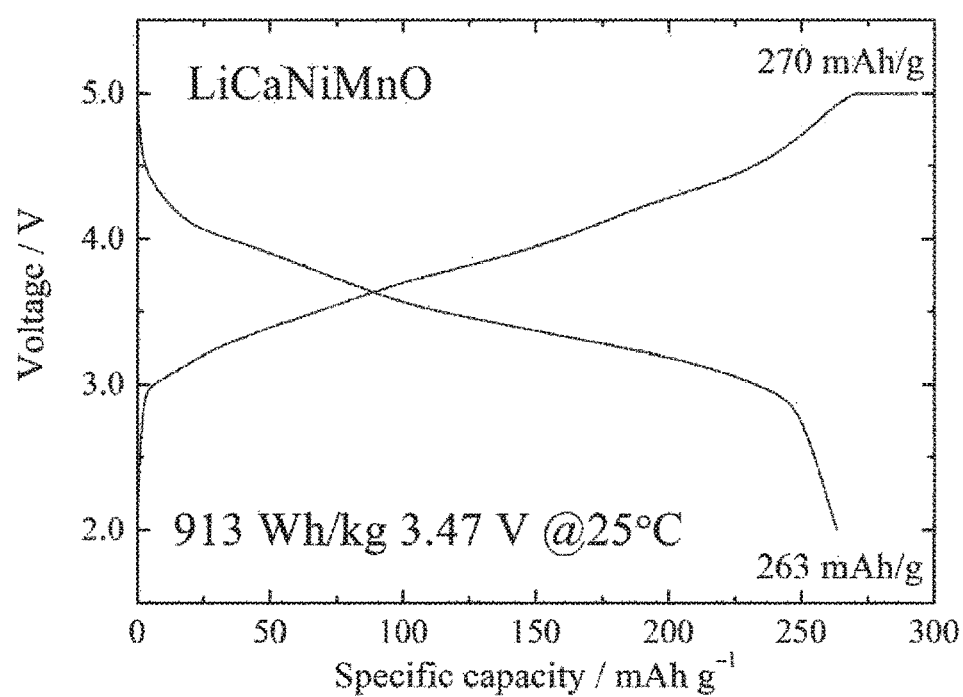
FIG. 4 illustrates charge/discharges curves for the 10th cycle of a charge/discharge test performed across a voltage range of 5.0 to 2.0 V for a lithium secondary battery containing the lithium-calcium-nickel-manganese composite oxide of the present invention obtained in Example 1 as a cathode active material.

The prepared lithium secondary battery was subjected to a constant-current charge/discharge test under temperature conditions of 25° C., using a current density of 10 mA/g and a cutoff potential of 5.0 V to 2.0 V relative to lithium. The results revealed that the capacity increased with each cycle and reached a maximum on the 10th cycle, with a high capacity including a charge capacity of 270 mAh/g and a discharge capacity of 263 mAh/g being obtained for the 10th cycle. In this description, the expression "potential relative to lithium" means the voltage of the battery referenced against the potential of the metallic lithium dissolution-deposition reaction (0 V). Furthermore, based on the energy density of the 10th cycle discharge of 913 Wh/kg, the average discharge potential for the 10th cycle was calculated by dividing the discharge energy density (913 Wh/kg) by the discharge capacity (263 mAh/g), confirming a value of (913÷263=3.47) V. The charge/discharge curves for the 10th cycle are shown in FIG. 4. Moreover, in the discharge curve of the 14th cycle, no decrease in the capacity was noticeable, and the average discharge potential obtained by dividing the discharge energy density by the discharge capacity was 3.44 V, confirming that any decrease in the discharge potential was slight. Based on the above results, it was clear that the lithium-calcium-nickel-manganese composite oxide active material of the present invention was useful as a material for a high-capacity lithium secondary battery.

Figure 5:
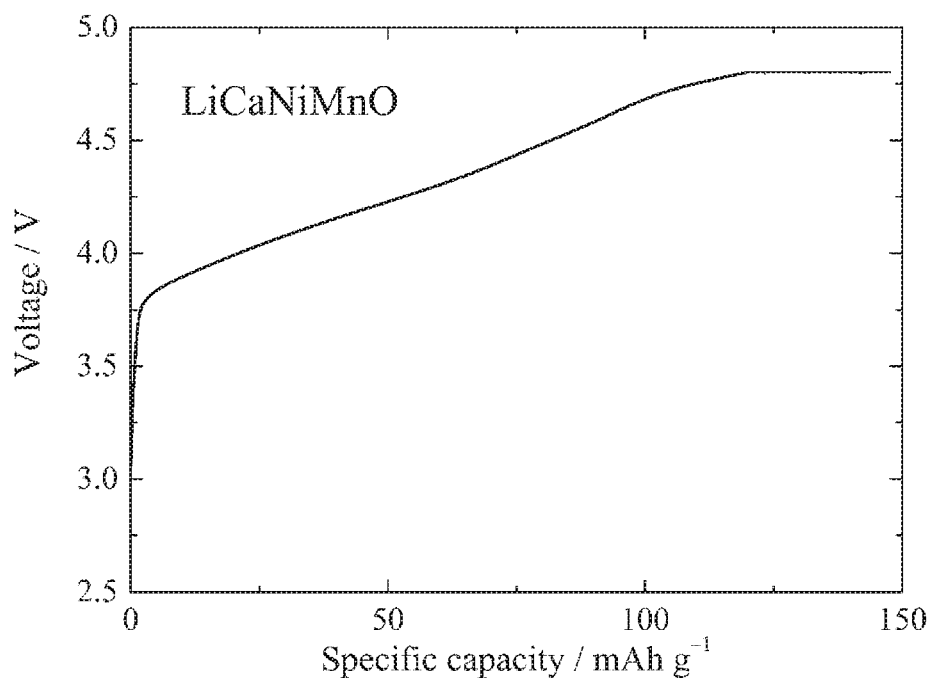
FIG. 5 illustrates a charge curve for the 1st cycle of a charge/discharge test performed across a voltage range of 4.8 to 2.5 V for a lithium secondary battery containing the lithium-calcium-nickel-manganese composite oxide of the present invention obtained in Example 1 as a cathode active material.

Further, a lithium secondary battery prepared under the same conditions was subjected to a constant-current charge/discharge test under temperature conditions of 25° C., using a current density of 10 mA/g and a cutoff potential of 4.8 V to 2.5 V relative to lithium. The results revealed that the charge/discharge capacity increased with each cycle and reached a maximum on the 32nd cycle. The charge curve for the 1st cycle of this charge/discharge test is shown in FIG. 5. The potential plateau at about 4.5 V characteristic of lithium-nickel-manganese composite oxides or lithium-nickel-cobalt-manganese composite oxides having a lithium-excess layered rock-salt structure was not observed, and a charge curve in which the potential increased monotonously was confirmed, indicating clearly that the lithium-calcium-nickel-manganese composite oxide active material of the present invention underwent no oxygen extraction reaction, and was very useful as a high-capacity lithium secondary battery material capable of maintaining the arrangement of the oxygen atoms.

Figure 6:
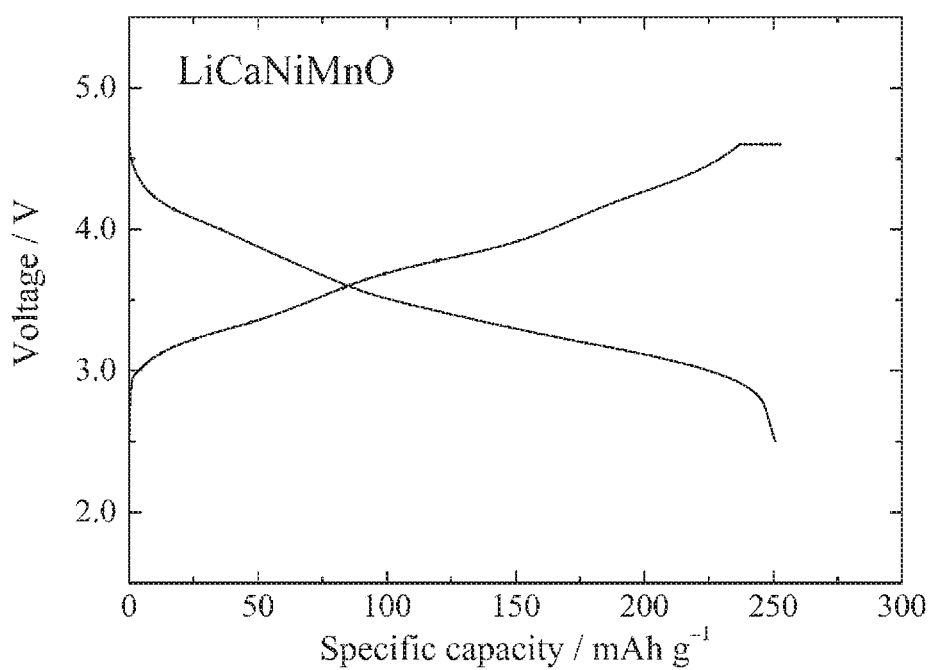
FIG. 6 illustrates charge/discharges curves for the 39th cycle of a charge/discharge test performed across a voltage range of 4.6 to 2.5 V for a lithium secondary battery containing the lithium-calcium-nickel-manganese composite oxide of the present invention obtained in Example 1 as a cathode active material.

Furthermore, a lithium secondary battery prepared under the same conditions was subjected to a constant-current charge/discharge test under temperature conditions of 25° C., using a current density of 10 mA/g and a cutoff potential of 4.6 V to 2.5 V relative to lithium. The results revealed that the charge/discharge capacity increased with each cycle and reached a maximum on the 39th cycle. The charge/discharge curves for the 39th cycle are shown in FIG. 6. The discharge capacity in the 39th cycle was 253 mAh/g, and the discharge capacity of a subsequent 75th cycle was confirmed as having a capacity retention rate relative to the discharge capacity of the 39th cycle of about 98%. Based on the above results, it was clear that the lithium-calcium-nickel-manganese composite oxide active material of the present invention was useful as a material for a high-capacity lithium secondary battery.

Example 2

Lithium-Calcium-Nickel-Manganese Composite Oxide Having Lithium-Excess Layered Rock-Salt Structure Powders of lithium carbonate ($Li_2CO_3$, manufactured by Rare Metallic Co., Ltd., purity: 99.99%), calcium chloride ($CaCl_2$, manufactured by Kojundo Chemical Laboratory Co., Ltd., purity: at least 99.9%), nickel acetate tetrahydrate (($CH_3COO)_2Ni.4H_2O$, manufactured by Wako Pure Chemical Industries, Ltd Wako special grade) and manganese carbonate ($MnCO_3$, manufactured by Kojundo Chemical Laboratory Co., Ltd., purity: 99.9%) were weighed so as to achieve an atomic ratio of Li:Ca:Ni:Mn=1.8:0.2:0.25:0.75. These powders were subjected to wet mixing in a mortar using ethanol as a medium, the resulting mixture was placed in a model C3 alumina crucible of grade SSA-S manufactured by Nikkato Corporation, and after sealing the crucible with a lid, the crucible was initially heated in the air at 300° C. for 3 hours using a muffle furnace (FP310, manufactured by Yamato Scientific Co., Ltd.). Subsequently, the crucible was left to cool naturally in the electric furnace, the resulting mixture was then subjected to wet grinding using ethanol, and additional heating was then performed at 600° C. for 12 hours, at 800° C. for 12 hours, at 900° C. for 12 hours, and then again at 900° C. for 12 hours, thus obtaining a sample.

Figure 7:
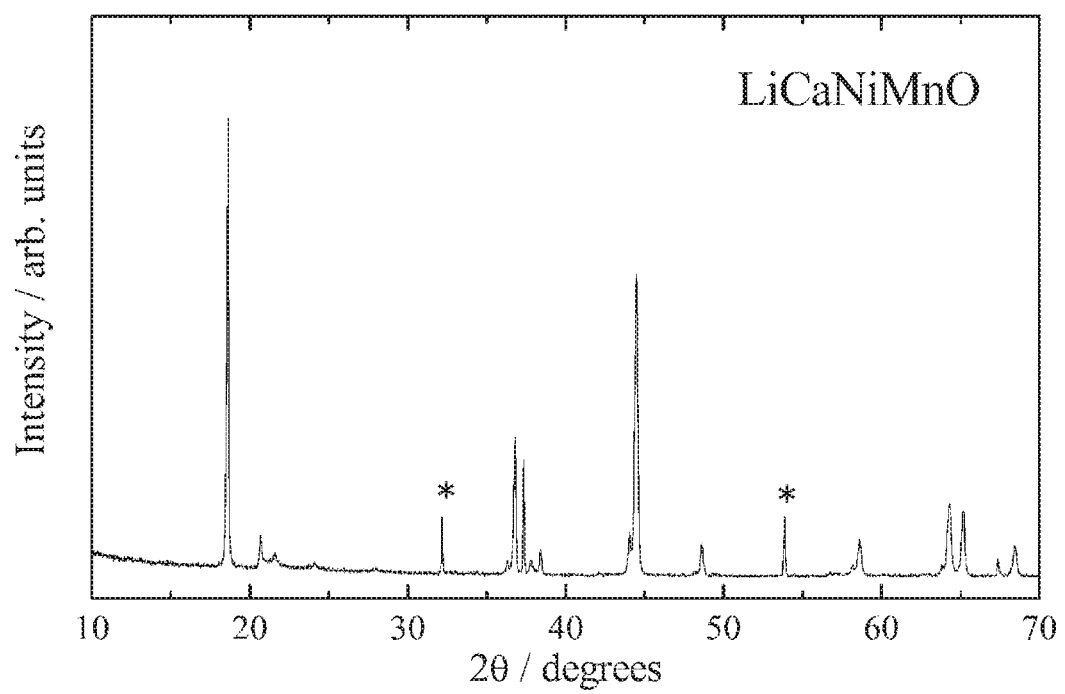
FIG. 7 is an X-ray powder diffraction pattern for a lithium-calcium-nickel-manganese composite oxide of the present invention obtained in Example 2.

When the crystal structure of the lithium-calcium-nickel-manganese composite oxide obtained in the manner described above was investigated using a powder X-ray diffractometer (product name: RINT 2550V, manufactured by Rigaku Corporation), it was clear that the main phase was a layered rock-salt structure belonging to the monoclinic system, having favorable crystallinity and exhibiting the features of a lithium-excess composition. The powder X-ray diffraction pattern is shown in FIG. 7. Peaks attributable to the monoclinic system were observed from 20° to 35°, and the lithium-excess composition was confirmed. On the other hand, peaks attributable to calcium oxide (marked * in the figure) were observed as a secondary phase, indicating clearly that this blend composition had reached the calcium solubility limit. Accordingly, it was confirmed that in the case of only calcium substitution, the substitution value y was preferably less than 0.13.

Example 3

Synthesis of Lithium-Calcium-Nickel-Titanium-Manganese Composite Oxide Having Lithium-Excess Layered Rock-Salt Structure Powders of lithium carbonate ($Li_2CO_3$, manufactured by Rare Metallic Co., Ltd., purity: 99.99%), calcium chloride ($CaCl_2$, manufactured by Kojundo Chemical Laboratory Co., Ltd., purity: at least 99.9%), nickel acetate tetrahydrate (($CH_3COO)_2Ni.4H_2O$, manufactured by Wako Pure Chemical Industries, Ltd., Wako special grade), titanium dioxide ($TiO_2$, AMT-100 manufactured by Tayca Corporation, content: 93%) and manganese carbonate ($MnCO_3$, manufactured by Kojundo Chemical Laboratory Co., Ltd., purity: 99.9%) were weighed so as to achieve an atomic ratio of Li:Ca:Ni:Ti:Mn=1.8:0.02:0.125:0.125:0.75. These powders were subjected to wet mixing in a mortar using ethanol as a medium, the resulting mixture was placed in a model C3 alumina crucible of grade SSA-S manufactured by Nikkato Corporation, and after sealing the crucible with a lid, the crucible was initially heated in the air at 300° C. for 3 hours using a muffle furnace (FP310, manufactured by Yamato Scientific Co., Ltd.). Subsequently, the crucible was left to cool naturally in the electric furnace, the resulting mixture was then subjected to wet grinding using ethanol, and additional heating was then performed at 600° C. for 12 hours, at 800° C. for 12 hours, at 900° C. for 12 hours, and then again at 900° C. for 12 hours, thus obtaining a sample.

Figure 8:
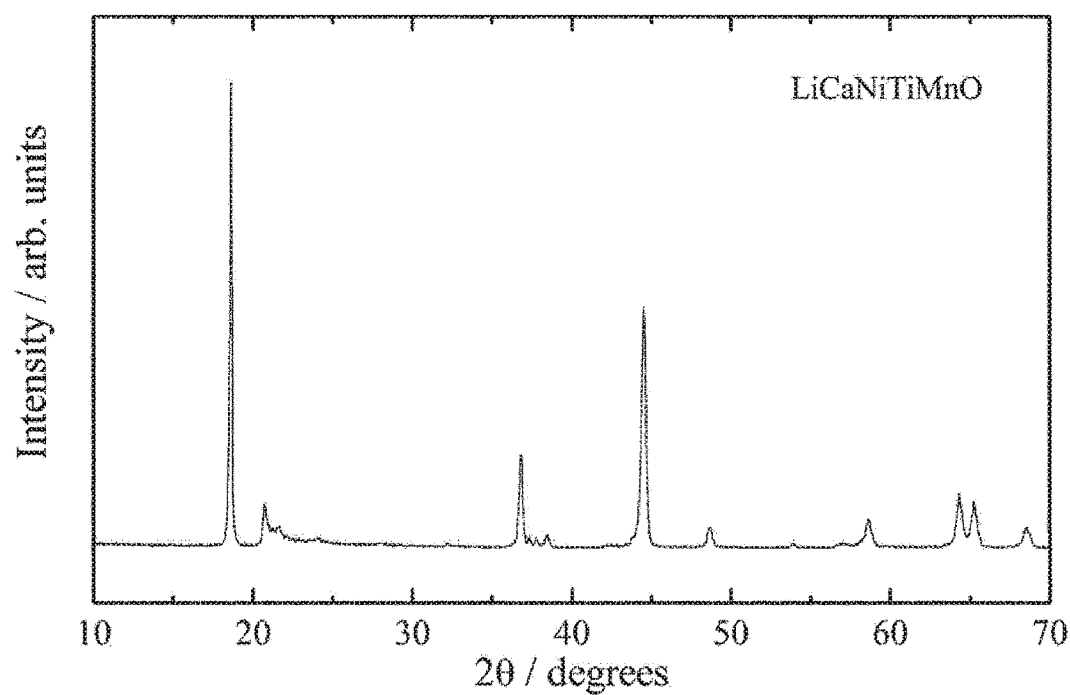
FIG. 8 is an X-ray powder diffraction pattern for a lithium-calcium-nickel-titanium-manganese composite oxide of the present invention obtained in Example 3.

When the crystal structure of the lithium-calcium-nickel-titanium-manganese composite oxide obtained in the manner described above was investigated using a powder X-ray diffractometer (product name: RINT 2550V, manufactured by Rigaku Corporation), it was clear that the main phase was a layered rock-salt structure belonging to the monoclinic system, having favorable crystallinity. The powder X-ray diffraction pattern is shown in FIG. 8. Peaks attributable to the monoclinic system were observed from 20° to 35°, and a lithium-excess composition was confirmed. Further, when the method of least squares was used to refine the lattice constants for the hexagonal system that represented the average structure, the following values were obtained, and a layered rock-salt structure having a lithium-excess composition was also confirmed on the basis of these lattice constants. In particular, it was confirmed that compared with the lattice constants of Example 1, the titanium substitution produced a significant lengthening of both the a axis and c axis lengths.

$a=2.8558$ Å$\pm 0.0004$ Å

$c=14.260$ Å$\pm 0.003$ Å

$V=100.72\pm 0.02$ Å$^3$

Moreover, a crystal structure analysis was performed using the Rietveld method (using the program: RIETAN-FP), and when the lattice constants were refined assuming a space group C2/m, the following values were obtained, and the lithium-excess layered rock-salt structure was also confirmed on the basis of these lattice constants.

$a=4.9434$ Å$\pm 0.0010$ Å

$b=8.5551$ Å$\pm 0.0010$ Å

$c=5.0302$ Å$\pm 0.0005$ Å

$\beta=109.216°\pm 0.012°$ $V=200.88\pm 0.05$ Å$^3$

Figure 9:
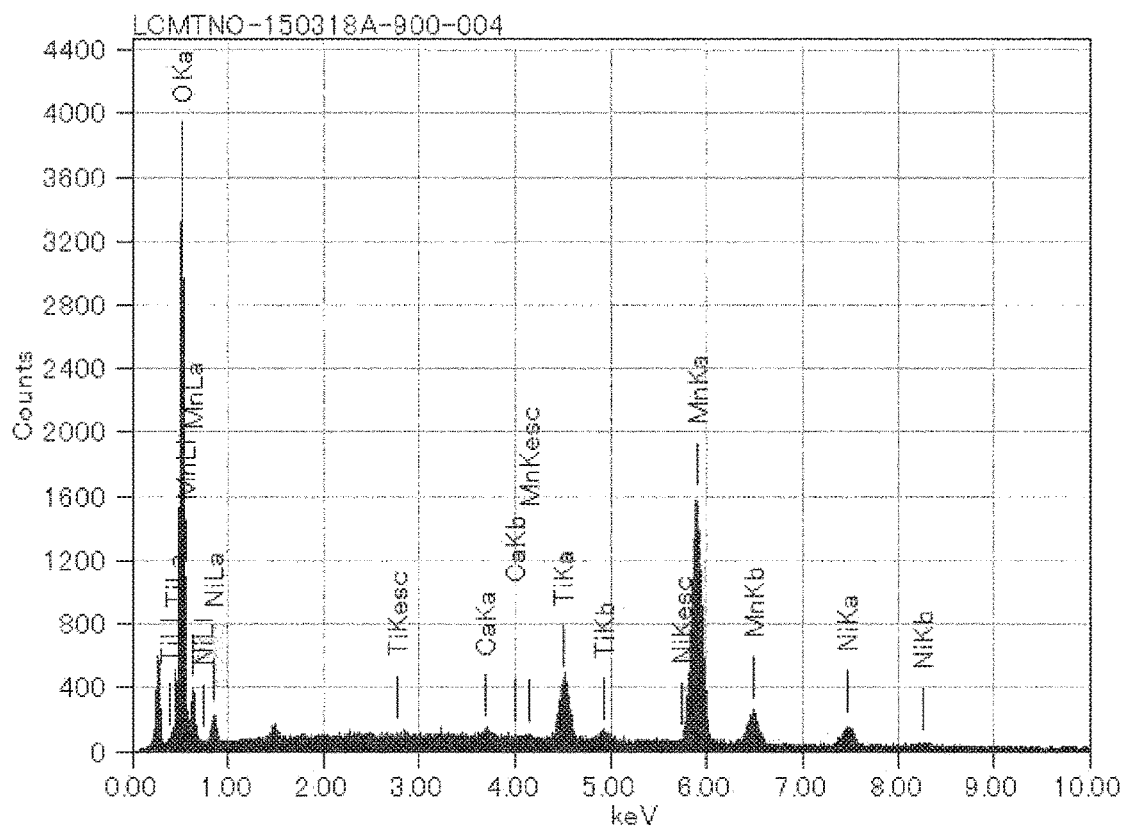
FIG. 9 is an EDS spectrum obtained by chemical composition analysis of the lithium-calcium-nickel-titanium-manganese composite oxide of the present invention obtained in Example 3.

Further, when the chemical composition was investigated using a scanning electron microscope (product name: JCM-6000, manufactured by JEOL Ltd.), the powdered particles were confirmed as containing calcium, nickel, titanium and manganese, and the compositional ratio within the entire powder sample was found to be Ca:Ni:Ti:Mn=0.02:0.125:0.125:0.75 (m=0.125, n=0.125). The SEM-EDS spectrum is shown in FIG. 9.
(Lithium Secondary Battery)

Using the lithium-calcium-nickel-titanium-manganese composite oxide obtained in this manner as an active material, a lithium secondary battery (coin-type cell) was produced with the same structural elements and structure as Example 1.

Figure 10:
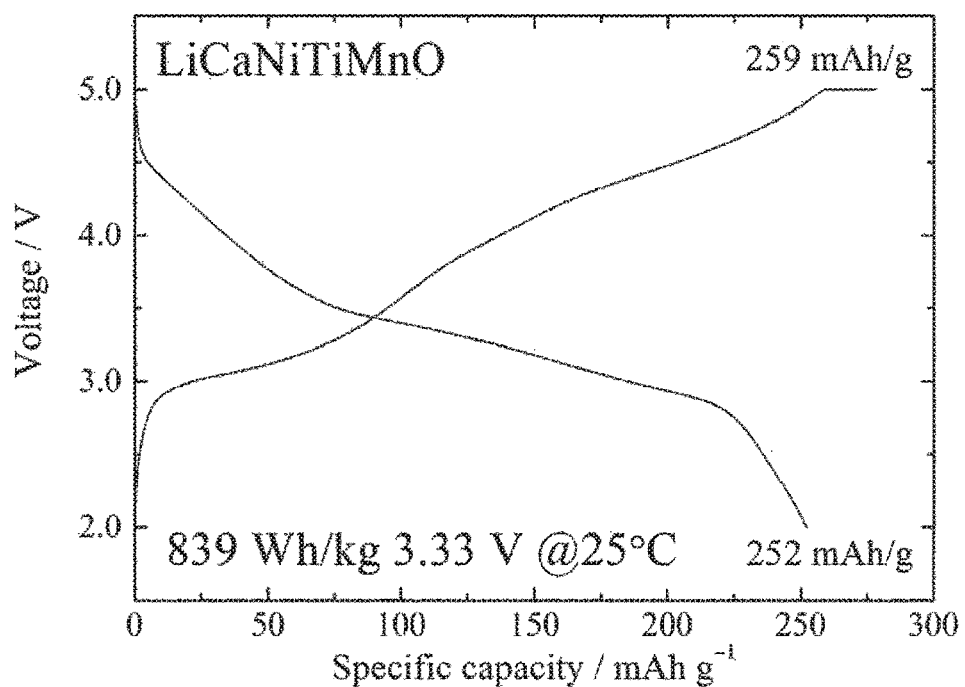
FIG. 10 illustrates charge/discharges curves for the 10th cycle of a charge/discharge test performed across a voltage range of 5.0 to 2.0 V for a lithium secondary battery containing the lithium-calcium-nickel-titanium-manganese composite oxide of the present invention obtained in Example 3 as a cathode active material.

The prepared lithium secondary battery was subjected to a constant-current charge/discharge test under temperature conditions of 25° C., using a current density of 10 mA/g and a cutoff potential of 5.0 V to 2.0 V relative to lithium. The results revealed that the charge/discharge capacity increased with each cycle and reached a maximum on the 10th cycle, with a high capacity including a charge capacity of 259 mAh/g and a discharge capacity of 252 mAh/g being obtained for the 10th cycle. Furthermore, based on the energy density of the 10th cycle discharge of 913 Wh/kg, the average discharge potential for the 10th cycle was calculated by dividing the discharge energy density (839 Wh/kg) by the discharge capacity (252 mAh/g), confirming a value of (839÷252=3.33) V. The charge/discharge curves for the 10th cycle are shown in FIG. 10. Moreover, in the discharge curve of the 14th cycle, no decrease in the capacity was noticeable, and the average discharge potential obtained by dividing the discharge energy density by the discharge capacity was 3.30 V, confirming that any decrease in the discharge potential was slight. Furthermore, compared with the lithium-calcium-nickel-manganese composite oxide of Example 1, it was clear that by including titanium substitution, the average discharge potential decreased slightly, but a similar high capacity was able to be obtained. Based on the above results, it was clear that the lithium-calcium-nickel-manganese composite oxide active material of the present invention was useful as a material for a high-capacity lithium secondary battery.

Example 4

Synthesis of Lithium-Magnesium-Nickel-Manganese Composite Oxide Having Lithium-Excess Layered Rock-Salt Structure (Compositional Formula: $Li_{1.24}Mg_{0.01}Ni_{0.19}Mn_{0.56}O_2$)

Powders of lithium carbonate ($Li_2CO_3$, manufactured by Rare Metallic Co., Ltd., purity: 99.99%), magnesium chloride ($MgCl_2$, manufactured by Kojundo Chemical Laboratory Co., Ltd., purity: at least 99.9%), nickel acetate tetrahydrate (($CH_3COO)_2Ni.4H_2O$, manufactured by Wako Pure Chemical Industries, Ltd., Wako special grade) and manganese carbonate ($MnCO_3$, manufactured by Kojundo Chemical Laboratory Co., Ltd., purity: 99.9%) were weighed so as to achieve an atomic ratio of Li:Mg:Ni:Mn=1.8:0.02:0.25:0.75. These powders were subjected to wet mixing in a mortar using ethanol as a medium, the resulting mixture was placed in a model C3 alumina crucible of grade SSA-S manufactured by Nikkato Corporation, and after sealing the crucible with a lid, the crucible was initially heated in the air at 300° C. for 3 hours using a muffle furnace (FP310, manufactured by Yamato Scientific Co., Ltd.). Subsequently, the crucible was left to cool naturally in the electric furnace, the resulting mixture was then subjected to wet grinding using ethanol, and additional heating was then performed at 600° C. for 12 hours, at 800° C. for 12 hours, at 900° C. for 12 hours, and then again at 900° C. for 12 hours, thus obtaining a sample.

Figure 11:
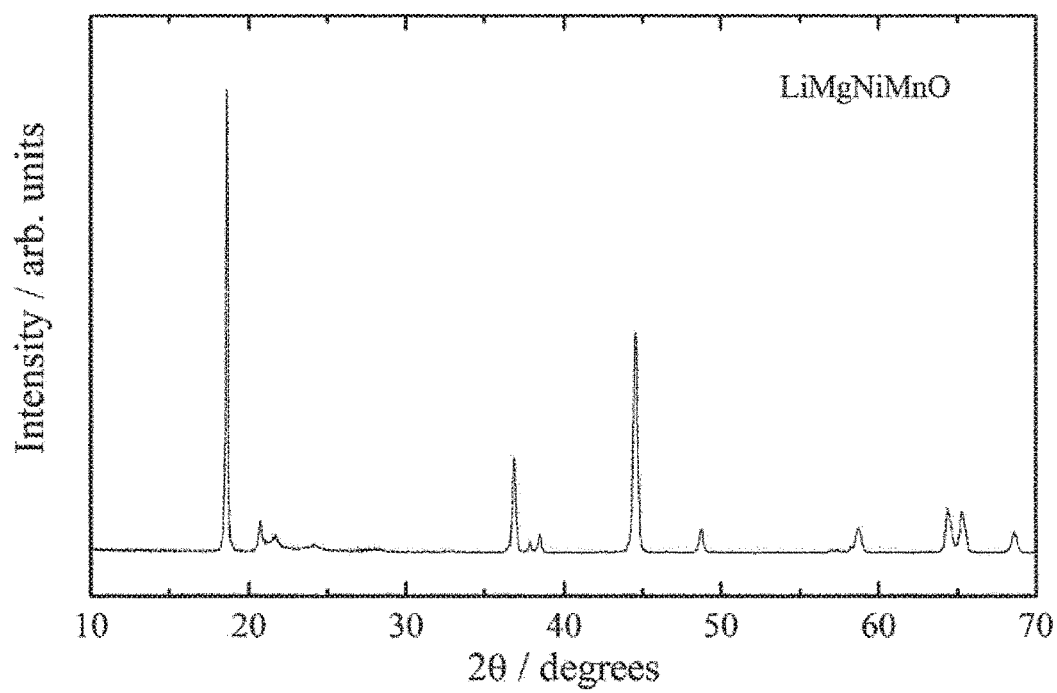
FIG. 11 is an X-ray powder diffraction pattern for a lithium-magnesium-nickel-manganese composite oxide of the present invention obtained in Example 4.

When the crystal structure of the composite oxide obtained in the manner described above was investigated using a powder X-ray diffractometer (product name: RINT 2550V, manufactured by Rigaku Corporation), it was clear that the product was a single phase of a layered rock-salt structure having favorable crystallinity and belonging to the monoclinic system. The powder X-ray diffraction pattern is shown in FIG. 11. Peaks attributable to the monoclinic system were observed from 20° to 35°, and a lithium-excess composition was confirmed. Further, when the method of least squares was used to refine the lattice constants for the hexagonal system that represented the average structure, the following values were obtained, and the lithium-excess layered rock-salt structure was also confirmed on the basis of these lattice constants.

$a=2.8527$ Å$\pm 0.0004$ Å

$c=14.242$ Å$\pm 0.002$ Å

$V=100.37\pm 0.01$ Å$^3$

Moreover, a crystal structure analysis was performed using the Rietveld method (using the program: RIETAN-FP), and when the lattice constants were refined assuming a space group C2/m, the following values were obtained, and the lithium-excess layered rock-salt structure was also confirmed on the basis of these lattice constants.

$a=4.9438$ Å±0.0009 Å

$b=8.5594$ Å±0.0011 Å

$c=5.0291$ Å±0.0004 Å

$\beta=109.306°±0.011°$ $V=200.84±0.05$ Å$^3$

Figure 12:
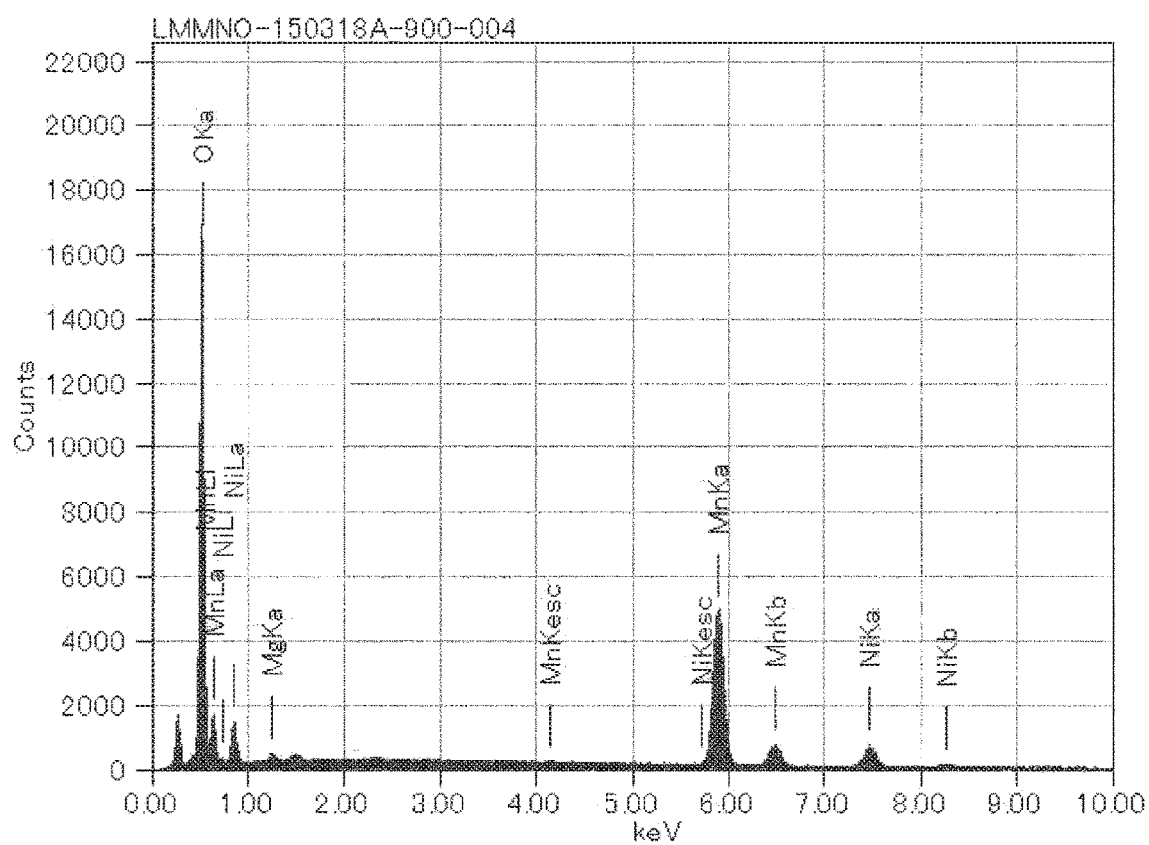
FIG. 12 is an EDS spectrum obtained by chemical composition analysis of the lithium-magnesium-nickel-manganese composite oxide of the present invention obtained in Example 4.

Further, when the chemical composition was investigated using a scanning electron microscope (product name: JCM-6000, manufactured by JEOL Ltd.), the powdered particles were confirmed as containing magnesium, nickel and manganese, and the compositional ratio within the entire powder sample was found to be Mg:Ni:Mn=0.02:0.25:0.75 (m=0.25). The SEM-EDS spectrum is shown in FIG. 12.

Moreover, a chemical analysis was performed by ICP analysis (product name: P-4010, manufactured by Hitachi, Ltd.), and the molar ratio of the sample was found to be Li:Mg:Ni:Mn=1.68:0.02:0.25:0.75. When these values were applied to the general formula $(Li_{1+x-2y}M_y)(Co_zNi_mTi_nMn_{1-m-n})_{1-x}O_2$ (wherein M, x, y, z, m and n have the same meanings as described above), it was confirmed that x=0.26, y=0.01, z=0, m=0.25 and n=0. Further, no aluminum or silicon or the like derived from the crucible material was detected.

(Lithium Secondary Battery)

Using the lithium-magnesium-nickel-manganese composite oxide obtained in this manner as an active material, a lithium secondary battery (coin-type cell) was produced with the same structural elements and structure as Example 1.

Figure 13:
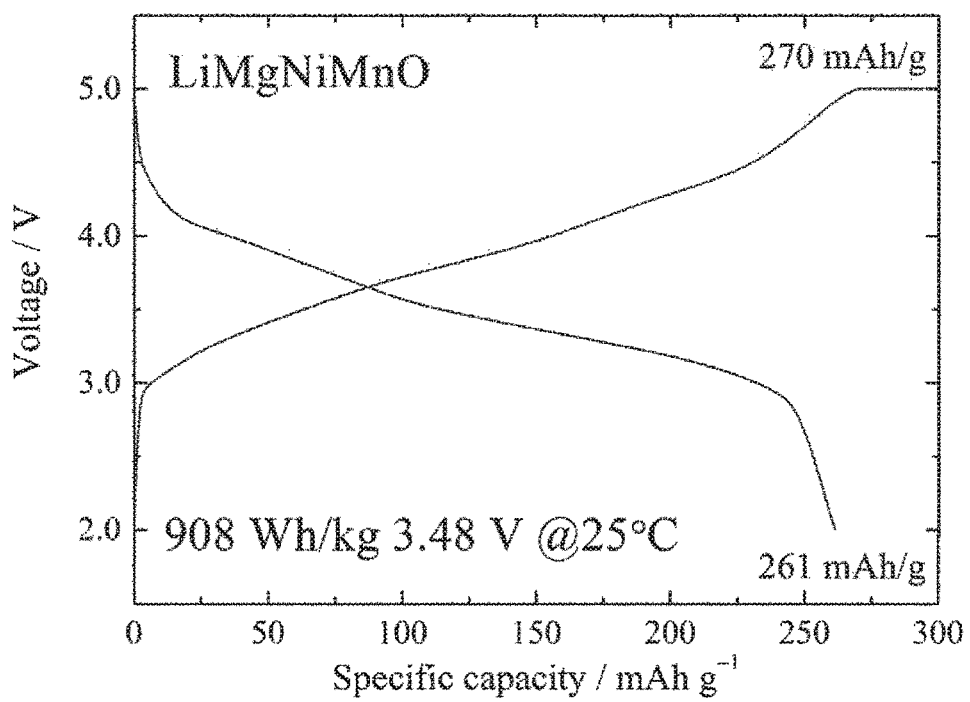
FIG. 13 illustrates charge/discharges curves for the 10th cycle of a charge/discharge test performed across a voltage range of 5.0 to 2.0 V for a lithium secondary battery containing the lithium-magnesium-nickel-manganese composite oxide of the present invention obtained in Example 4 as a cathode active material.

The prepared lithium secondary battery was subjected to a constant-current charge/discharge test under temperature conditions of 25° C., using a current density of 10 mA/g and a cutoff potential of 5.0 V to 2.0 V relative to lithium. The results revealed that the capacity increased with each cycle and reached a maximum on the 10th cycle, with a high capacity including a charge capacity of 270 mAh/g and a discharge capacity of 261 mAh/g being obtained for the 10th cycle. Furthermore, based on the energy density of the 10th cycle discharge of 908 Wh/kg, the average discharge potential for the 10th cycle was calculated by dividing the discharge energy density (908 Wh/kg) by the discharge capacity (261 mAh/g), confirming a value of (908÷261=3.48) V. The charge/discharge curves for the 10th cycle are shown in FIG. 13. Moreover, in the discharge curve of the 14th cycle, no decrease in the capacity was noticeable, and the average discharge potential obtained by dividing the discharge energy density by the discharge capacity was 3.45 V, confirming that any decrease in the discharge potential was slight. Furthermore, on comparison with the lithium-calcium-nickel-manganese composite oxide of Example 1, it was clear that even with magnesium substitution, similar effects to those observed with calcium were able to be obtained. Based on the above results, it was clear that the lithium-magnesium-nickel-manganese composite oxide active material of the present invention was useful as a material for a high-capacity lithium secondary battery.

Figure 14:
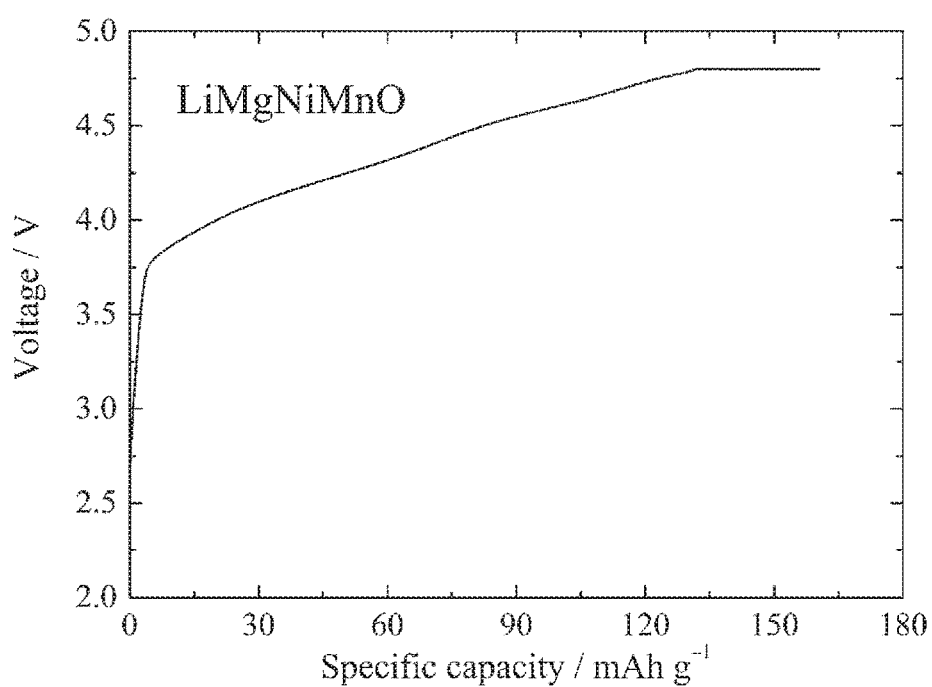
FIG. 14 illustrates a charge curve for the 1st cycle of a charge/discharge test performed across a voltage range of 4.8 to 2.5 V for a lithium secondary battery containing the lithium-magnesium-nickel-manganese composite oxide of the present invention obtained in Example 4 as a cathode active material.

Further, a lithium secondary battery prepared under the same conditions was subjected to a constant-current charge/discharge test under temperature conditions of 25° C., using a current density of 10 mA/g and a cutoff potential of 4.8 V to 2.5 V relative to lithium. The results revealed that the charge/discharge capacity increased with each cycle and reached a maximum on the 30th cycle. The charge curve for the 1st cycle of this charge/discharge test is shown in FIG. 14. The potential plateau at about 4.5 V characteristic of lithium-nickel-manganese composite oxides or lithium-nickel-cobalt-manganese composite oxides having a lithium-excess layered rock-salt structure was not observed, and a charge curve in which the potential increased monotonously was confirmed, indicating clearly that the lithium-magnesium-nickel-manganese composite oxide active material of the present invention underwent no oxygen extraction reaction, and was very useful as a high-capacity lithium secondary battery material capable of maintaining the arrangement of the oxygen atoms.

Figure 15:
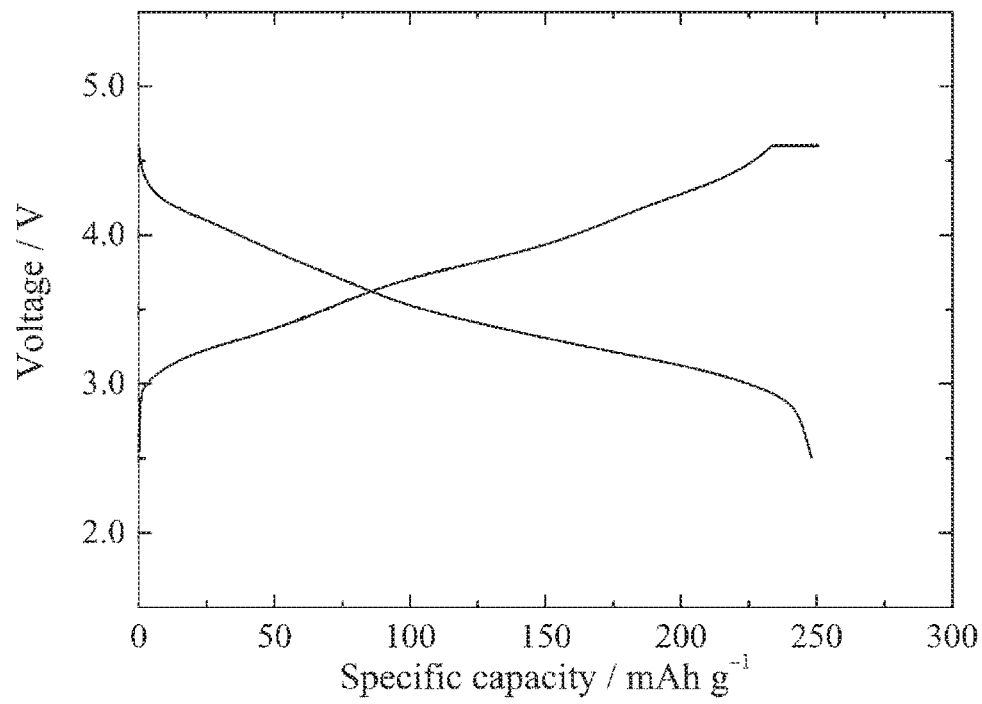
FIG. 15 illustrates charge/discharges curves for the 30th cycle of a charge/discharge test performed across a voltage range of 4.6 to 2.5 V for a lithium secondary battery containing the lithium-magnesium-nickel-manganese composite oxide of the present invention obtained in Example 4 as a cathode active material.

Furthermore, a lithium secondary battery prepared under the same conditions was subjected to a constant-current charge/discharge test under temperature conditions of 25° C., using a current density of 10 mA/g and a cutoff potential of 4.6 V to 2.5 V relative to lithium. The results revealed that the charge/discharge capacity increased with each cycle and reached a maximum on the 30th cycle. The charge/discharge curves for the 30th cycle are shown in FIG. 15. The discharge capacity in the 30th cycle was 251 mAh/g, and the discharge capacity of a subsequent 76th cycle was confirmed as having a capacity retention rate relative to the discharge capacity of the 30th cycle of about 95%. Based on the above results, it was clear that the lithium-magnesium-nickel-manganese composite oxide active material of the present invention was useful as a material for a high-capacity lithium secondary battery.

Example 5

Synthesis of
Lithium-Magnesium-Nickel-Manganese Composite
Oxide Having Lithium-Excess Layered Rock-Salt
Structure Powders of lithium carbonate ($Li_2CO_3$, manufactured by Rare Metallic Co., Ltd., purity: 99.99%), magnesium chloride ($MgCl_2$, manufactured by Kojundo Chemical Laboratory Co., Ltd., purity: at least 99.9%), nickel acetate tetrahydrate (($CH_3COO)_2Ni.4H_2O$, manufactured by Wako Pure Chemical Industries, Ltd., Wako special grade) and manganese carbonate ($MnCO_3$, manufactured by Kojundo Chemical Laboratory Co., Ltd., purity: 99.9%) were weighed so as to achieve an atomic ratio of Li:Mg:Ni:Mn=1.8:0.2:0.25:0.75. These powders were subjected to wet mixing in a mortar using ethanol as a medium, the resulting mixture was placed in a model C3 alumina crucible of grade SSA-S manufactured by Nikkato Corporation, and after sealing the crucible with a lid, the crucible was initially heated in the air at 300° C. for 3 hours using a muffle furnace (FP310, manufactured by Yamato Scientific Co., Ltd.). Subsequently, the crucible was left to cool naturally in the electric furnace, the resulting mixture was then subjected to wet grinding using ethanol, and additional heating was then performed at 600° C. for 12 hours, at 800° C. for 12 hours, at 900° C. for 12 hours, and then again at 900° C. for 12 hours, thus obtaining a sample.

When the crystal structure of the composite oxide obtained in the manner described above was investigated using a powder X-ray diffractometer (product name: RINT 2550V, manufactured by Rigaku Corporation), it was clear that the main phase was a layered rock-salt structure belonging to the monoclinic system, having favorable crystallinity and exhibiting the features of a lithium-excess composition.

Figure 16:
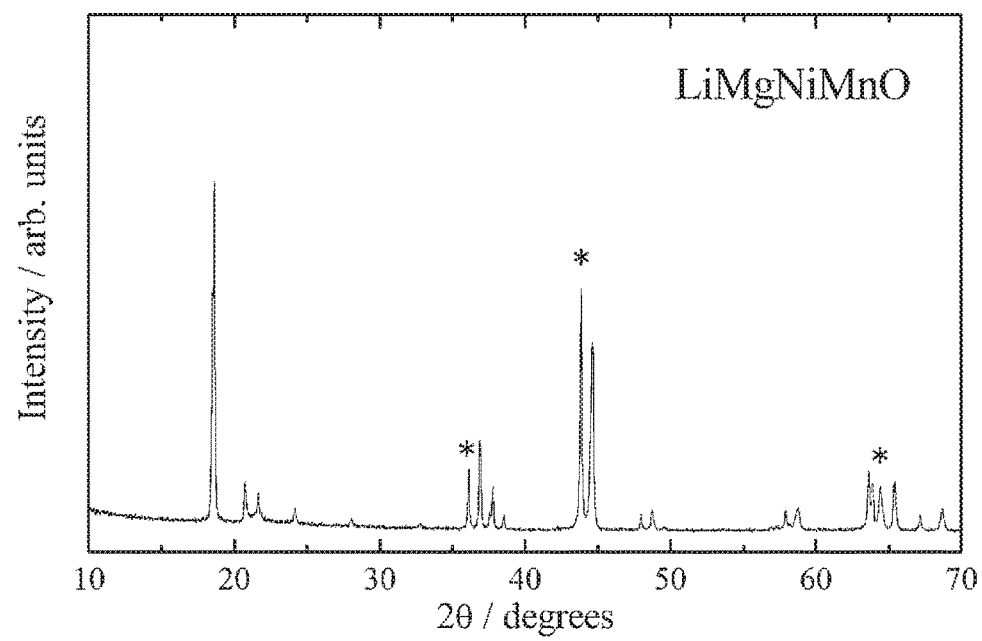
FIG. 16 is an X-ray powder diffraction pattern for a lithium-magnesium-nickel-manganese composite oxide of the present invention obtained in Example 5.

The powder X-ray diffraction pattern is shown in FIG. 16. Peaks attributable to the monoclinic system were observed from 20° to 35°, and the lithium-excess composition was confirmed. On the other hand, peaks attributable to lithium-magnesium-manganese oxide (marked * in the figure) were observed as a secondary phase, indicating clearly that this blend composition had reached the magnesium solubility limit. Accordingly, it was confirmed that in the case of only magnesium substitution, the substitution value y was preferably less than 0.13.

Example 6

Synthesis of Lithium-Magnesium-Nickel-Titanium-Manganese Composite Oxide Having Lithium-Excess Layered Rock-Salt Structure Powders of lithium carbonate ($Li_2CO_3$, manufactured by Rare Metallic Co., Ltd., purity: 99.99%), magnesium chloride ($MgCl_2$, manufactured by Kojundo Chemical Laboratory Co., Ltd., purity: at least 99.9%), nickel acetate tetrahydrate (($CH_3COO)_2Ni.4H_2O$, manufactured by Wako Pure Chemical Industries, Ltd., Wako special grade), titanium dioxide ($TiO_2$, AMT-100 manufactured by Tayca Corporation, content: 93%) and manganese carbonate ($MnCO_3$, manufactured by Kojundo Chemical Laboratory Co., Ltd., purity: 99.9%) were weighed so as to achieve an atomic ratio of Li:Mg:Ni:Ti:Mn=1.8:0.02:0.125:0.125:0.75. These powders were subjected to wet mixing in a mortar using ethanol as a medium, the resulting mixture was placed in a model C3 alumina crucible of grade SSA-S manufactured by Nikkato Corporation, and after sealing the crucible with a lid, the crucible was initially heated in the air at 300° C. for 3 hours using a muffle furnace (FP310, manufactured by Yamato Scientific Co., Ltd.). Subsequently, the crucible was left to cool naturally in the electric furnace, the resulting mixture was then subjected to wet grinding using ethanol, and additional heating was then performed at 600° C. for 12 hours, at 800° C. for 12 hours, at 900° C. for 12 hours, and then again at 900° C. for 12 hours, thus obtaining a sample.

Figure 17:
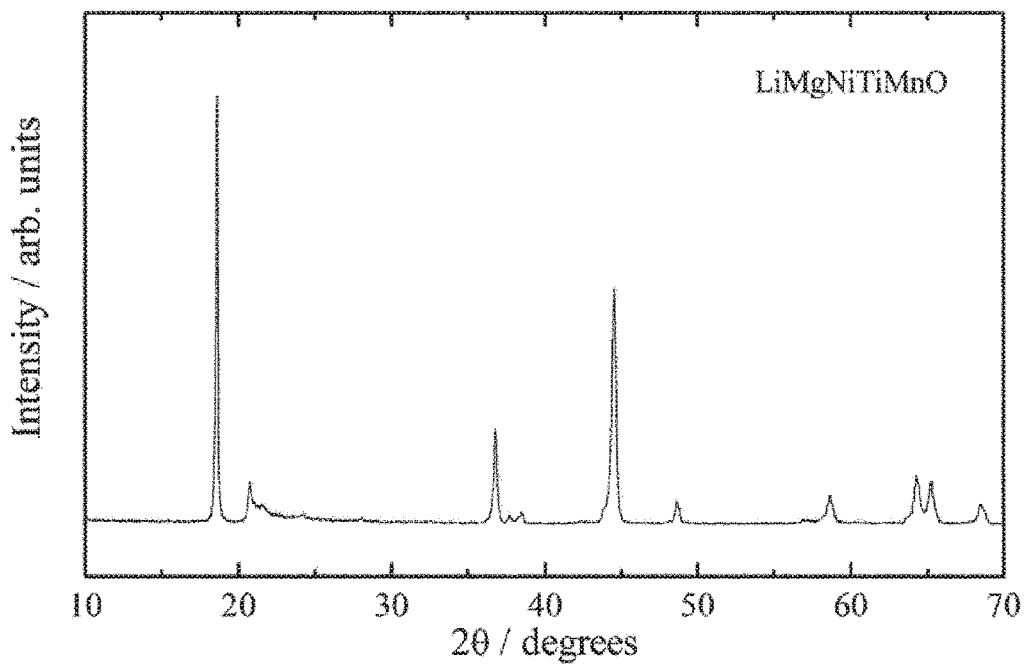
FIG. 17 is an X-ray powder diffraction pattern for a lithium-magnesium-nickel-titanium-manganese composite oxide of the present invention obtained in Example 6.

When the crystal structure of the composite oxide obtained in the manner described above was investigated using a powder X-ray diffractometer (product name: RINT 2550V, manufactured by Rigaku Corporation), it was clear that the product was a single phase of a layered rock-salt structure having favorable crystallinity and belonging to the monoclinic system. The powder X-ray diffraction pattern is shown in FIG. 17. Peaks attributable to the monoclinic system were observed from 20° to 35°, and a lithium-excess composition was confirmed. Further, when the method of least squares was used to refine the lattice constants for the hexagonal system that represented the average structure, the following values were obtained, and a layered rock-salt structure having a lithium-excess composition was also confirmed on the basis of these lattice constants. In particular, it was confirmed that compared with the lattice constants of Example 3, the titanium substitution produced a significant lengthening of both the a axis and c axis lengths.

$a$=2.8569 Å±0.0006 Å

$c$=14.264 Å±0.004 Å

$V$=100.40±0.01 Å$^3$

Moreover, a crystal structure analysis was performed using the Rietveld method (using the program: RIETAN-FP), and when the lattice constants were refined assuming a space group C2/m, the following values were obtained, and the lithium-excess layered rock-salt structure was also confirmed on the basis of these lattice constants.

$a$=4.9492 Å±0.0014 Å

$b$=8.5699 Å±0.0017 Å

$c$=5.0346 Å±0.0007 Å

$\beta$=109.203°±0.018°

$V$=201.66±0.08 Å$^3$

Figure 18:
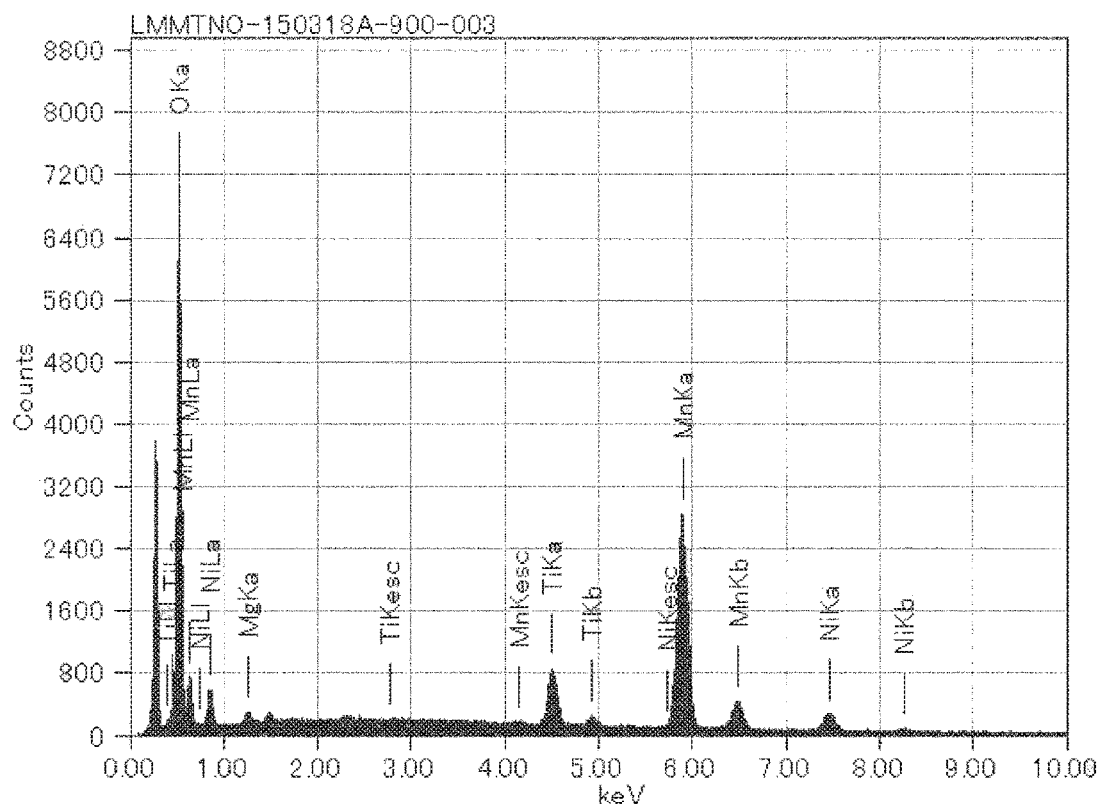
FIG. 18 is an EDS spectrum obtained by chemical composition analysis of the lithium-magnesium-nickel-titanium-manganese composite oxide of the present invention obtained in Example 6.

Further, when the chemical composition was investigated using a scanning electron microscope (product name: JCM-6000, manufactured by JEOL Ltd.), the powdered particles were confirmed as containing magnesium, nickel, titanium and manganese, and the compositional ratio within the entire powder sample was found to be Mg:Ni:Ti:Mn=0.02:0.125: 0.125:0.75 (m=0.125, n=0.125). The SEM-EDS spectrum is shown in FIG. 18.

(Lithium Secondary Battery)

Using the lithium-magnesium-nickel-titanium-manganese composite oxide obtained in this manner as an active material, a lithium secondary battery (coin-type cell) was produced with the same structural elements and structure as Example 1, and the charge/discharge characteristics of the battery were measured.

Figure 19:
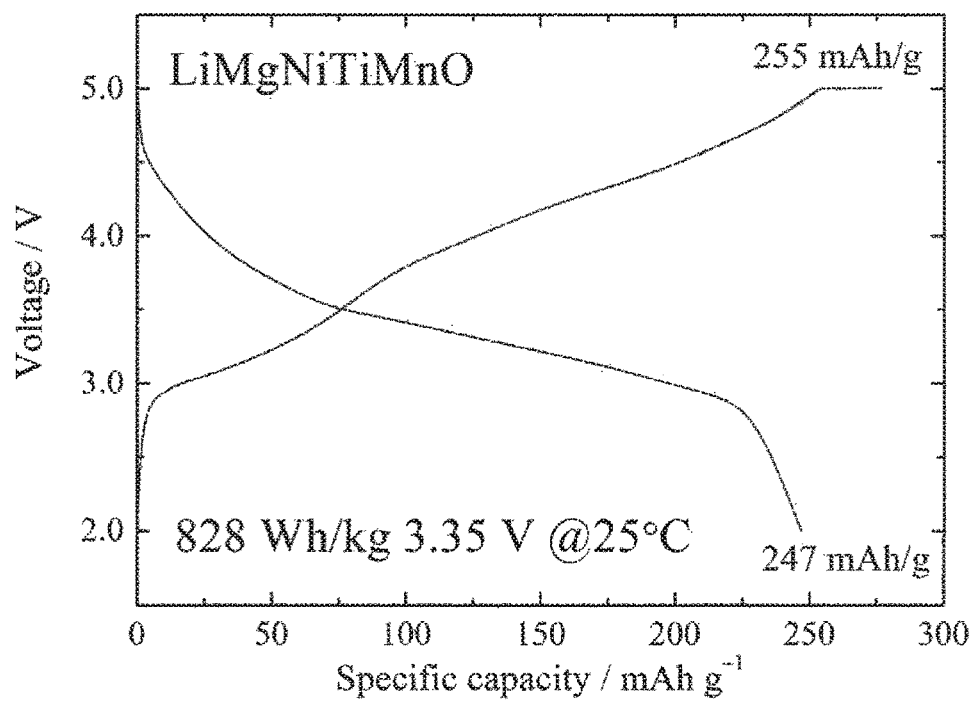
FIG. 19 illustrates charge/discharges curves for the 10th cycle of a charge/discharge test performed across a voltage range of 5.0 to 2.0 V for a lithium secondary battery containing the lithium-magnesium-nickel-titanium-manganese composite oxide of the present invention obtained in Example 6 as a cathode active material.

The prepared lithium secondary battery was subjected to a constant-current charge/discharge test under temperature conditions of 25° C., using a current density of 10 mA/g and a cutoff potential of 5.0 V to 2.0 V relative to lithium. The results revealed that the charge/discharge capacity increased with each cycle. A high capacity was obtained, including a charge capacity of 255 mAh/g and a discharge capacity of 247 mAh/g for the 10th cycle. Furthermore, based on the energy density of the 10th cycle discharge of 828 Wh/kg, the average discharge potential for the 10th cycle was calculated by dividing the discharge energy density (828 Wh/kg) by the discharge capacity (247 mAh/g), confirming a value of (828÷247=3.35) V. The charge/discharge curves for the 10th cycle are shown in FIG. 19. Moreover, in the discharge curve of the 14th cycle, no decrease in the capacity was noticeable, and the average discharge potential obtained by dividing the discharge energy density by the discharge capacity was 3.33 V, confirming that any decrease in the discharge potential was slight. Furthermore, compared with the lithium-magnesium-nickel-manganese composite oxide of Example 4, it was clear that by including titanium substitution, the average discharge potential decreased slightly, but a similar high capacity was able to be obtained. Based on the above results, it was clear that the lithium-magnesium-nickel-titanium-manganese composite oxide active material of the present invention was useful as a material for a high-capacity lithium secondary battery.

Example 7

Synthesis of Lithium-Calcium-Magnesium-Nickel-Manganese Composite Oxide Having Lithium-Excess Layered Rock-Salt Structure (Compositional Formula: $Li_{1.22}Ca_{0.005}Mg_{0.005}Ni_{0.19}Mn_{0.57}O_2$)

Powders of lithium carbonate ($Li_2CO_3$, manufactured by Rare Metallic Co., Ltd., purity: 99.99%), calcium chloride ($CaCl_2$, manufactured by Kojundo Chemical Laboratory Co., Ltd., purity: at least 99.9%), magnesium chloride (MgCl$_2$, manufactured by Kojundo Chemical Laboratory Co., Ltd., purity: at least 99.9%), nickel acetate tetrahydrate ((CH$_3$COO)$_2$Ni.4H$_2$O, manufactured by Wako Pure Chemical Industries, Ltd., Wako special grade) and manganese carbonate (MnCO$_3$, manufactured by Kojundo Chemical Laboratory Co., Ltd., purity: 99.9%) were weighed so as to achieve an atomic ratio of Li:Ca:Mg:Ni:Mn=1.8:0.01:0.01:0.25:0.75. These powders were subjected to wet mixing in a mortar using ethanol as a medium, the resulting mixture was placed in a model C3 alumina crucible of grade SSA-S manufactured by Nikkato Corporation, and after sealing the crucible with a lid, the crucible was initially heated in the air at 300° C. for 3 hours using a muffle furnace (FP310, manufactured by Yamato Scientific Co., Ltd.). Subsequently, the crucible was left to cool naturally in the electric furnace, the resulting mixture was then subjected to wet grinding using ethanol, and additional heating was then performed at 600° C. for 12 hours, at 800° C. for 12 hours, at 900° C. for 12 hours, and then again at 900° C. for 12 hours, thus obtaining a sample.

Figure 20:
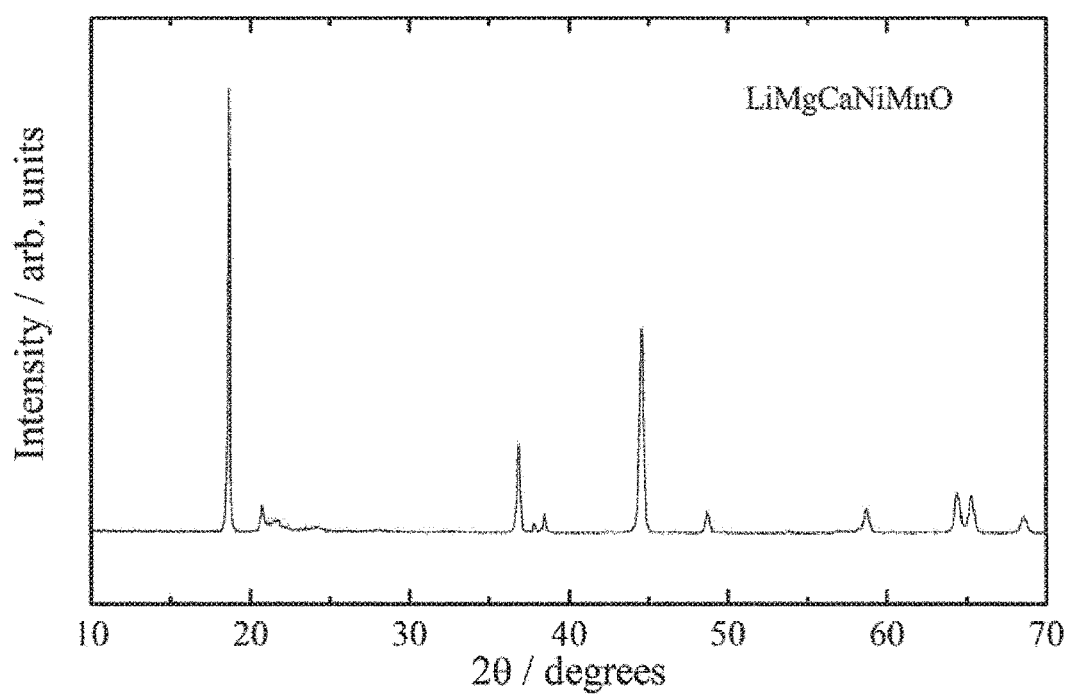
FIG. 20 is an X-ray powder diffraction pattern for a lithium-calcium-magnesium-nickel-manganese composite oxide of the present invention obtained in Example 7.

When the crystal structure of the composite oxide obtained in the manner described above was investigated using a powder X-ray diffractometer (product name: RINT 2550V, manufactured by Rigaku Corporation), it was clear that the product was a single phase of a layered rock-salt structure having favorable crystallinity and belonging to the monoclinic system. The powder X-ray diffraction pattern is shown in FIG. 20. Peaks attributable to the monoclinic system were observed from 20° to 35°, and a lithium-excess composition was confirmed. Further, when the method of least squares was used to refine the lattice constants for the hexagonal system that represented the average structure, the following values were obtained, and the lithium-excess layered rock-salt structure was also confirmed on the basis of these lattice constants. In particular, it was confirmed that performing substitution of both calcium and magnesium yielded substantially the same lattice constants as Example 1 and Example 3.

$a$=2.8544 Å±0.0002 Å

$c$=14.245 Å±0.001 Å

$V$=100.51±0.01 Å$^3$

Moreover, a crystal structure analysis was performed using the Rietveld method (using the program: RIETAN-FP), and when the lattice constants were refined assuming a space group C2/m, the following values were obtained, and the lithium-excess layered rock-salt structure was also confirmed on the basis of these lattice constants.

$a$=4.9457 Å±0.0010 Å

$b$=8.5639 Å±0.0012 Å

$c$=5.0292 Å±0.0004 Å

$\beta$=109.287°±0.012°

$V$=201.06±0.05 Å$^3$

Moreover, a chemical analysis was performed by ICP analysis (product name: P-4010, manufactured by Hitachi, Ltd.), and the molar ratio of the sample was found to be Li:Ca:Mg:Ni:Mn=1.62:0.01:0.01:0.25:0.75. When these values were applied to the general formula $(Li_{1+x-2y}M_y)(Co_zNi_mTi_nMn_{1-m-n})_{1-x}O_2$ (wherein M, x, y, z, m and n have the same meanings as described above), it was confirmed that x=0.24, y=0.01, z=0, m=0.25 and n=0. Further, no aluminum or silicon or the like derived from the crucible material was detected.

(Lithium Secondary Battery)

Using the lithium-calcium-magnesium-nickel-manganese composite oxide obtained in this manner as an active material, a lithium secondary battery (coin-type cell) was produced with the same structural elements and structure as Example 1.

Figure 21:
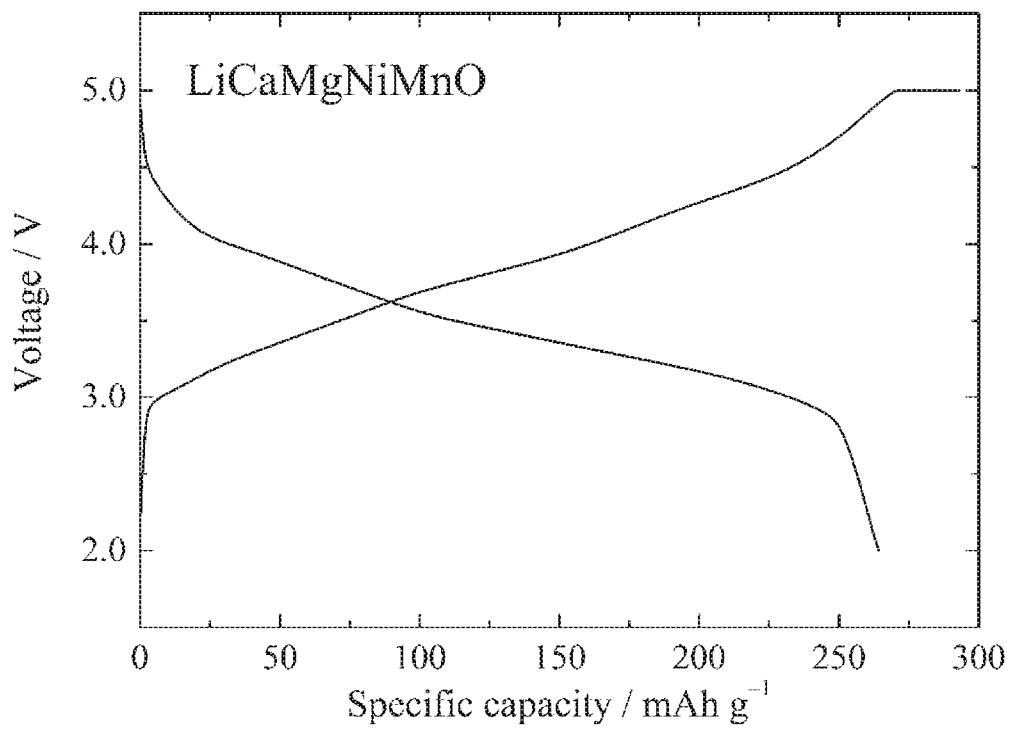
FIG. 21 illustrates charge/discharges curves for the 12th cycle of a charge/discharge test performed across a voltage range of 5.0 to 2.0 V for a lithium secondary battery containing the lithium-calcium-magnesium-nickel-manganese composite oxide of the present invention obtained in Example 7 as a cathode active material.

The prepared lithium secondary battery was subjected to a constant-current charge/discharge test under temperature conditions of 25° C., using a current density of 10 mA/g and a cutoff potential of 5.0 V to 2.0 V relative to lithium. The results revealed that the charge/discharge capacity increased with each cycle. A high capacity was obtained, including a charge capacity of 292 mAh/g and a discharge capacity of 264 mAh/g for the 12th cycle. Furthermore, based on the energy density of the 12th cycle discharge of 914 Wh/kg, the average discharge potential for the 12th cycle was calculated by dividing the discharge energy density (914 Wh/kg) by the discharge capacity (264 mAh/g), confirming a value of (914÷264=3.46) V. The charge/discharge curves for the 12th cycle are shown in FIG. 21. Moreover, in the discharge curve of the 16th cycle, no decrease in the capacity was noticeable, and the average discharge potential obtained by dividing the discharge energy density by the discharge capacity was 3.44 V, confirming that any decrease in the discharge potential was slight. Furthermore, compared with the lithium-calcium-nickel-manganese composite oxide of Example 1 and the lithium-magnesium-nickel-manganese composite oxide of Example 4, it was clear that when both calcium and magnesium substitution were performed, a high capacity could be obtained. Based on the above results, it was clear that the lithium-calcium-magnesium-nickel-manganese composite oxide active material of the present invention was useful as a material for a high-capacity lithium secondary battery.

Figure 22:
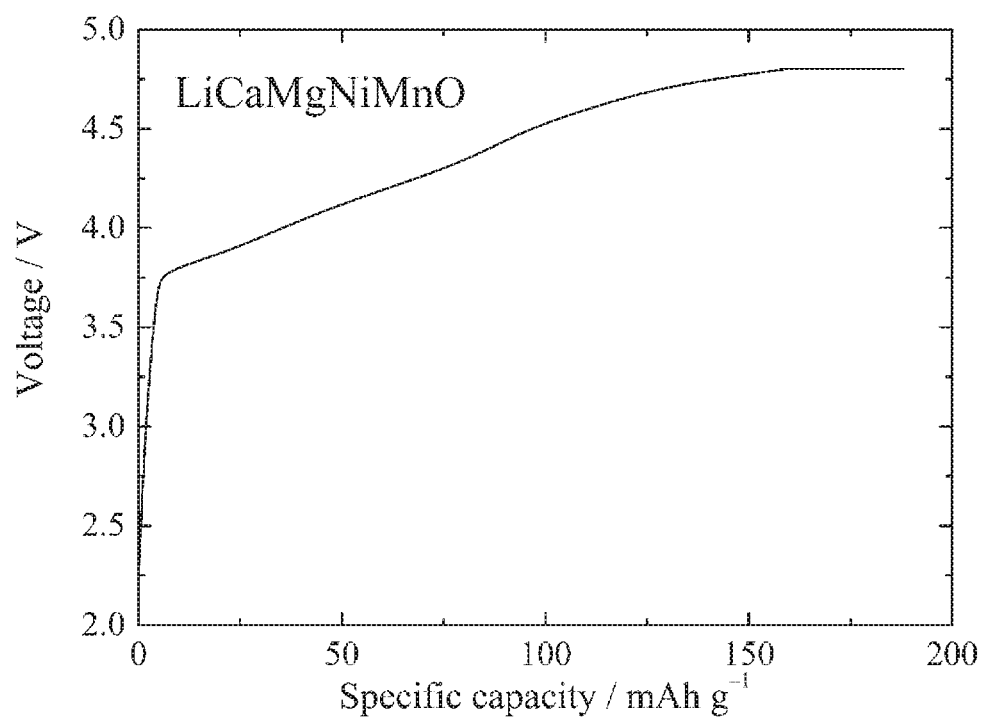
FIG. 22 illustrates a charge curve for the 1st cycle of a charge/discharge test performed across a voltage range of 4.8 to 2.5 V for a lithium secondary battery containing the lithium-calcium-magnesium-nickel-manganese composite oxide of the present invention obtained in Example 7 as a cathode active material.

Further, a lithium secondary battery prepared under the same conditions was subjected to a constant-current charge/discharge test under temperature conditions of 25° C., using a current density of 10 mA/g and a cutoff potential of 4.8 V to 2.5 V relative to lithium. The results revealed that the charge/discharge capacity increased with each cycle and reached a maximum on the 28th cycle. The charge curve for the 1st cycle of this charge/discharge test is shown in FIG. 22. The potential plateau at about 4.5 V characteristic of lithium-nickel-manganese composite oxides or lithium-nickel-cobalt-manganese composite oxides having a lithium-excess layered rock-salt structure was not observed, and a charge curve in which the potential increased monotonously was confirmed, indicating clearly that the lithium-calcium-nickel-manganese composite oxide active material of the present invention underwent no oxygen extraction reaction, and was very useful as a high-capacity lithium secondary battery material capable of maintaining the arrangement of the oxygen atoms.

Figure 23:
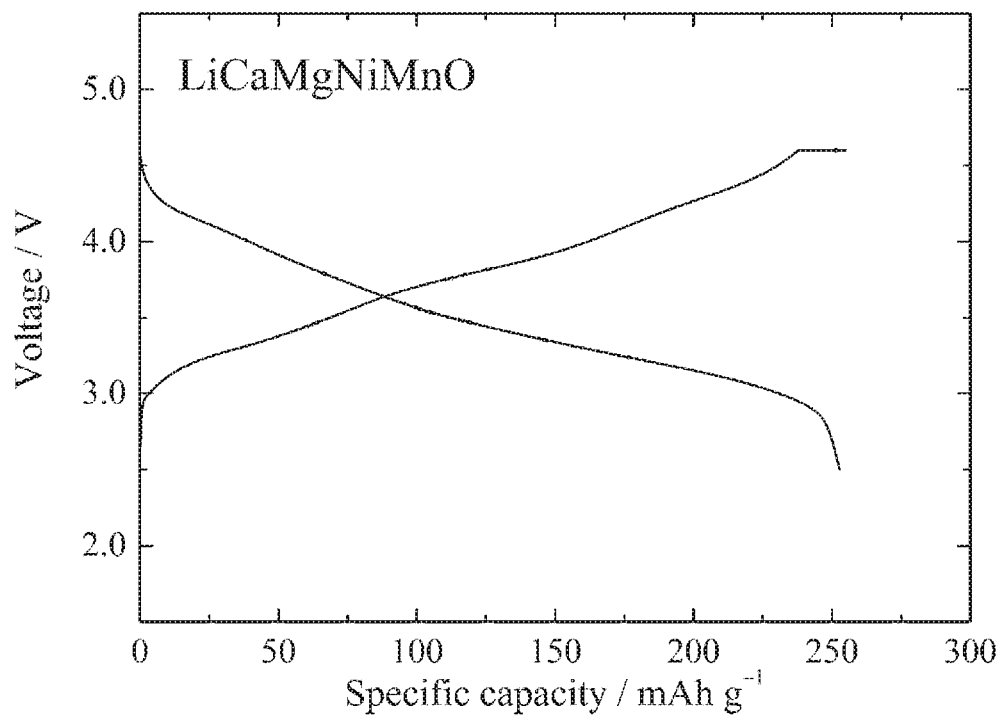
FIG. 23 illustrates charge/discharges curves for the 24th cycle of a charge/discharge test performed across a voltage range of 4.6 to 2.5 V for a lithium secondary battery containing the lithium-calcium-magnesium-nickel-manganese composite oxide of the present invention obtained in Example 7 as a cathode active material.

Furthermore, a lithium secondary battery prepared under the same conditions was subjected to a constant-current charge/discharge test under temperature conditions of 25° C., using a current density of 10 mA/g and a cutoff potential of 4.6 V to 2.5 V relative to lithium. The results revealed that the charge/discharge capacity increased with each cycle and reached a maximum on the 24th cycle. The charge curve for the 24th cycle is shown in FIG. 23. The discharge capacity in the 24th cycle was 253 mAh/g, and the discharge capacity of a subsequent 74th cycle was confirmed as having a capacity retention rate relative to the discharge capacity of the 24th cycle of about 95%. Further, it was clear upon comparison with the lithium-calcium-nickel-manganese composite oxide of Example 1 and the lithium-magnesium-nickel-manganese composite oxide of Example 4, that a substantially equivalent high capacity was able to be obtained. Based on the above results, it was clear that the lithium-calcium-magnesium-nickel-manganese composite oxide active material of the present invention was useful as a material for a high-capacity lithium secondary battery.

Example 8

Synthesis of
Lithium-Calcium-Magnesium-Nickel-Manganese
Composite Oxide Having Lithium-Excess Layered
Rock-Salt Structure Powders of lithium carbonate ($Li_2CO_3$, manufactured by Rare Metallic Co., Ltd., purity: 99.99%), calcium chloride ($CaCl_2$, manufactured by Kojundo Chemical Laboratory Co., Ltd., purity: at least 99.9%), magnesium chloride ($MgCl_2$, manufactured by Kojundo Chemical Laboratory Co., Ltd., purity: at least 99.9%), nickel acetate tetrahydrate (($CH_3COO)_2Ni.4H_2O$, manufactured by Wako Pure Chemical Industries, Ltd Wako special grade) and manganese carbonate ($MnCO_3$, manufactured by Kojundo Chemical Laboratory Co., Ltd., purity: 99.9%) were weighed so as to achieve an atomic ratio of Li:Ca:Mg:Ni:Mn=1.8:0.03:0.03:0.25:0.75. These powders were subjected to wet mixing in a mortar using ethanol as a medium, the resulting mixture was placed in a model C3 alumina crucible of grade SSA-S manufactured by Nikkato Corporation, and after sealing the crucible with a lid, the crucible was initially heated in the air at 300° C. for 3 hours using a muffle furnace (FP310, manufactured by Yamato Scientific Co., Ltd.). Subsequently, the crucible was left to cool naturally in the electric furnace, the resulting mixture was then subjected to wet grinding using ethanol, and additional heating was then performed at 600° C. for 12 hours, at 800° C. for 12 hours, at 900° C. for 12 hours, and then again at 900° C. for 12 hours, thus obtaining a sample.

Figure 24:
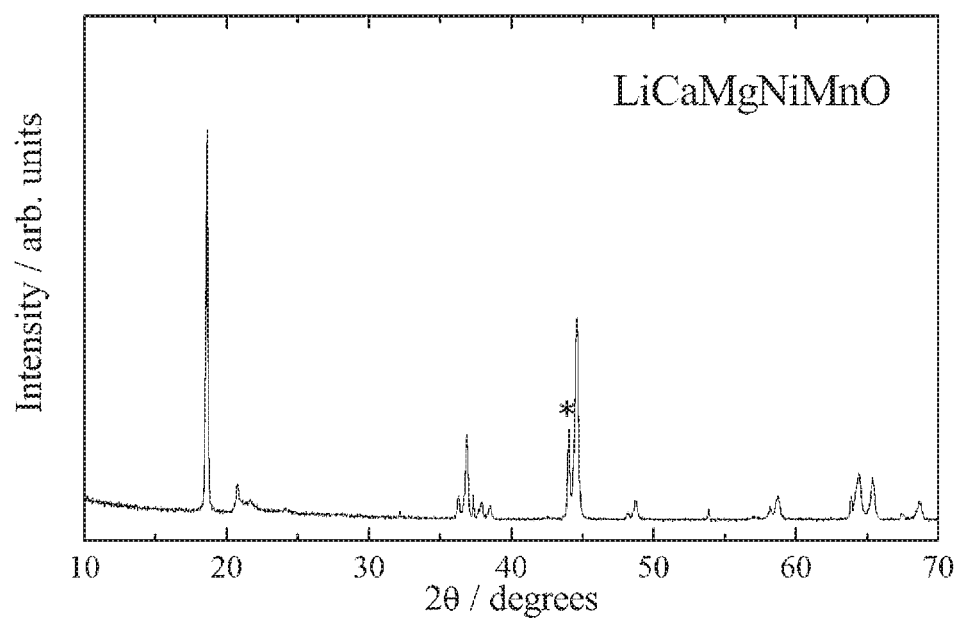
FIG. 24 is an X-ray powder diffraction pattern for a lithium-calcium-magnesium-nickel-manganese composite oxide of the present invention obtained in Example 8.

When the crystal structure of the lithium-calcium-nickel-manganese composite oxide obtained in the manner described above was investigated using a powder X-ray diffractometer (product name: SmartLab, manufactured by Rigaku Corporation), it was clear that the main phase was a layered rock-salt structure belonging to the monoclinic system, having favorable crystallinity and exhibiting the features of a lithium-excess composition. The powder X-ray diffraction pattern is shown in FIG. 24. Peaks attributable to the monoclinic system were observed from 20° to 35°, and the lithium-excess composition was confirmed. On the other hand, peaks attributable to lithium-nickel-manganese oxides (marked * in the figure) were observed as a secondary phase, indicating clearly that this blend composition had reached the solubility limit for a solid solution where magnesium and calcium were included in a ratio of 1:1.

Example 9

Synthesis of Lithium-Calcium-Magnesium-Nickel-Titanium-Manganese Composite Oxide Having Lithium-Excess Layered Rock-Salt Structure Powders of lithium carbonate ($Li_2CO_3$, manufactured by Rare Metallic Co., Ltd., purity: 99.99%), calcium chloride ($CaCl_2$, manufactured by Kojundo Chemical Laboratory Co., Ltd., purity: at least 99.9%), magnesium chloride ($MgCl_2$, manufactured by Kojundo Chemical Laboratory Co., Ltd., purity: at least 99.9%), nickel acetate tetrahydrate (($CH_3COO)_2Ni.4H_2O$, manufactured by Wako Pure Chemical Industries, Ltd., Wako special grade), titanium dioxide ($TiO_2$, AMT-100 manufactured by Tayca Corporation, content: 93%) and manganese carbonate ($MnCO_3$, manufactured by Kojundo Chemical Laboratory Co., Ltd., purity: 99.9%) were weighed so as to achieve an atomic ratio of Li:Ca:Mg:Ni:Ti:Mn=1.8:0.01:0.01:0.125:0.125:0.75. These powders were subjected to wet mixing in a mortar using ethanol as a medium, the resulting mixture was placed in a model C3 alumina crucible of grade SSA-S manufactured by Nikkato Corporation, and after sealing the crucible with a lid, the crucible was initially heated in the air at 300° C. for 3 hours using a muffle furnace (FP310, manufactured by Yamato Scientific Co., Ltd.). Subsequently, the crucible was left to cool naturally in the electric furnace, the resulting mixture was then subjected to wet grinding using ethanol, and additional heating was then performed at 600° C. for 12 hours, at 800° C. for 12 hours, at 900° C. for 12 hours, and then again at 900° C. for 12 hours, thus obtaining a sample.

Figure 25:
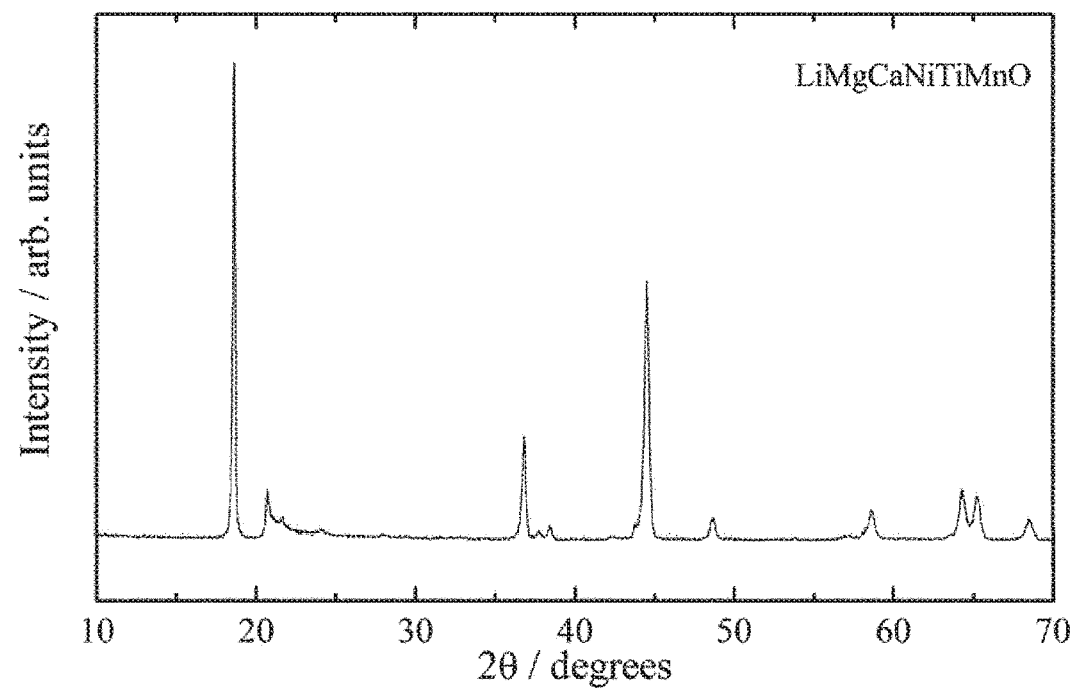
FIG. 25 is an X-ray powder diffraction pattern for a lithium-calcium-magnesium-nickel-titanium-manganese composite oxide of the present invention obtained in Example 9.

When the crystal structure of the composite oxide obtained in the manner described above was investigated using a powder X-ray diffractometer (product name: RINT 2550V, manufactured by Rigaku Corporation), it was clear that the product was a single phase of a layered rock-salt structure having favorable crystallinity and belonging to the monoclinic system. The powder X-ray diffraction pattern is shown in FIG. 25. Peaks attributable to the monoclinic system were observed from 20° to 35°, and a lithium-excess composition was confirmed. Further, when the method of least squares was used to refine the lattice constants for the hexagonal system that represented the average structure, the following values were obtained, and a layered rock-salt structure having a lithium-excess composition was also confirmed on the basis of these lattice constants. In particular, it was confirmed that compared with the lattice constants of Example 5, the titanium substitution produced a significant lengthening of both the a axis and c axis lengths, and also that the substitution of both calcium and magnesium yielded similar values to those of Example 2 and Example 4.

$a$=2.8560 Å±0.0004 Å

$c$=14.264 Å±0.004 Å

$V$=100.76±0.02 Å$^3$

Moreover, a crystal structure analysis was performed using the Rietveld method (using the program: RIETAN-FP), and when the lattice constants were refined assuming a space group C2/m, the following values were obtained, and the lithium-excess layered rock-salt structure was also confirmed on the basis of these lattice constants.

$a$=4.9508 Å±0.0018 Å

$b$=8.5700 Å±0.0019 Å

$c$=5.0360 Å±0.0008 Å

$\beta$=109.24°±0.02°

$V$=201.73±0.09 Å$^3$

Based on the types of observations noted above, it was clear that the composite oxide of Example 6 was capable of the same type of high capacity as Example 2 and Example 4, and it can be said that a level of performance can be expected that suffers little change in the discharge curve as cycling progresses.

Example 10

Synthesis of Lithium-Calcium-Cobalt-Nickel-Manganese Composite Oxide Having Lithium-Excess Layered Rock-Salt Structure (Compositional Formula: $Li_{1.23}Ca_{0.01}Co_{0.14}Ni_{0.13}Mn_{0.49}O_2$)

Powders of lithium carbonate ($Li_2CO_3$, manufactured by Rare Metallic Co., Ltd., purity: 99.99%), calcium chloride ($CaCl_2$, manufactured by Kojundo Chemical Laboratory Co., Ltd., purity: at least 99.9%), cobalt acetate tetrahydrate (($CH_3COO)_2Co.4H_2O$, manufactured by Wako Pure Chemical Industries, Ltd., Wako special grade), nickel acetate tetrahydrate (($CH_3COO)_2Ni.4H_2O$, manufactured by Wako Pure Chemical Industries, Ltd., Wako special grade) and manganese carbonate ($MnCO_3$, manufactured by Kojundo Chemical Laboratory Co., Ltd., purity: 99.9%) were weighed so as to achieve an atomic ratio of Li:Ca:Mg:Ni:Mn=1.8:0.02:0.17:0.17:0.66. These powders were subjected to wet mixing in a mortar using ethanol as a medium, the resulting mixture was placed in a model C3 alumina crucible of grade SSA-S manufactured by Nikkato Corporation, and after sealing the crucible with a lid, the crucible was initially heated in the air at 300° C. for 3 hours using a muffle furnace (FP310, manufactured by Yamato Scientific Co., Ltd.). Subsequently, the crucible was left to cool naturally in the electric furnace, the resulting mixture was then subjected to wet grinding using ethanol, and additional heating was then performed at 600° C. for 12 hours, at 800° C. for 12 hours, at 900° C. for 12 hours, and then again at 900° C. for 12 hours, thus obtaining a sample.

Figure 26:
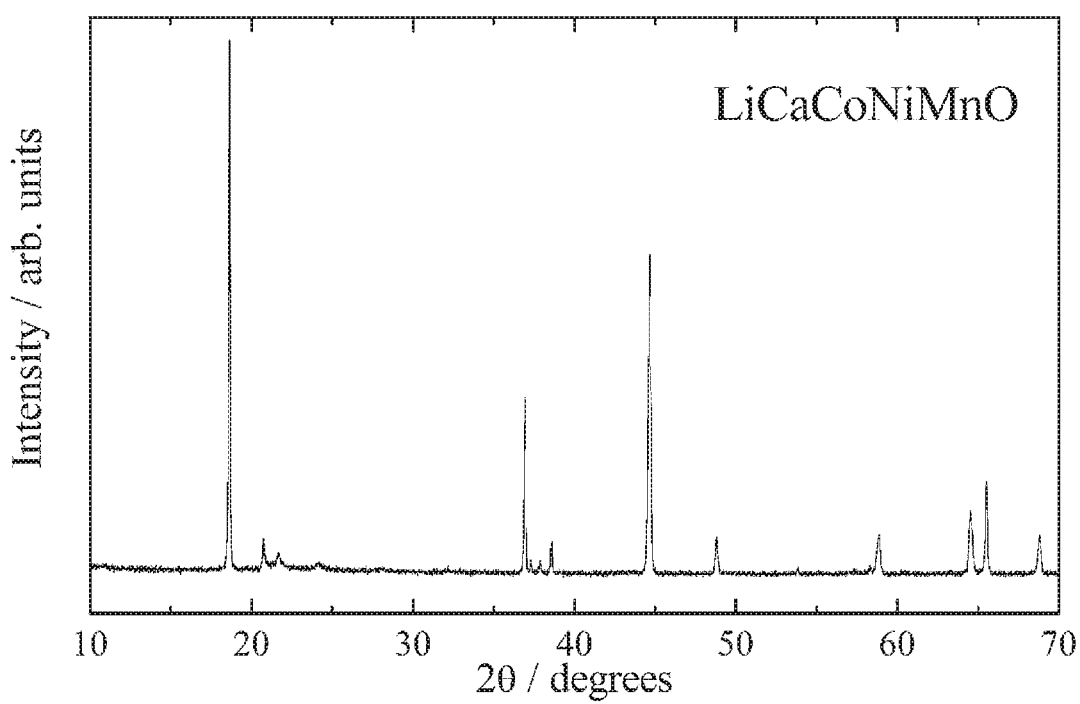
FIG. 26 is an X-ray powder diffraction pattern for a lithium-calcium-cobalt-nickel-manganese composite oxide of the present invention obtained in Example 10.

When the crystal structure of the composite oxide obtained in the manner described above was investigated using a powder X-ray diffractometer (product name: SmartLab, manufactured by Rigaku Corporation), it was clear that the product was a single phase of a layered rock-salt structure having favorable crystallinity and belonging to the monoclinic system. The powder X-ray diffraction pattern is shown in FIG. 26. Peaks attributable to the monoclinic system were observed from 20° to 35°, and a lithium-excess composition was confirmed. Further, a crystal structure analysis was performed using the Rietveld method (using the program: RIETAN-FP), and when the lattice constants were refined assuming a space group C2/m, the following values were obtained, and the lithium-excess layered rock-salt structure was also confirmed on the basis of these lattice constants.

$a = 4.9328$ Å$\pm 0.0002$ Å

$b = 8.5402$ Å$\pm 0.0003$ Å

$c = 5.0233$ Å$\pm 0.0001$ Å

$\beta = 109.260° \pm 0.002°$ $V = 199.775 \pm 0.012$ Å$^3$

Moreover, a chemical analysis was performed by ICP analysis (product name: P-4010, manufactured by Hitachi, Ltd.), and the molar ratio of the sample was found to be Li:Ca:Co:Ni:Mn=1.63:0.02:0.18:0.17:0.65. When these values were applied to the general formula $(Li_{1+x-2y}M_y)(Co_zNi_mTi_nMn_{1-m-n})_{1-x}O_2$ (wherein M, x, y, z, m and n have the same meanings as described above), it was confirmed that x=0.25, y=0.01, z=0.18, m=0.17 and n=0. Further, no aluminum or silicon or the like derived from the crucible material was detected.

(Lithium Secondary Battery)

Using the lithium-calcium-cobalt-nickel-manganese composite oxide obtained in this manner as an active material, a lithium secondary battery (coin-type cell) was produced with the same structural elements and structure as Example 1.

Figure 27:
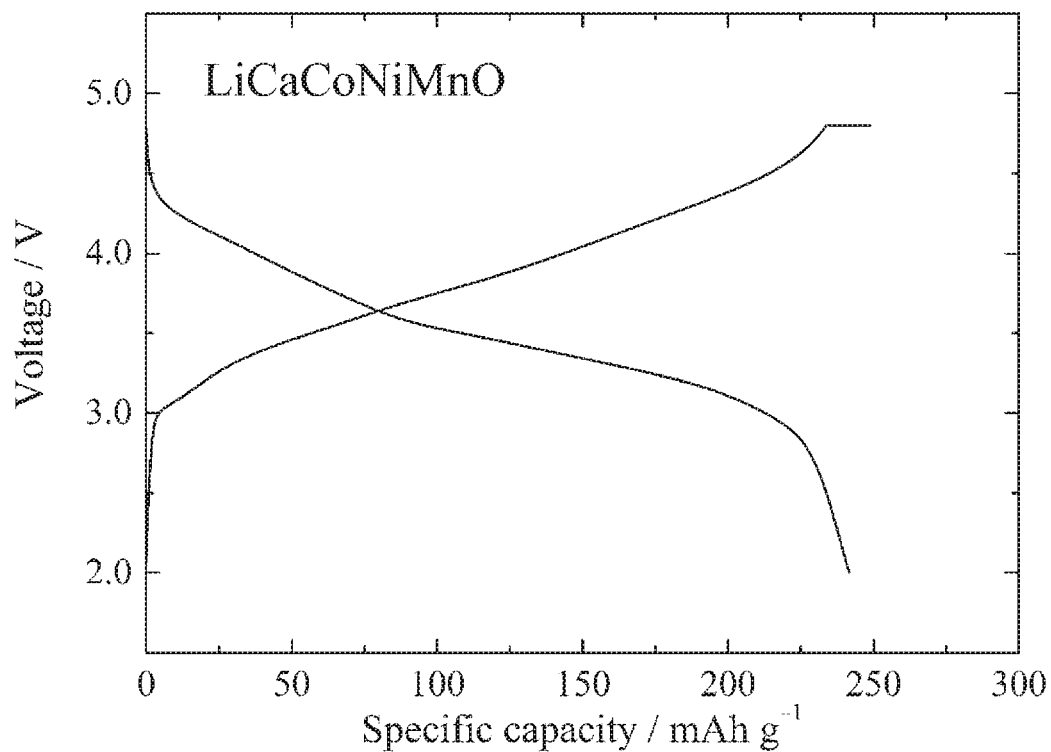
FIG. 27 illustrates charge/discharges curves for the 7th cycle of a charge/discharge test performed across a voltage range of 4.8 to 2.0 V for a lithium secondary battery containing the lithium-calcium-cobalt-nickel-manganese composite oxide of the present invention obtained in Example 10 as a cathode active material.

The prepared lithium secondary battery was subjected to a constant-current charge/discharge test under temperature conditions of 25° C., using a current density of 10 mA/g and a cutoff potential of 4.8 V to 2.0 V relative to lithium. The results revealed that the charge/discharge capacity increased with each cycle. A high capacity was obtained, including a charge capacity of 249 mAh/g and a discharge capacity of 242 mAh/g for the 7th cycle. Furthermore, based on the energy density of the 7th cycle discharge of 840 Wh/kg, the average discharge potential for the 10th cycle was calculated by dividing the discharge energy density (840 Wh/kg) by the discharge capacity (242 mAh/g), confirming a value of (840÷242=3.47) V. The charge/discharge curves for the 7th cycle are shown in FIG. 27. Moreover, in the discharge curve of the 11th cycle, no decrease in the capacity was noticeable, and the average discharge potential obtained by dividing the discharge energy density by the discharge capacity was 3.44 V, confirming that any decrease in the discharge potential was slight. Based on the above results, it was clear that the lithium-calcium-cobalt-nickel-manganese composite oxide active material of the present invention was useful as a material for a high-capacity lithium secondary battery.

Example 11

Synthesis of Lithium-Magnesium-Cobalt-Nickel-Manganese Composite Oxide Having Lithium-Excess Layered Rock-Salt Structure (Compositional Formula: $Li_{1.22}Mg_{0.01}Co_{0.14}Ni_{0.12}Mn_{0.50}O_2$)

Powders of lithium carbonate ($Li_2CO_3$, manufactured by Rare Metallic Co., Ltd., purity: 99.99%), magnesium chloride ($MgCl_2$, manufactured by Kojundo Chemical Laboratory Co., Ltd., purity: at least 99.9%), cobalt acetate tetrahydrate (($CH_3COO)_2Co.4H_2O$, manufactured by Wako Pure Chemical Industries, Ltd., Wako special grade), nickel acetate tetrahydrate (($CH_3COO)_2Ni.4H_2O$, manufactured by Wako Pure Chemical Industries, Ltd., Wako special grade) and manganese carbonate ($MnCO_3$, manufactured by Kojundo Chemical Laboratory Co., Ltd., purity: 99.9%) were weighed so as to achieve an atomic ratio of Li:Mg:Co:Ni:Mn=1.8:0.02:0.17:0.17:0.66. These powders were subjected to wet mixing in a mortar using ethanol as a medium, the resulting mixture was placed in a model C3 alumina crucible of grade SSA-S manufactured by Nikkato Corporation, and after sealing the crucible with a lid, the crucible was initially heated in the air at 300° C. for 3 hours using a muffle furnace (FP310, manufactured by Yamato Scientific Co., Ltd.). Subsequently, the crucible was left to cool naturally in the electric furnace, the resulting mixture was then subjected to wet grinding using ethanol, and additional heating was then performed at 600° C. for 12 hours, at 800° C. for 12 hours, at 900° C. for 12 hours, and then again at 900° C. for 12 hours, thus obtaining a sample.

Figure 28:
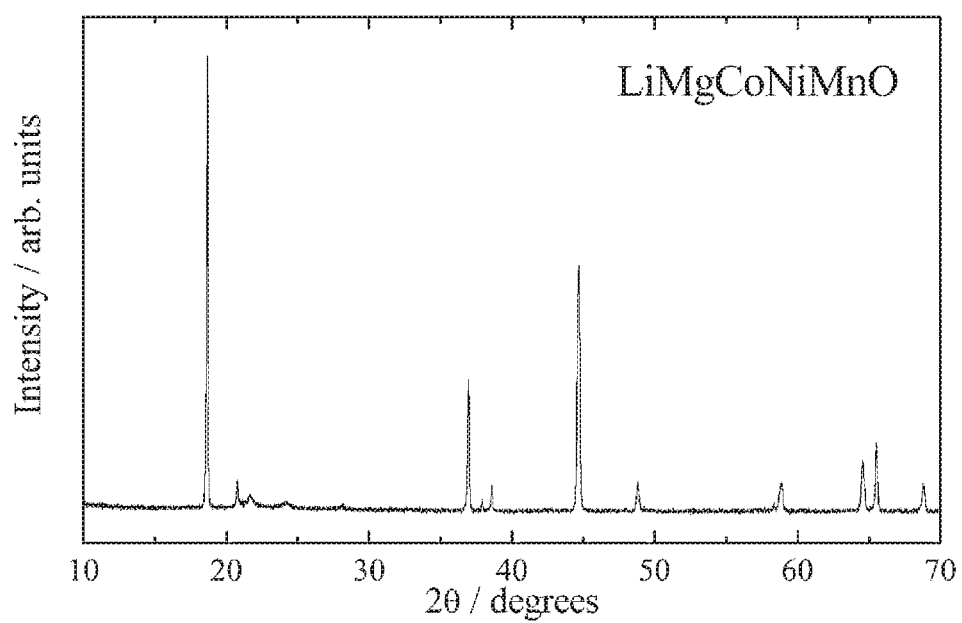
FIG. 28 is an X-ray powder diffraction pattern for a lithium-magnesium-cobalt-nickel-manganese composite oxide of the present invention obtained in Example 11.

When the crystal structure of the composite oxide obtained in the manner described above was investigated using a powder X-ray diffractometer (product name: Smart- Lab, manufactured by Rigaku Corporation), it was clear that the product was a single phase of a layered rock-salt structure having favorable crystallinity and belonging to the monoclinic system. The powder X-ray diffraction pattern is shown in FIG. 28. Peaks attributable to the monoclinic system were observed from 20° to 35°, and a lithium-excess composition was confirmed. Further, a crystal structure analysis was performed using the Rietveld method (using the program: RIETAN-FP), and when the lattice constants were refined assuming a space group C2/m, the following values were obtained, and the lithium-excess layered rock-salt structure was also confirmed on the basis of these lattice constants. Furthermore, compared with the lattice volume of the calcium-substituted oxide of Example 10, this composite oxide had a slightly smaller lattice volume, reflecting the fact that the magnesium ion is smaller than the calcium ion, and confirming the inclusion of substituted magnesium within the structure.

$a=4.9304$ Å±0.0002 Å

$b=8.5362$ Å±0.0003 Å

$c=5.0210$ Å±0.0001 Å

$\beta=109.270°±0.002°$ $V=199.478±0.012$ Å$^3$

Moreover, a chemical analysis was performed by ICP analysis (product name: P-4010, manufactured by Hitachi, Ltd.), and the molar ratio of the sample was found to be Li:Mg:Co:Ni:Mn=1.62:0.02:0.18:0.16:0.66. When these values were applied to the general formula $(Li_{1+x-2y}M_y)(Co_zNi_mTi_nMn_{1-m-n})_{1-x}O_2$ (wherein M, x, y, z, m and n have the same meanings as described above), it was confirmed that x=0.24, y=0.01, z=0.18, m=0.16 and n=0. Further, no aluminum or silicon or the like derived from the crucible material was detected.
(Lithium Secondary Battery)

Using the lithium-magnesium-cobalt-nickel-manganese composite oxide obtained in this manner as an active material, a lithium secondary battery (coin-type cell) was produced with the same structural elements and structure as Example 1.

Figure 29:
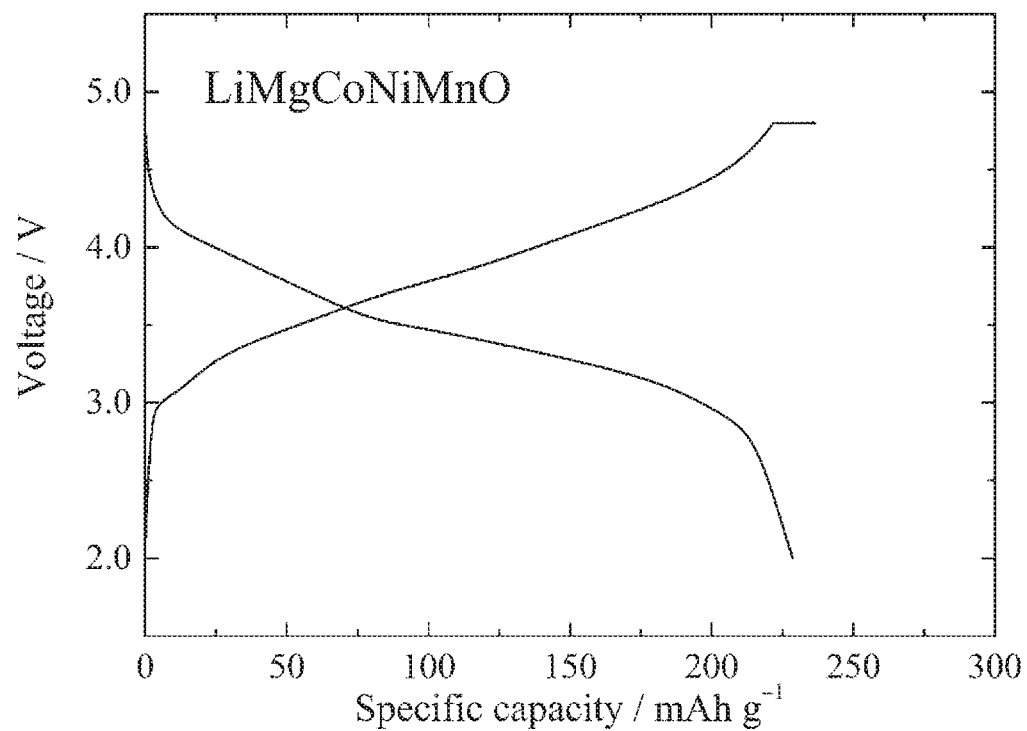
FIG. 29 illustrates charge/discharges curves for the 15th cycle of a charge/discharge test performed across a voltage range of 4.8 to 2.0 V for a lithium secondary battery containing the lithium-magnesium-cobalt-nickel-manganese composite oxide of the present invention obtained in Example 11 as a cathode active material.

The prepared lithium secondary battery was subjected to a constant-current charge/discharge test under temperature conditions of 25° C., using a current density of 10 mA/g and a cutoff potential of 4.8 V to 2.0 V relative to lithium. The results revealed that the charge/discharge capacity increased with each cycle. A high capacity was obtained, including a charge capacity of 237 mAh/g and a discharge capacity of 229 mAh/g for the 15th cycle. Furthermore, based on the energy density of the 15th cycle discharge of 783 Wh/kg, the average discharge potential for the 15th cycle was calculated by dividing the discharge energy density (783 Wh/kg) by the discharge capacity (229 mAh/g), confirming a value of (783÷229=3.42) V. The charge/discharge curves for the 15th cycle are shown in FIG. 29. Moreover, in the discharge curve of the 19th cycle, no decrease in the capacity was noticeable, and the average discharge potential obtained by dividing the discharge energy density by the discharge capacity was 3.39 V, confirming that any decrease in the discharge potential was slight. Based on the above results, it was clear that the lithium-magnesium-cobalt-nickel-manganese composite oxide active material of the present invention was useful as a material for a high-capacity lithium secondary battery.

Example 12

Synthesis of Lithium-Calcium-Magnesium-Cobalt-Nickel-Manganese Composite Oxide Having Lithium-Excess Layered Rock-Salt Structure (Compositional Formula: $Li_{1.22}Ca_{0.005}Mg_{0.005}Co_{0.14}Ni_{0.13}Mn_{0.49}O_2$)

Powders of lithium carbonate ($Li_2CO_3$, manufactured by Rare Metallic Co., Ltd., purity: 99.99%), calcium chloride ($CaCl_2$, manufactured by Kojundo Chemical Laboratory Co., Ltd., purity: at least 99.9%), magnesium chloride ($MgCl_2$, manufactured by Kojundo Chemical Laboratory Co., Ltd., purity: at least 99.9%), cobalt acetate tetrahydrate ($(CH_3COO)_2Co.4H_2O$, manufactured by Wako Pure Chemical Industries, Ltd., Wako special grade), nickel acetate tetrahydrate ($(CH_3COO)_2Ni.4H_2O$, manufactured by Wako Pure Chemical Industries, Ltd Wako special grade) and manganese carbonate ($MnCO_3$, manufactured by Kojundo Chemical Laboratory Co., Ltd., purity: 99.9%) were weighed so as to achieve an atomic ratio of Li:Ca:Mg:Co:Ni:Mn=1.8:0.01:0.01:0.17:0.17:0.66. These powders were subjected to wet mixing in a mortar using ethanol as a medium, the resulting mixture was placed in a model C3 alumina crucible of grade SSA-S manufactured by Nikkato Corporation, and after sealing the crucible with a lid, the crucible was initially heated in the air at 300° C. for 3 hours using a muffle furnace (FP310, manufactured by Yamato Scientific Co., Ltd.). Subsequently, the crucible was left to cool naturally in the electric furnace, the resulting mixture was then subjected to wet grinding using ethanol, and additional heating was then performed at 600° C. for 12 hours, at 800° C. for 12 hours, at 900° C. for 12 hours, and then again at 900° C. for 12 hours, thus obtaining a sample.

Figure 30:
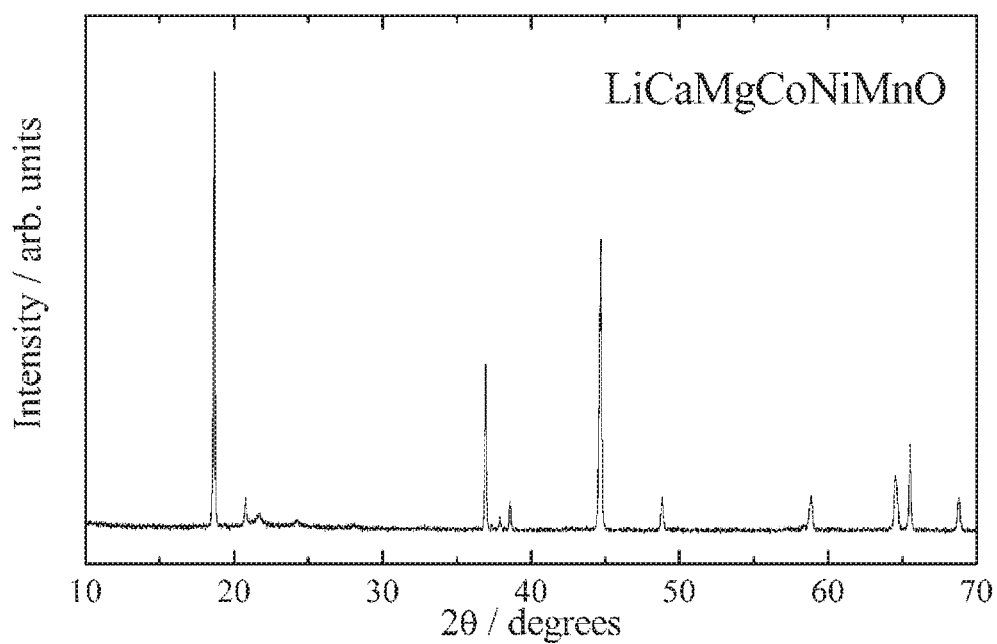
FIG. 30 is an X-ray powder diffraction pattern for a lithium-calcium-magnesium-cobalt-nickel-manganese composite oxide of the present invention obtained in Example 12.

When the crystal structure of the composite oxide obtained in the manner described above was investigated using a powder X-ray diffractometer (product name: Smart-Lab, manufactured by Rigaku Corporation), it was clear that the product was a single phase of a layered rock-salt structure having favorable crystallinity and belonging to the monoclinic system. The powder X-ray diffraction pattern is shown in FIG. 30. Peaks attributable to the monoclinic system were observed from 20° to 35°, and a lithium-excess composition was confirmed. Further, a crystal structure analysis was performed using the Rietveld method (using the program: RIETAN-FP), and when the lattice constants were refined assuming a space group C2/m, the following values were obtained, and the lithium-excess layered rock-salt structure was also confirmed on the basis of these lattice constants. Furthermore, compared with the lattice volumes of the calcium-substituted oxide and magnesium-substituted oxide of Example 10 and Example 11 respectively, this composite oxide had a lattice volume between the above two values, which was confirmed as an effect of the substitution of both calcium and magnesium.

$a=4.9308$ Å±0.0002 Å

$b=8.5361$ Å±0.0003 Å

$c=5.0203$ Å±0.0001 Å

$\beta=109.258°±0.002°$ $V=199.478±0.012$ Å$^3$

Moreover, a chemical analysis was performed by ICP analysis (product name: P-4010, manufactured by Hitachi, Ltd.), and the molar ratio of the sample was found to be Li:Ca:Mg:Co:Ni:Mn=1.62:0.01:0.01:0.18:0.17:0.65. When these values were applied to the general formula $(Li_{1+x-2y}M_y)(Co_zNi_mTi_nMn_{1-m-n})_{1-x}O_2$ (wherein M, x, y, z, m and n have the same meanings as described above), it was confirmed that x=0.24, y=0.01, z=0.18, m=0.17 and n=0. Further, no aluminum or silicon or the like derived from the crucible material was detected.

(Lithium Secondary Battery)

Using the lithium-calcium-magnesium-cobalt-nickel-manganese composite oxide obtained in this manner as an active material, a lithium secondary battery (coin-type cell) was produced with the same structural elements and structure as Example 1.

The prepared lithium secondary battery was subjected to a constant-current charge/discharge test under temperature conditions of 25° C., using a current density of 10 mA/g and a cutoff potential of 4.8 V to 2.0 V relative to lithium. The results revealed that the charge/discharge capacity increased with each cycle. A high capacity was obtained, including a charge capacity of 252 mAh/g and a discharge capacity of 244 mAh/g for the 7th cycle. Furthermore, based on the energy density of the 7th cycle discharge of 844 Wh/kg, the average discharge potential for the 10th cycle was calculated by dividing the discharge energy density (844 Wh/kg) by the discharge capacity (244 mAh/g), confirming a value of (844÷244=3.46) V. The charge/discharge curves for the 7th cycle are shown in FIG. 31. Moreover, in the discharge curve of the 11th cycle, no decrease in the capacity was noticeable, and the average discharge potential obtained by dividing the discharge energy density by the discharge capacity was 3.44 V, confirming that any decrease in the discharge potential was slight. Further, compared with the lithium-calcium-cobalt-nickel-manganese composite oxide of Example 10 and the lithium-magnesium-cobalt-nickel-manganese composite oxide of Example 11, it was evident that performing substitution with both calcium and magnesium yielded the highest capacity and the highest energy density. Based on the above results, it was clear that the lithium-calcium-magnesium-cobalt-nickel-manganese composite oxide active material of the present invention was useful as a material for a high-capacity lithium secondary battery.

Comparative Example 1

Synthesis of Lithium-Nickel-Manganese Composite Oxide Having Lithium-Excess Layered Rock-Salt Structure Powders of lithium carbonate ($Li_2CO_3$, manufactured by Rare Metallic Co., Ltd., purity: 99.99%), nickel acetate tetrahydrate (($CH_3COO)_2Ni.4H_2O$, manufactured by Wako Pure Chemical Industries, Ltd., Wako special grade) and manganese carbonate ($MnCO_3$, manufactured by Kojundo Chemical Laboratory Co., Ltd., purity: 99.9%) were weighed so as to achieve an atomic ratio of Li:Ni:Mn=2.0: 0.25:0.75. These powders were subjected to wet mixing in a mortar using ethanol as a medium, the resulting mixture was placed in a model C3 alumina crucible of grade SSA-S manufactured by Nikkato Corporation, and after sealing the crucible with a lid, the crucible was initially heated in the air at 300° C. for 3 hours using a muffle furnace (FP310, manufactured by Yamato Scientific Co., Ltd.). Subsequently, the crucible was left to cool naturally in the electric furnace, the resulting mixture was then subjected to wet grinding using ethanol, and additional heating was then performed at 600° C. for 12 hours, at 800° C. for 12 hours, at 900° C. for 12 hours, and then again at 900° C. for 12 hours, thus obtaining a sample.

When the crystal structure of the composite oxide obtained in the manner described above was investigated using a powder X-ray diffractometer (product name: RINT 2550V, manufactured by Rigaku Corporation), it was clear that the main phase was a layered rock-salt structure having favorable crystallinity and belonging to the monoclinic system. The powder X-ray diffraction pattern is shown in FIG. 32. Peaks attributable to the monoclinic system were observed from 20° to 35°, and a lithium-excess composition was confirmed. Further, when the method of least squares was used to refine the lattice constants for the hexagonal system that represented the average structure, the following values were obtained, and the lithium-excess layered rock-salt structure was also confirmed on the basis of these lattice constants. These values closely matched those from reports of conventional lithium-nickel-manganese composite oxides having a lithium-excess layered rock-salt structure. On the other hand, compared with the lattice constants for the calcium-substituted oxide of Example 1 and the magnesium-substituted oxide of Example 4, the a axis and c axis lengths were both shorter, and the unsubstituted oxide was confirmed as having the smallest lattice volume.

$a=2.8516$ Å±0.0004 Å

$c=14.238$ Å±0.003 Å

$V=100.27±0.02$ Å$^3$

Moreover, a crystal structure analysis was performed using the Rietveld method (using the program: RIETAN-FP), and when the lattice constants were refined assuming a space group C2/m, the following values were obtained, and the lithium-excess layered rock-salt structure was also confirmed on the basis of these lattice constants.

$a=4.9351$ Å±0.0008 Å

$b=8.5454$ Å±0.0004 Å

$c=5.0218$ Å±0.0002 Å

$\beta=109.233°±0.005°$ $V=199.96±0.02$ Å$^3$

Figure 33:
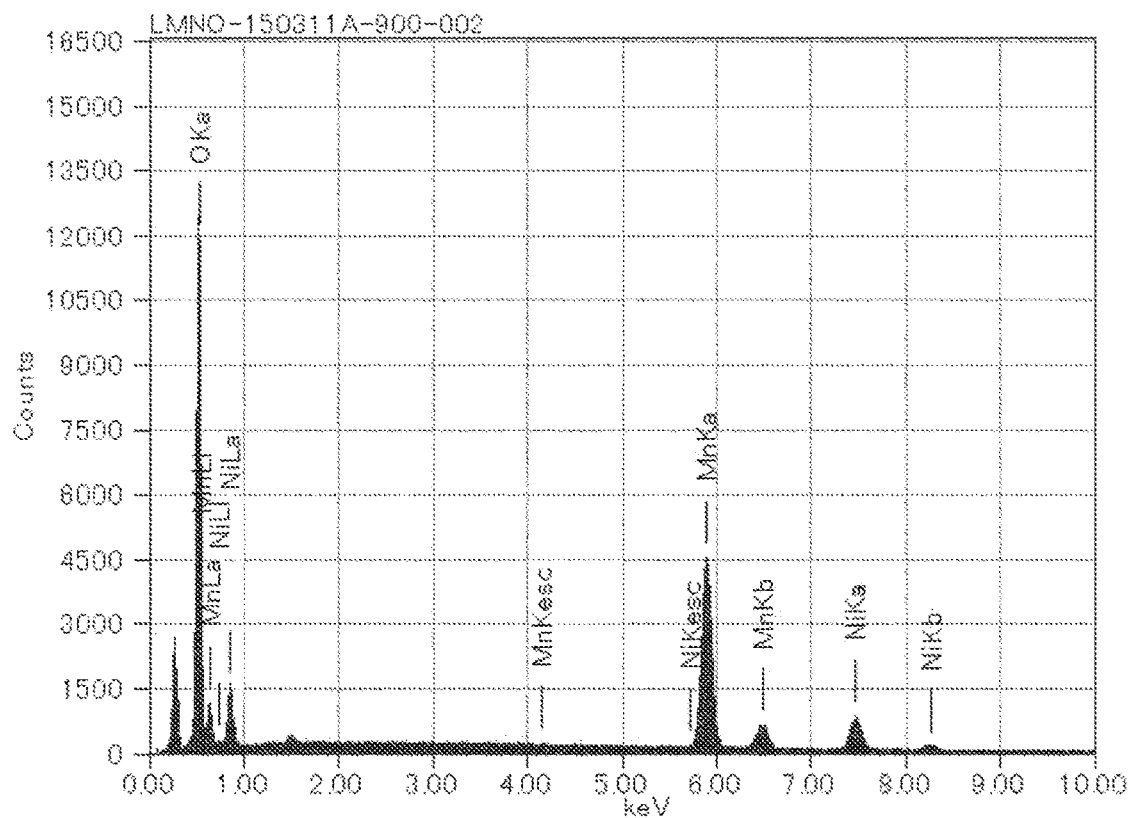
FIG. 33 is an EDS spectrum obtained by chemical composition analysis of the conventional lithium-nickel-manganese composite oxide obtained in Comparative Example 1.

Further, when the chemical composition was investigated using a scanning electron microscope (product name: JCM-6000, manufactured by JEOL Ltd.), the powdered particles were confirmed as containing nickel and manganese, and the compositional ratio within the entire powder sample was found to be Ni:Mn=0.25:0.75 (m=0.25). The SEM-EDS spectrum is shown in FIG. 33.

Moreover, a chemical analysis was performed by ICP analysis (product name: P-4010, manufactured by Hitachi, Ltd.), and the molar ratio of the sample was found to be Li:Ni:Mn=1.75:0.25:0.75. When these values were applied to the general formula $(Li_{1+x-2y}M_y)(Co_zNi_mTi_nMn_{1-m-n})_{1-x}O_2$ (wherein M, x, y, z, m and n have the same meanings as described above), it was confirmed that x=0.27, y=0, z=0, m=0.25 and n=0. Further, no aluminum or silicon or the like derived from the crucible material was detected.

(Lithium Secondary Battery)

Using the lithium-nickel-manganese composite oxide obtained in this manner as an active material, a lithium secondary battery (coin-type cell) was produced with the same structural elements and structure as Example 1, and the charge/discharge characteristics of the battery were measured.

Figure 34:
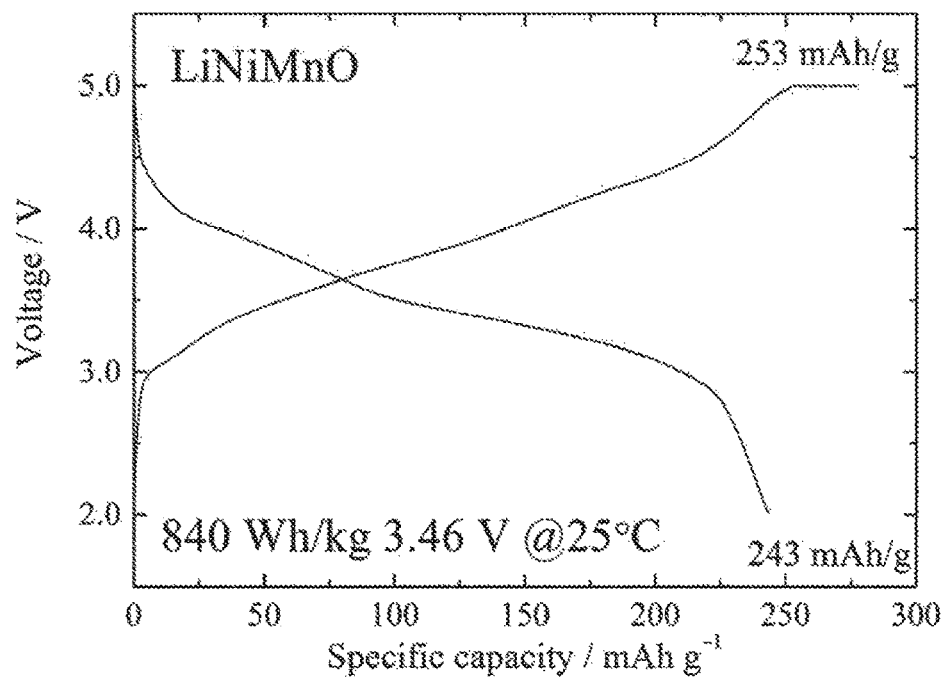
FIG. 34 illustrates charge/discharges curves for the 10th cycle of a charge/discharge test performed across a voltage range of 5.0 to 2.0 V for a lithium secondary battery containing the conventional lithium-nickel-manganese composite oxide obtained in Comparative Example 1 as a cathode active material.

The prepared lithium secondary battery was subjected to a constant-current charge/discharge test under temperature conditions of 25° C., using a current density of 10 mA/g and a cutoff potential of 5.0 V to 2.0 V relative to lithium. The results revealed that a high capacity was obtained, with a charge capacity of 253 mAh/g and a discharge capacity of 243 mAh/g being obtained for the 10th cycle. Further, based on the energy density of the 10th cycle discharge of 840 Wh/kg, the average discharge potential for the 10th cycle was calculated by dividing the discharge energy density (840 Wh/kg) by the discharge capacity (243 mAh/g), confirming a value of (840÷243=3.46) V. The charge/discharge curves for the 10th cycle are shown in FIG. 34. However, in the discharge curve of the 14th cycle, although no decrease in the capacity was noticeable, the average discharge potential obtained by dividing the discharge energy density by the discharge capacity was 3.33 V, confirming a significant decrease in the discharge potential. Furthermore, compared with the lithium-nickel-manganese composite oxides of Example 1 and Example 3, containing substituted calcium or magnesium respectively, it was clear that the capacity was low, and that practical problems existed for composite oxide systems that did not include substitution with an alkaline earth metal element.

Figure 35:
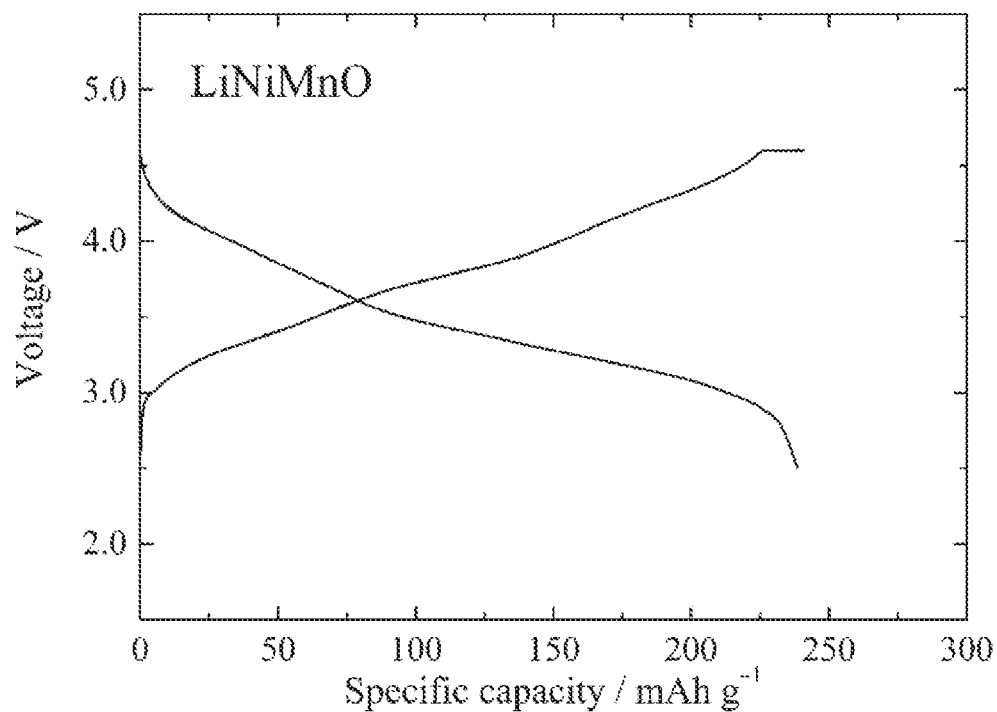
FIG. 35 illustrates charge/discharges curves for the 40th cycle of a charge/discharge test performed across a voltage range of 4.6 to 2.5 V for a lithium secondary battery containing the conventional lithium-nickel-manganese composite oxide obtained in Comparative Example 1 as a cathode active material.

Furthermore, a lithium secondary battery prepared under the same conditions was subjected to a constant-current charge/discharge test under temperature conditions of 25° C., using a current density of 10 mA/g and a cutoff potential of 4.6 V to 2.5 V relative to lithium. The results revealed that the charge/discharge capacity increased with each cycle and reached a maximum on the 40th cycle. The charge/discharge curves for the 40th cycle are shown in FIG. 35. The discharge capacity in the 40th cycle was 239 mAh/g, and the discharge capacity of a subsequent 82nd cycle was confirmed as having a capacity retention rate relative to the discharge capacity of the 40th cycle of about 94%. Based on the above results, it was clear that the active material of the present invention described in Example 1, Example 4 or Example 7 was very useful as a material for a lithium secondary battery having high capacity and a superior capacity retention rate.

Comparative Example 2

Synthesis of Lithium-Nickel-Manganese Composite Oxide Having Lithium-Excess Layered Rock-Salt Structure Powders of lithium carbonate ($Li_2CO_3$, manufactured by Rare Metallic Co., Ltd., purity: 99.99%), nickel acetate tetrahydrate ($(CH_3COO)_2Ni.4H_2O$, manufactured by Wako Pure Chemical Industries, Ltd., Wako special grade) and manganese carbonate ($MnCO_3$, manufactured by Kojundo Chemical Laboratory Co., Ltd., purity: 99.9%) were weighed so as to achieve an atomic ratio of Li:Ni:Mn=1.8:0.25:0.75. These powders were subjected to wet mixing in a mortar using ethanol as a medium, the resulting mixture was placed in a model C3 alumina crucible of grade SSA-S manufactured by Nikkato Corporation, and after sealing the crucible with a lid, the crucible was initially heated in the air at 300° C. for 3 hours using a muffle furnace (FP310, manufactured by Yamato Scientific Co., Ltd.). Subsequently, the crucible was left to cool naturally in the electric furnace, the resulting mixture was then subjected to wet grinding using ethanol, and additional heating was then performed at 600° C. for 12 hours, at 800° C. for 12 hours, at 900° C. for 12 hours, and then again at 900° C. for 12 hours, thus obtaining a sample.

Figure 36:
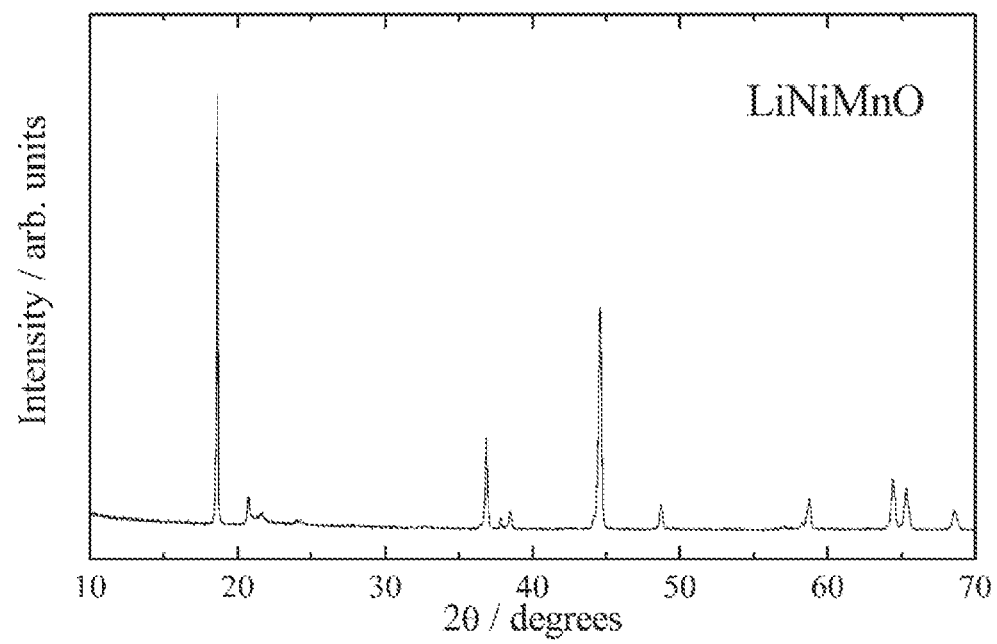
FIG. 36 is an X-ray powder diffraction pattern for a conventional lithium-nickel-manganese composite oxide obtained in Comparative Example 2.

When the crystal structure of the composite oxide obtained in the manner described above was investigated using a powder X-ray diffractometer (product name: Smart-Lab, manufactured by Rigaku Corporation), it was clear that the main phase was a layered rock-salt structure having favorable crystallinity and belonging to the monoclinic system. The powder X-ray diffraction pattern is shown in FIG. 36. Peaks attributable to the monoclinic system were observed from 20° to 35°, confirming a lithium-excess composition.

Further, when the chemical composition was investigated using a scanning electron microscope (product name: JCM-6000, manufactured by JEOL Ltd.), the powdered particles were confirmed as containing nickel and manganese, and the powder was confirmed as being formed from primary particles of about 1 to 2 microns having high crystallinity.

(Lithium Secondary Battery)

Using the lithium-nickel-manganese composite oxide obtained in this manner as an active material, a lithium secondary battery (coin-type cell) was produced with the same structural elements and structure as Example 1, and the charge/discharge characteristics of the battery were measured.

Figure 37:
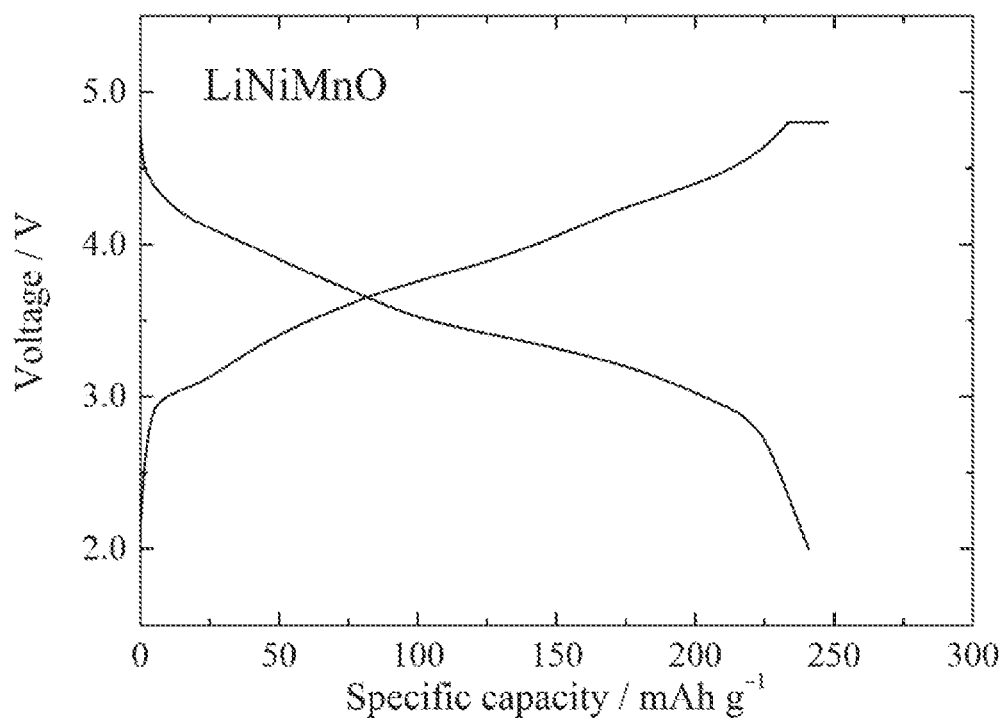
FIG. 37 illustrates charge/discharges curves for the 13th cycle of a charge/discharge test performed across a voltage range of 4.8 to 2.0 V for a lithium secondary battery containing the conventional lithium-nickel-manganese composite oxide obtained in Comparative Example 2 as a cathode active material.

The prepared lithium secondary battery was subjected to a constant-current charge/discharge test under temperature conditions of 25° C., using a current density of 10 mA/g and a cutoff potential of 4.8 V to 2.0 V relative to lithium. The results revealed that the charge/discharge capacity increased with each cycle and reached a maximum on the 13th cycle. The charge curve for the 13th cycle is shown in FIG. 37. The discharge capacity in the 13th cycle was 241 mAh/g. Based on the above results, it was clear that even though the amount of lithium was the same atomic ratio of 1.8 as that used in the active materials of the present invention described in Example 1, Example 4 and Example 7, the active materials of the present invention yielded a higher capacity and were more useful as a material for a lithium secondary battery.

Comparative Example 3

Synthesis of Lithium-Cobalt-Nickel-Manganese Composite Oxide Having Lithium-Excess Layered Rock-Salt Structure Powders of lithium carbonate ($Li_2CO_3$, manufactured by Rare Metallic Co., Ltd., purity: 99.99%), cobalt acetate tetrahydrate ($(CH_3COO)_2Ni.4H_2O$, manufactured by Wako Pure Chemical Industries, Ltd., Wako special grade), nickel acetate tetrahydrate ($(CH_3COO)_2Ni.4H_2O$, manufactured by Wako Pure Chemical Industries, Ltd., Wako special grade) and manganese carbonate ($MnCO_3$, manufactured by Kojundo Chemical Laboratory Co., Ltd., purity: 99.9%) were weighed so as to achieve an atomic ratio of Li:Co:Ni:Mn=2.0:0.17:0.17:0.66. These powders were subjected to wet mixing in a mortar using ethanol as a medium, the resulting mixture was placed in a model C3 alumina crucible of grade SSA-S manufactured by Nikkato Corporation, and after sealing the crucible with a lid, the crucible was initially heated in the air at 300° C. for 3 hours using a muffle furnace (FP310, manufactured by Yamato Scientific Co., Ltd.). Subsequently, the crucible was left to cool naturally in the electric furnace, the resulting mixture was then subjected to wet grinding using ethanol, and additional heating was then performed at 600° C. for 12 hours, at 800° C. for 12 hours, at 900° C. for 12 hours, and then again at 900° C. for 12 hours, thus obtaining a sample.

Figure 38:
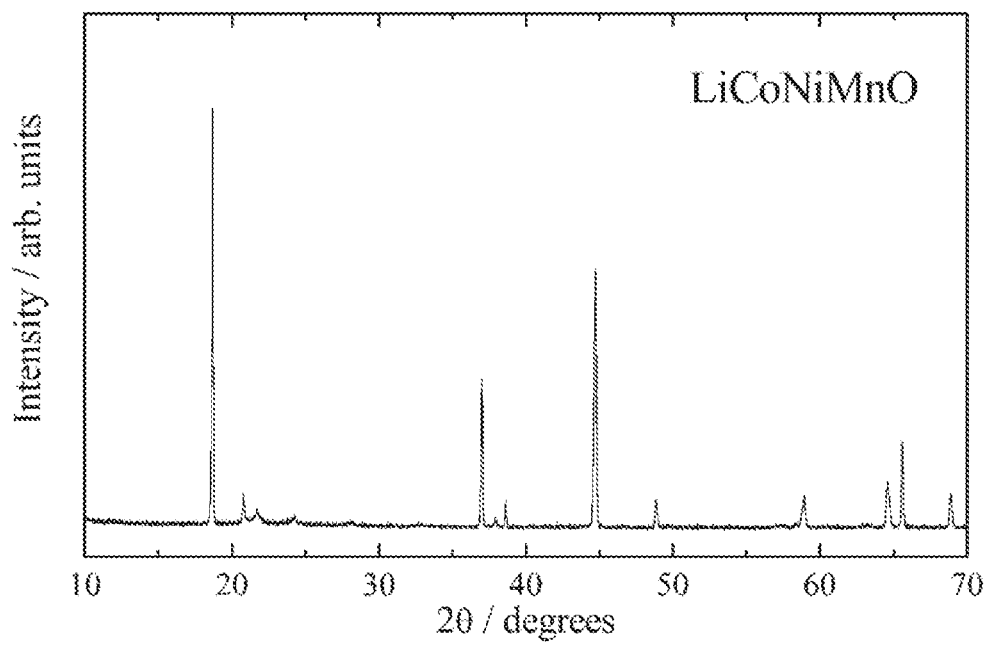
FIG. 38 is an X-ray powder diffraction pattern for a conventional lithium-cobalt-nickel-manganese composite oxide obtained in Comparative Example 3.

When the crystal structure of the composite oxide obtained in the manner described above was investigated using a powder X-ray diffractometer (product name: Smart-Lab, manufactured by Rigaku Corporation), it was clear that the main phase was a layered rock-salt structure having favorable crystallinity and belonging to the monoclinic system. The powder X-ray diffraction pattern is shown in FIG. 38. Peaks attributable to the monoclinic system were observed from 20° to 35°, confirming a lithium-excess composition. Further, a crystal structure analysis was performed using the Rietveld method (using the program: RIETAN-FP), and when the lattice constants were refined assuming a space group C2/m, the following values were obtained, and the lithium-excess layered rock-salt structure was also confirmed on the basis of these lattice constants. Further, compared with the lattice volumes for the calcium-substituted or magnesium-substituted oxides of Example 10, Example 11 and Example 12, the lattice volume for this comparative example was the smallest, confirming that the compounds of the present invention included substituted calcium and/or magnesium within the structure.

$a=4.9262$ Å±0.0002 Å

$b=8.5276$ Å±0.0002 Å

$c=5.0182$ Å±0.0001 Å

$\beta=109.262°\pm0.002°$ $V=199.004\pm0.010$ Å$^3$

Further, when the chemical composition was investigated using a scanning electron microscope (product name: JCM-6000, manufactured by JEOL Ltd.), the powdered particles were confirmed as containing nickel and manganese, and the compositional ratio within the entire powder sample was found to be Co:Ni:Mn=0.17:0.17:0.66 (m=0.17).

Moreover, a chemical analysis was performed by ICP analysis (product name: P-4010, manufactured by Hitachi, Ltd.), and the molar ratio of the sample was found to be Li:Co:Ni:Mn=1.75:0.18:0.17:0.65. When these values were applied to the general formula $(Li_{1+x-2y}M_y)(Co_zNi_mTi_nMn_{1-m-n})_{1-x}O_2$ (wherein M, x, y, z, m and n have the same meanings as described above), it was confirmed that x=0.27, y=0, z=0.18, m=0.17 and n=0. Further, no aluminum or silicon or the like derived from the crucible material was detected.

(Lithium Secondary Battery)

Using the lithium-cobalt-nickel-manganese composite oxide obtained in this manner as an active material, a lithium secondary battery (coin-type cell) was produced with the same structural elements and structure as Example 1, and the charge/discharge characteristics of the battery were measured.

Figure 39:
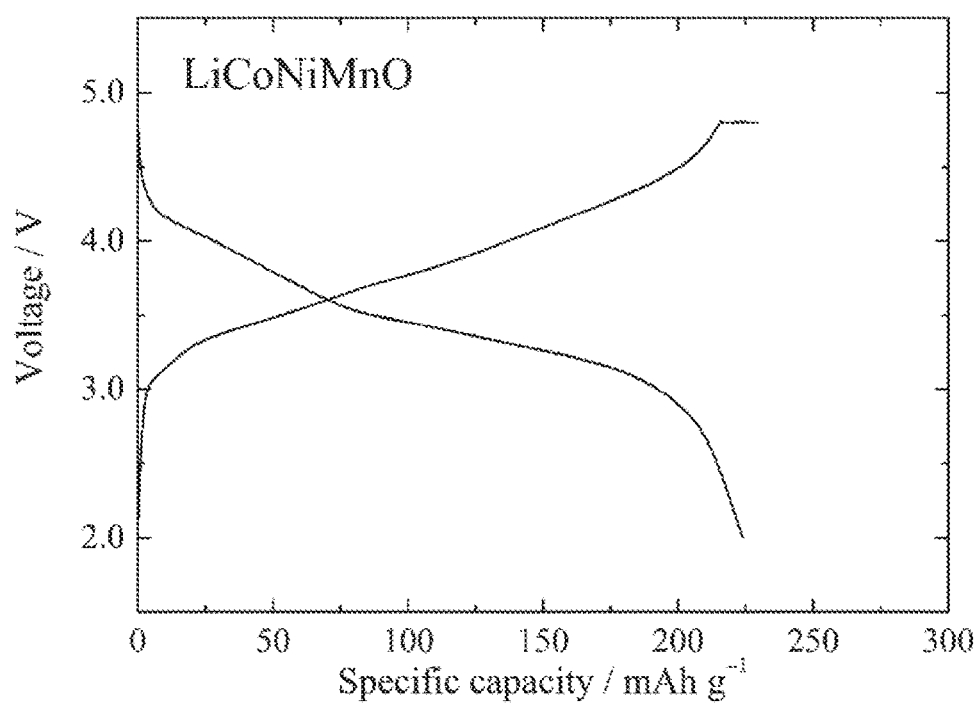
FIG. 39 illustrates charge/discharges curves for the 16th cycle of a charge/discharge test performed across a voltage range of 4.8 to 2.0 V for a lithium secondary battery containing the conventional lithium-nickel-manganese composite oxide obtained in Comparative Example 3 as a cathode active material.

The prepared lithium secondary battery was subjected to a constant-current charge/discharge test under temperature conditions of 25° C., using a current density of 10 mA/g and a cutoff potential of 4.8 V to 2.0 V relative to lithium. The results revealed that the charge/discharge capacity increased with each cycle and reached a maximum on the 16th cycle. The charge curve for the 16th cycle is shown in FIG. 39. The discharge capacity in the 16th cycle was 224 mAh/g, and the discharge capacity of a subsequent 24th cycle was confirmed as having a capacity retention rate of about 98%. Based on the above results, it was clear that the active material of the present invention described in Example 10, Example 11 or Example 12 was very useful as a material for a lithium secondary battery having high capacity.

Comparative Example 4

Synthesis of Lithium-Cobalt-Nickel-Manganese Composite Oxide Having Lithium-Excess Layered Rock-Salt Structure Powders of lithium carbonate ($Li_2CO_3$, manufactured by Rare Metallic Co., Ltd., purity: 99.99%), cobalt acetate tetrahydrate (($CH_3COO)_2Co.4H_2O$, manufactured by Wako Pure Chemical Industries, Ltd., Wako special grade), nickel acetate tetrahydrate (($CH_3COO)_2Ni.4H_2O$, manufactured by Wako Pure Chemical Industries, Ltd., Wako special grade) and manganese carbonate ($MnCO_3$, manufactured by Kojundo Chemical Laboratory Co., Ltd., purity: 99.9%) were weighed so as to achieve an atomic ratio of Li:Co:Ni:Mn=1.8:0.17:0.17:0.66. These powders were subjected to wet mixing in a mortar using ethanol as a medium, the resulting mixture was placed in a model C3 alumina crucible of grade SSA-S manufactured by Nikkato Corporation, and after sealing the crucible with a lid, the crucible was initially heated in the air at 300° C. for 3 hours using a muffle furnace (FP310, manufactured by Yamato Scientific Co., Ltd.). Subsequently, the crucible was left to cool naturally in the electric furnace, the resulting mixture was then subjected to wet grinding using ethanol, and additional heating was then performed at 600° C. for 12 hours, at 800° C. for 12 hours, at 900° C. for 12 hours, and then again at 900° C. for 12 hours, thus obtaining a sample.

Figure 40:
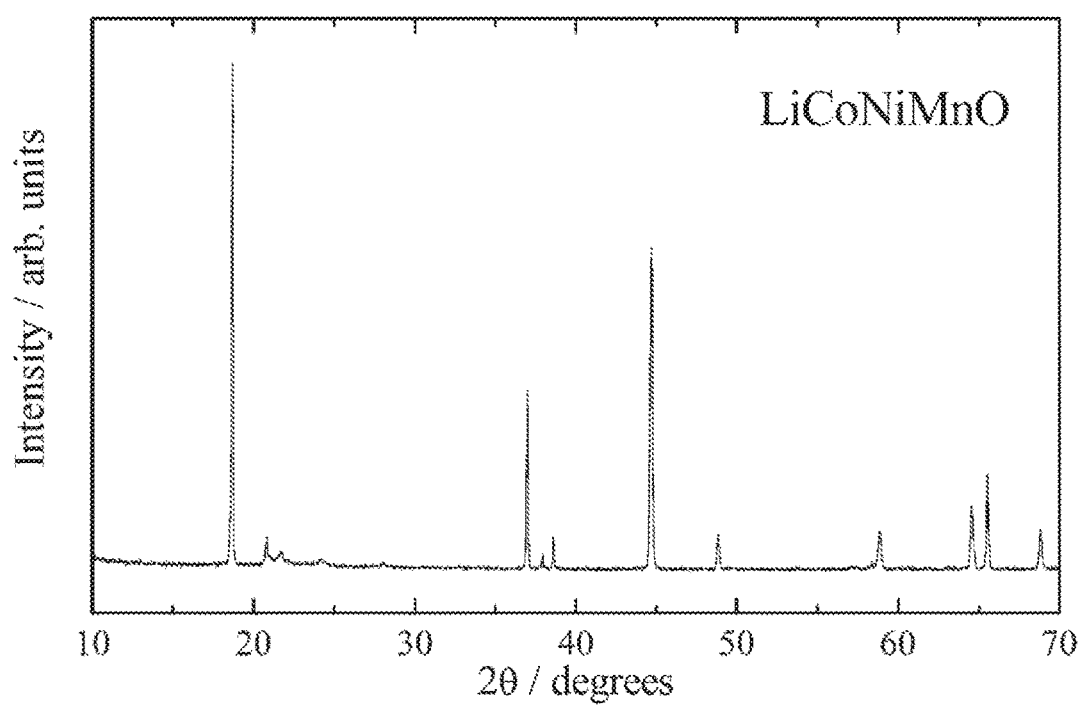
FIG. 40 is an X-ray powder diffraction pattern for a conventional lithium-cobalt-nickel-manganese composite oxide obtained in Comparative Example 4.

When the crystal structure of the composite oxide obtained in the manner described above was investigated using a powder X-ray diffractometer (product name: Smart-Lab, manufactured by Rigaku Corporation), it was clear that the main phase was a layered rock-salt structure having favorable crystallinity and belonging to the monoclinic system. The powder X-ray diffraction pattern is shown in FIG. 40. Peaks attributable to the monoclinic system were observed from 20° to 35°, confirming a lithium-excess composition.

Further, when the chemical composition was investigated using a scanning electron microscope (product name: JCM-6000, manufactured by JEOL Ltd.), the powdered particles were confirmed as containing nickel, cobalt and manganese, and the powder was confirmed as being formed from primary particles of about 1 to 2 microns having high crystallinity.

(Lithium Secondary Battery)

Using the lithium-cobalt-nickel-manganese composite oxide obtained in this manner as an active material, a lithium secondary battery (coin-type cell) was produced with the same structural elements and structure as Example 1, and the charge/discharge characteristics of the battery were measured.

The prepared lithium secondary battery was subjected to a constant-current charge/discharge test under temperature conditions of 25° C., using a current density of 10 mA/g and a cutoff potential of 4.8 V to 2.0 V relative to lithium. The charge curve for the 6th cycle is shown in FIG. 41. The discharge capacity was 238 mAh/g, representing a clearly reduced capacity compared with the calcium-substituted and/or magnesium-substituted oxides of the present invention. The above results showed that even though the amount of lithium was the same as that used in Example 10, Example 11 and Example 12, the capacity decreased without calcium and/or magnesium substitution, thus confirming the effects caused by the calcium and/or magnesium substitution of the present invention.

Comparative Example 5

Synthesis of Lithium-Nickel-Titanium-Manganese Composite Oxide Having Lithium-Excess Layered Rock-Salt Structure Powders of lithium carbonate ($Li_2CO_3$, manufactured by Rare Metallic Co., Ltd., purity: 99.99%), nickel acetate tetrahydrate (($CH_3COO)_2Ni.4H_2O$, manufactured by Wako Pure Chemical Industries, Ltd., Wako special grade), titanium dioxide ($TiO_2$, AMT-100 manufactured by Tayca Corporation, content: 93%) and manganese carbonate ($MnCO_3$, manufactured by Kojundo Chemical Laboratory Co., Ltd., purity: 99.9%) were weighed so as to achieve an atomic ratio of Li:Ni:Ti:Mn=2.0:0.125:0.125:0.75. These powders were subjected to wet mixing in a mortar using ethanol as a medium, the resulting mixture was placed in a model C3 alumina crucible of grade SSA-S manufactured by Nikkato Corporation, and after sealing the crucible with a lid, the crucible was initially heated in the air at 300° C. for 3 hours using a muffle furnace (FP310, manufactured by Yamato Scientific Co., Ltd.). Subsequently, the crucible was left to cool naturally in the electric furnace, the resulting mixture was then subjected to wet grinding using ethanol, and additional heating was then performed at 600° C. for 12 hours, at 800° C. for 12 hours, at 900° C. for 12 hours, and then again at 900° C. for 12 hours, thus obtaining a sample.

When the crystal structure of the composite oxide obtained in the manner described above was investigated using a powder X-ray diffractometer (product name: RINT 2550V, manufactured by Rigaku Corporation), it was clear that the main phase was a layered rock-salt structure having favorable crystallinity and belonging to the monoclinic system. The powder X-ray diffraction pattern is shown in FIG. 42. Peaks attributable to the monoclinic system were observed from 20° to 35°, and a lithium-excess composition was confirmed. Further, when the method of least squares was used to refine the lattice constants for the hexagonal system that represented the average structure, the following values were obtained, and the lithium-excess layered rock-salt structure was also confirmed on the basis of these lattice constants. It was evident that, compared with the values for the lithium-nickel-manganese composite oxide of Comparative Example 1, the a axis and c axis lengths were both significantly longer, and were even longer than the lattice constants of the calcium-substituted oxide of Example 2 and the magnesium-substituted oxide of Example 4. These results indicated that the substitution of calcium and magnesium into the lithium layer in Example 2 and Example 4 could be confirmed by the significant difference in the lattice constants.

$a$=2.8596 Å±0.0002 Å

$c$=14.273 Å±0.001 Å

$V$=101.08±0.01 Å$^3$

Moreover, a crystal structure analysis was performed using the Rietveld method (using the program: RIETAN-FP), and when the lattice constants were refined assuming a space group C2/m, the following values were obtained, and the lithium-excess layered rock-salt structure was also confirmed on the basis of these lattice constants.

$a$=4.9511 Å±0.0006 Å

$b$=8.5667 Å±0.0006 Å

$c$=5.0366 Å±0.0003 Å

$\beta$=109.182°±0.008°

$V$=201.77±0.03 Å$^3$

Figure 43:
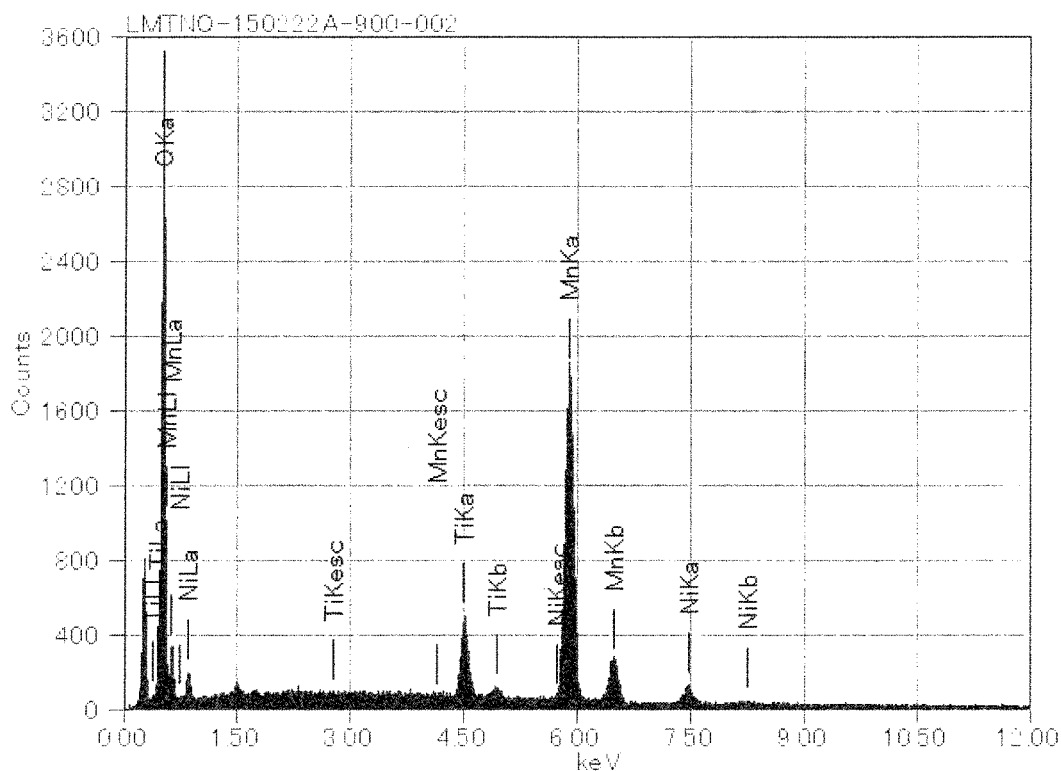
FIG. 43 is an EDS spectrum obtained by chemical composition analysis of the lithium-nickel-titanium-manganese composite oxide obtained in Comparative Example 5.

Further, when the chemical composition was investigated using a scanning electron microscope (product name: JCM-6000, manufactured by JEOL Ltd.), the powdered particles were confirmed as containing nickel, titanium and manganese, and the compositional ratio within the entire powder sample was found to be Ni:Ti:Mn=0.125:0.125:0.75 (m=0.125, n=0.125). The SEM-EDS spectrum is shown in FIG. 43. Furthermore, the results of performing a crystal structure analysis by the Rietveld method (using the program: RIETAN-FP) using the powder X-ray diffraction data confirmed that the amount of lithium in the chemical formula $Li_{1+x}(Ni_mTi_nMn_{1-m-n})_{1-x}O_2$ was x=0.30.

(Lithium Secondary Battery)

Using the lithium-nickel-titanium-manganese composite oxide obtained in this manner as an active material, a lithium secondary battery (coin-type cell) was produced with the same structural elements and structure as Example 1, and the charge/discharge characteristics of the battery were measured.

Figure 44:
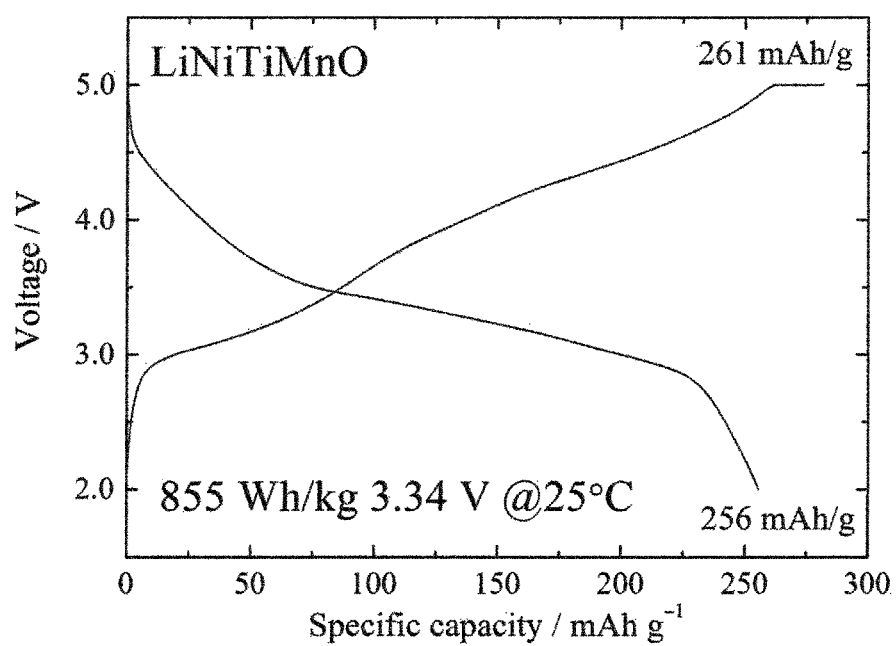
FIG. 44 illustrates charge/discharges curves for the 10th cycle of a charge/discharge test performed across a voltage range of 5.0 to 2.0 V for a lithium secondary battery containing the lithium-nickel-titanium-manganese composite oxide obtained in Comparative Example 5 as a cathode active material.

The prepared lithium secondary battery was subjected to a constant-current charge/discharge test under temperature conditions of 25° C., using a current density of 10 mA/g and a cutoff potential of 5.0 V to 2.0 V relative to lithium. The results revealed that a high capacity was obtained, with a charge capacity of 261 mAh/g and a discharge capacity of 256 mAh/g being obtained for the 10th cycle. Further, based on the energy density of the 10th cycle discharge of 855 Wh/kg, the average discharge potential for the 10th cycle was calculated by dividing the discharge energy density (855 Wh/kg) by the discharge capacity (256 mAh/g), confirming a value of (855÷256=3.34) V. The charge/discharge curves for the 10th cycle are shown in FIG. 44. However, in the discharge curve of the 14th cycle, although no decrease in the capacity was noticeable, the average discharge potential obtained by dividing the discharge energy density by the discharge capacity was 3.21 V, confirming a significant decrease in the discharge potential. The above results confirmed that in a composite oxide system having no alkaline earth metal element substitution, the arrangement of the transition metal atoms could not be maintained upon cycling, and the structure gradually underwent spinelization, causing practical problems.

INDUSTRIAL APPLICABILITY

The method of the present invention is able to provide a novel composite oxide having a layered rock-salt structure with a lithium-excess composition which, when used as the cathode active material of a lithium secondary battery, is capable of high capacity and exhibits little change in the discharge curve upon cycling, or can be expected to provide that type of performance, as well as providing a cathode material and a lithium secondary battery that contain the above composite oxide.

The invention claimed is:

1. A composite oxide comprising lithium, calcium, nickel and manganese, and having a lithium-excess layered rock-salt structure, wherein the calcium is substituted into only a lithium layer.

2. The composite oxide according to claim 1, wherein when lithium is extracted electrochemically at a potential of at least 4.6 V but not more than 5.0 V, an arrangement of oxygen atoms is maintained.

3. The composite oxide according to claim 1, having a layered rock-salt structure belonging to a monoclinic system.

4. The composite oxide according to claim 1, represented by a chemical formula $(Li_{1+x-2y}M_y)(Co_zNi_mTi_nMn_{1-m-n})_{1-x}O_2$, wherein M represents Ca, or Ca and Mg, and x, y, z, m and n are numbers that satisfy $0<x\leq0.33$, $0<y<0.13$, $0\leq z<0.2$, $0<m<0.5$ and $0\leq n\leq0.25$ respectively.

5. The composite oxide according to claim 1, represented by a chemical formula $(Li_{1+x-2y}M_y)(Co_zNi_mTi_nMn_{1-m-n})_{1-x}O_2$, wherein M represents Ca, or Ca and Mg, and x, y, z, m and n are numbers that satisfy $0.20\leq x\leq0.28$, $0<y<0.03$, $0\leq z<0.2$, $0.1<m<0.3$ and $0\leq n\leq0.2$ respectively.

6. The composite oxide according to claim 1, represented by a chemical formula $(Li_{1+x-2y}M_y)(Co_zNi_mMn_{1-m})_{1-x}O_2$, wherein M represents Ca, or Ca and Mg, and x, y, z and m are numbers that satisfy $0.20\leq x\leq0.28$, $0<y<0.03$, $0\leq z<0.2$ and $0.1<m<0.2$ respectively.

7. The composite oxide according to claim 1, represented by a chemical formula $(Li_{1+x-2y}M_y)(Ni_mMn_{1-m})_{1-x}O_2$, wherein M represents Ca, or Ca and Mg, and x, y and m are numbers that satisfy $0.20\leq x\leq0.28$, $0<y<0.03$ and $0.2<m<0.3$ respectively.

8. The composite oxide according to claim 1, represented by a chemical formula $(Li_{1+x-2y}M_y)(Ni_mTi_nMn_{1-m-n})_{1-x}O_2$, wherein M represents Ca, or Ca and Mg, and x, y, m and n are numbers that satisfy $0.20\leq x\leq0.28$, $0<y<0.03$, $0.1<m<0.3$ and $0\leq n\leq0.2$ respectively.

9. The composite oxide according to claim 1, further comprising magnesium.

10. The composite oxide according to claim 9, wherein when lithium is extracted electrochemically at a potential of at least 4.6 V but not more than 5.0 V, an arrangement of oxygen atoms is maintained.

11. The composite oxide according to claim 9, having a layered rock-salt structure belonging to a monoclinic system.

12. A cathode active material for a lithium secondary battery, the active material comprising the composite oxide according to claim 1.

13. The cathode active material for a lithium secondary battery according to claim 12, wherein when an initial charging reaction is performed within a voltage range from at least 4.4 V to not more than 4.7 V, an arrangement of oxygen atoms is maintained, and a charge curve exhibits a monotonous increase in potential.

14. The cathode active material for a lithium secondary battery according to claim 12, wherein the cathode active material has a high capacity, and maintains an arrangement of transition metal atoms upon charge/discharge cycling.

15. A cathode active material for a lithium secondary battery, the active material comprising the composite oxide according to claim 9.

16. The cathode active material for a lithium secondary battery according to claim 15, wherein when an initial charging reaction is performed within a voltage range from at least 4.4 V to not more than 4.7 V, an arrangement of oxygen atoms is maintained, and a charge curve exhibits a monotonous increase in potential.

17. A lithium secondary battery comprising a cathode, an anode, a separator and an electrolyte, wherein the cathode comprises the cathode active material for a lithium secondary battery according to claim 12.

18. The lithium secondary battery according to claim 17, wherein a charge/discharge capacity of the lithium secondary battery per unit of weight of composite oxide in the cathode active material is at least 250 mAh/g but not more than 300 mAh/g.

19. A lithium secondary battery comprising a cathode, an anode, a separator and an electrolyte, wherein the cathode comprises the cathode active material for a lithium secondary battery according to claim 15.

20. The lithium secondary battery according to claim 19, wherein a charge/discharge capacity of the lithium secondary battery per unit of weight of composite oxide in the cathode active material is at least 250 mAh/g but not more than 300 mAh/g.

* * * * *